United States Patent
Seibel et al.

(10) Patent No.: US 12,314,468 B2
(45) Date of Patent: May 27, 2025

(54) EYE TRACKING IN NEAR-EYE DISPLAYS

(71) Applicants: UNIVERSITY OF WASHINGTON, Seattle, WA (US); MAGIC LEAP, INC., Plantation, FL (US)

(72) Inventors: Eric J. Seibel, Seattle, WA (US); Steven L. Brunton, Seattle, WA (US); Chen Gong, Seattle, WA (US); Brian T. Schowengerdt, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/545,172

(22) Filed: Dec. 19, 2023

(65) Prior Publication Data

US 2024/0184359 A1 Jun. 6, 2024

Related U.S. Application Data

(63) Continuation of application No. 17/345,305, filed on Jun. 11, 2021, now Pat. No. 11,907,418.

(60) Provisional application No. 63/038,414, filed on Jun. 12, 2020.

(51) Int. Cl.
*G06T 7/33* (2017.01)
*G02B 27/01* (2006.01)
(Continued)

(52) U.S. Cl.
CPC ......... *G06F 3/013* (2013.01); *G02B 27/0172* (2013.01); *G02B 27/0179* (2013.01);
(Continued)

(58) Field of Classification Search
CPC ...... G02B 2027/0138; G02B 2027/014; G02B 2027/0187; G02B 27/0093;
(Continued)

(56) References Cited

U.S. PATENT DOCUMENTS 6,317,103 B1   11/2001   Furness, III et al.
10,567,641 B1   2/2020   Rueckner
(Continued)

FOREIGN PATENT DOCUMENTS

JP  2012-213513   11/2012
JP  2019-517071   6/2019
WO  WO 2018/175625   9/2018

OTHER PUBLICATIONS

Shuai Wang, "Manufacture Assembly Fault Detection Method based on Deep Learning and Mixed Reality," Aug. 26, 2019, Proceeding of the IEEE International Conference on Information and Automation ,Wuyi Mountain, China, Aug. 2018,pp. 808-812.*
(Continued)

*Primary Examiner* — Omar S Ismail
(74) *Attorney, Agent, or Firm* — Vista IP Law Group, LLP

(57) ABSTRACT

Techniques for tracking eye movement in an augmented reality system identify a plurality of base images of an object or a portion thereof. A search image may be generated based at least in part upon at least some of the plurality of base images. A deep learning result may be generated at least by performing a deep learning process on a base image using a neural network in a deep learning mode. A captured image may be localized at least by performing an image registration process on the captured image and the search image using a Kalman filter model and the deep learning result.

13 Claims, 36 Drawing Sheets

(51) Int. Cl.
| | |
|---|---|
| *G06F 3/01* | (2006.01) |
| *G06N 3/04* | (2023.01) |
| *G06N 3/08* | (2023.01) |
| *G06T 7/246* | (2017.01) |
| *G06T 7/277* | (2017.01) |
| *G06T 7/73* | (2017.01) |

(52) U.S. Cl.
CPC ............... *G06N 3/04* (2013.01); *G06N 3/08* (2013.01); *G06T 7/248* (2017.01); *G06T 7/277* (2017.01); *G06T 7/33* (2017.01); *G06T 7/74* (2017.01); *G02B 2027/0138* (2013.01); *G02B 2027/014* (2013.01); *G02B 2027/0187* (2013.01); *G06T 2207/20081* (2013.01); *G06T 2207/20084* (2013.01); *G06T 2207/30201* (2013.01)

(58) Field of Classification Search
CPC . G02B 27/0172; G02B 27/0179; G06F 3/013; G06N 20/00; G06N 3/04; G06N 3/045; G06N 3/08; G06N 3/082; G06N 3/084; G06N 7/01; G06T 2207/20081; G06T 2207/20084; G06T 2207/30201; G06T 7/248; G06T 7/277; G06T 7/33; G06T 7/74; G06V 10/764; G06V 40/18
See application file for complete search history.

(56) References Cited

U.S. PATENT DOCUMENTS

| | | | | |
|---|---|---|---|---|
| 10,852,551 | B1* | 12/2020 | Sharma | H04N 23/54 |
| 10,852,817 | B1* | 12/2020 | Ouderkirk | G06V 40/18 |
| 2004/0005083 | A1 | 1/2004 | Fujimura et al. | |
| 2006/0146046 | A1 | 7/2006 | Longhurst et al. | |
| 2008/0166025 | A1 | 7/2008 | Thorne | |
| 2013/0293530 | A1* | 11/2013 | Perez | G06Q 30/0251 |
| | | | | 345/418 |
| 2016/0292921 | A1* | 10/2016 | Evans | G02B 27/0172 |
| 2018/0068450 | A1* | 3/2018 | Yuan | G06T 7/194 |
| 2018/0124300 | A1* | 5/2018 | Brook | H04N 23/62 |
| 2018/0150725 | A1* | 5/2018 | Tate | G06N 3/08 |
| 2018/0157321 | A1* | 6/2018 | Liu | G06V 40/16 |
| 2019/0004325 | A1* | 1/2019 | Connor | G02B 27/0172 |
| 2019/0012835 | A1* | 1/2019 | Bleyer | G06T 19/006 |
| 2019/0035363 | A1* | 1/2019 | Schluessler | G09G 3/003 |
| 2019/0243448 | A1 | 8/2019 | Miller et al. | |
| 2019/0251333 | A1* | 8/2019 | Wang | G06V 10/776 |
| 2019/0266418 | A1* | 8/2019 | Xu | G06V 10/457 |
| 2019/0273910 | A1* | 9/2019 | Malaika | G09G 3/003 |
| 2019/0295282 | A1* | 9/2019 | Smolyanskiy | G01S 13/867 |
| 2019/0302883 | A1* | 10/2019 | Greer | G06T 1/20 |
| 2019/0303759 | A1* | 10/2019 | Farabet | G05D 1/00 |
| 2019/0369403 | A1* | 12/2019 | Leister | G02B 26/0808 |
| 2019/0379827 | A1* | 12/2019 | Berkovich | H04N 23/682 |
| 2020/0104457 | A1* | 4/2020 | Chuang | G06F 30/392 |
| 2020/0186764 | A1* | 6/2020 | Wozniak | G06T 5/40 |
| 2020/0193976 | A1* | 6/2020 | Cartwright | G06F 3/011 |
| 2020/0202628 | A1* | 6/2020 | Jones | G06F 3/017 |
| 2020/0250461 | A1* | 8/2020 | Yang | G06V 10/50 |
| 2020/0311945 | A1* | 10/2020 | Lim | G06T 7/187 |
| 2020/0409457 | A1* | 12/2020 | Terrano | G06F 3/013 |
| 2021/0097943 | A1* | 4/2021 | Wyatt | H10K 59/351 |
| 2021/0264674 | A1* | 8/2021 | Shahrokni | G06F 3/013 |

OTHER PUBLICATIONS

Ismoilov Nusrat et al. ,"A Comparison of Regularization Techniques in Deep Neural Networks," Nov. 18, 2018, Symmetry 2018,10,648, pp. 1-10.*
Anuradha Kar,"A Review and Analysis of Eye-Gaze Estimation Systems, Algorithms and Performance Evaluation Methods in Consumer Platforms," Sep. 6, 2017, IEEE Access vol. 5, 2017, Digital Object Identifier 10.1109/ACCESS.2017.2735633, pp. 16495-16513.*
Joseph Lemley,"Efficient CNN Implementation for Eye-Gaze Estimation on Low-Power/Low-Quality Consumer Imaging Systems," Jun. 28, 2018,arXiv:1806.10890v1 [cs.CV] Jun. 28, 2018, pp. 1-5.*
Bin Li,"Etracker: A Mobile Gaze-Tracking System with Near-Eye Display Based on a Combined Gaze-Tracking Algorithm," May 19, 2018, Sensors 2018, 18, 1626; doi: 10.3390/s18051626,pp. 1-14.*
Jannick P. Rolland,"High-resolution inset head-mounted display," Jan. 13, 1998,Applied Optics, vol. 37, No. 19,pp. 4183-4187.*
Christy K. Sheehy,"High-speed, image-based eye tracking with a scanning laser ophthalmoscope," Sep. 19, 2012,Biomedical Optics Express, vol. 3—No. 10 , pp. 4-6.*
Alex Krizhevsky,"Imagenet classification with deep convolutional neural networks," In Advances in neural information processing systems, May 24, 2017, Communications of the ACM,vol. 60,Issue 6,Jun. 2017,pp. 1-6.*
Chen Gong, "Retinamatch: Efficient template matching of retina images for teleophthalmology," Jun. 17, 2019, IEEE Transactions on Medical Imaging, 38(8):1993-2004, 2019, pp. 1993-2002.*
Hong Hua,"Video-based eyetracking methods and algorithms in headmounted displays," Jun. 8, 2006, Optics Express, 14(10): 2006,pp. 4333-4347.*
Eric Seibel,"A full-color scanning fiber endoscope," Feb. 15, 2006, In Optical fibers and sensors for medical diagnostics and treatment applications VI, vol. 6083, pp. 608303-1-608303-4.*
D.W.F. van Krevelen,"A Survey of Augmented Reality Technologies, Applications and Limitations," Jan. 26, 2010,The International Journal of Virtual Reality, 2010, 9(2),pp. 1-10.*
English Translation of Foreign OA for JP Patent Appln. No. 2022-575741 dated Jul. 30, 2024.
Foreign Response to EESR for EP Patent Appln. No. 21821754.5 dated May 28, 2024.
Non-Final Office Action for U.S. Appl. No. 17/345,305 dated Aug. 10, 2023.
Amendment Response to NFOA for U.S. Appl. No. 17/345,305 dated Sep. 6, 2023.
Notice of Allowance for U.S. Appl. No. 17/345,305 dated Sep. 20, 2023.
Anuradha Kar,"A Review and Analysis of Eye-Gaze Estimation Systems, Algorithms and Performance Evaluation Methods in Consumer Platforms," Sep. 6, 2017, IEEE Access vol. 5, 2017, Digital Object Identifier 0.1109/ACCESS.2017.2735633, pp. 16495-16513.
Alex Krizhevsky, "Imagenet classification with deep convolutional neural networks," In Advances in neural information processing systems, OS/24/2017, Communications of the ACM, vol. 60,Issue 6,Jun. 2017,pp. 1-6.
Bajura, M. et al. Merging virtual objects with the real world: Seeing ultrasound imagery within the patient. ACM SIGGRAPH Computer Graphics, 26(2):203-210, 1992.
Bulling, A. et al. Wearable eog goggles: Seamless sensing and contextawareness in everyday environments. Journal of Ambient Intelligence and Smart Environments, 1(2):157-171, 2009.
Caudell, T.P. et al. Augmented reality: An application of heads-up display technology to manual manufacturing processes. In Hawaii International Conference on System Sciences, pp. 659-669, 1992.
Gong, C. et al. Real-time Retinal Localization for Eye-tracking in Head-mounted Displays. Fourth Workshop on Computer Vision for AR/VR, Jun. 15, 2020.
Gong, C. et al. Retinamatch: Efficient template matching of retina images for teleophthalmology. IEEE Transactions on Medical Imaging, 38(8):1993-2004, 2019.
Hua, H. et al. Video-based eyetracking methods and algorithms in head-mounted displays. Optics Express, 14(10):4328-4350, 2006.
Krizhevsky, A. et al. Imagenet classification with deep convolutional neural networks. In Advances in neural information processing systems, pp. 1097-1105, 2012.
Li, B. et al. High performance visual tracking with siamese region proposal network. In Proceedings of the IEEE Conference on Computer Vision and Pattern Recognition, pp. 8971-8980, 2018.

(56) References Cited

OTHER PUBLICATIONS

Rolland, J.P. et al. A survey of tracking technologies for virtual environments. In Fundamentals of wearable computers and augmented reality, pp. 83-128. CRC Press, 2001.
Rolland, J.P. et al. High-resolution inset head-mounted display. Applied optics, 37(19):4183-4193, 1998.
Seibel, E.J. et al. A full-color scanning fiber endoscope. In Optical fibers and sensors for medical diagnostics and treatment applications VI, vol. 6083, p. 608303. International Society for Optics and Photonics, 2006.
Sheehy, C.K. et al. High-speed, image-based eye tracking with a scanning laser ophthalmoscope. Biomedical optics express, 3(10):2611-2622, 2012.
STARE Project. Structured analysis of the retina. https://cecas.clemson.edu/~ahoover/stare/.
Truong, P. et al. GLAMpoints: Greedily learned accurate match points. In Proceedings of the IEEE International Conference on Computer Vision, pp. 10731-10740, 2019.
Welch, G. et al. An introduction to the kalman filter. 1995.
Whitmire, E. et al. Eyecontact: scleral coil eye tracking for virtual reality. In Proceedings of the 2016 ACM International Symposium on Wearable Computers, pp. 184-191, 2016.
Widefield imaging module. https://business-lounge.heidelbergengineering.com/us/en/products/spectralis/widefield-imaging-module/.
PCT International Search Report and Written Opinion for International Appln. No. PCT/US21/37072, Applicant Magic Leap, Inc., dated Oct. 1, 2021.
Foreign OA for JP Patent Appln. No. 2022-575741 dated Jul. 30, 2024.
Pan, Z., et al., "Human Eye Tracking Based on CNN and Kalman Filtering," Transactions on Edutainment XV, dated Apr. 27, 2019.
B. Li, J. Yan, W. Wu, Z. Zhu and X. Hu, "High Performance Visual Tracking with Siamese Region Proposal Network," 2018 IEEE/CVF Conference on Computer Vision and Pattern Recognition, Salt Lake City, UT, USA, 2018, pp. 8971-8980, doi: 10.1109/CVPR.2018.00935.
Foreign OA for KR Patent Appln. No. 10-2023-7001121 dated Oct. 18, 2024.
Foreign Response for JP Patent Appln. No. 2022-575741 dated Oct. 29, 2024.
Foreign Response for KR Patent Appln. No. 10-2023-7001121 dated Dec. 13, 2024.
Foreign NOA for JP Patent Appln. No. 2022-575741 dated Nov. 8, 2024.
Foreign NOA for IL Patent Appln. No. 298986 dated Dec. 24, 2024.
Foreign Exam Report for EP Patent Appln. No. 21821754.5 dated Feb. 24, 2025.
Foreign FOA for Korean Appln. No. 10-2023-7001121 dated Apr. 3, 2025.

* cited by examiner

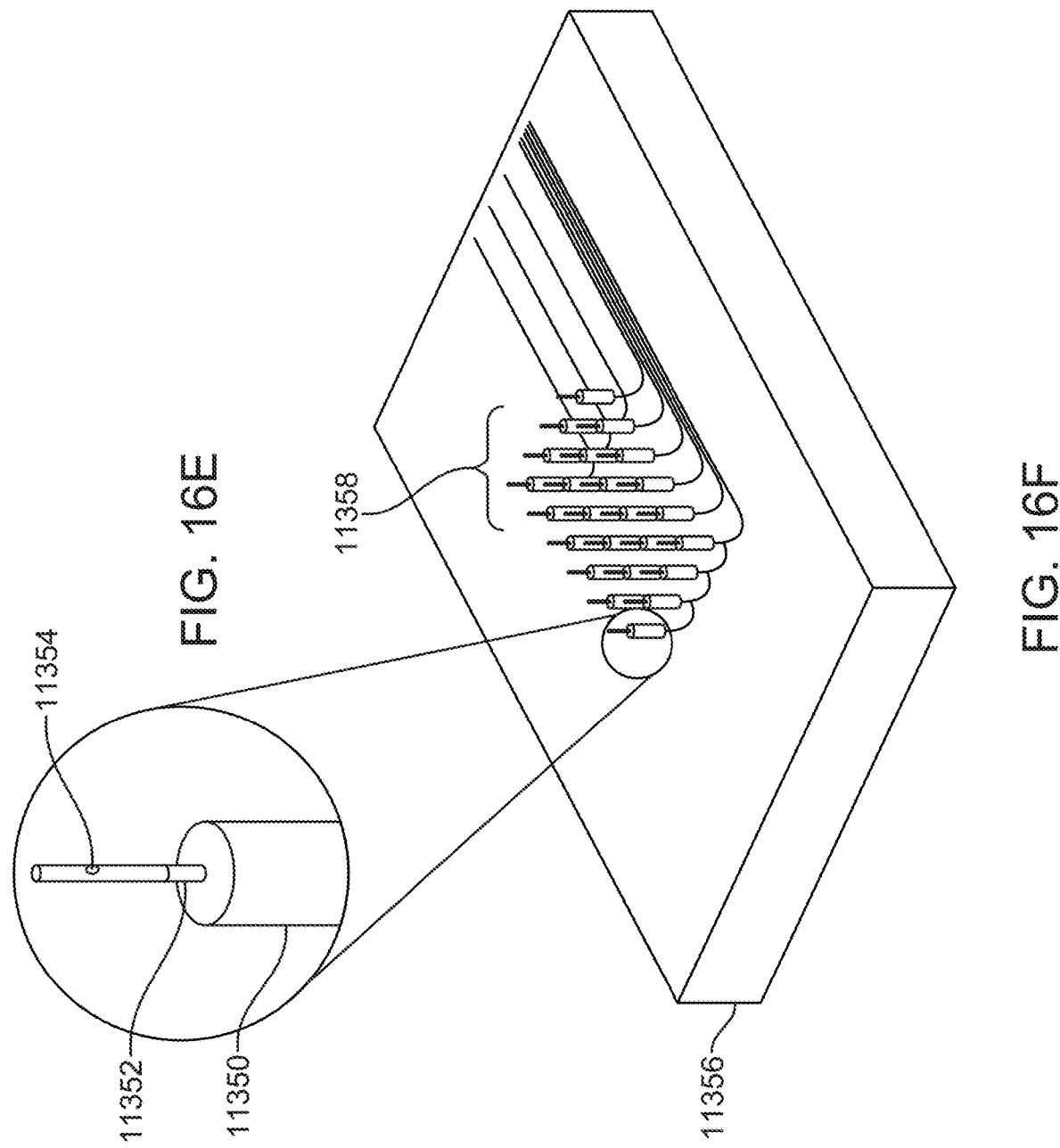

EYE TRACKING IN NEAR-EYE DISPLAYS

CROSS REFERENCE TO RELATED APPLICATIONS

This application is a continuation of U.S. patent application Ser. No. 17/345,305, entitled "EYE TRACKING IN NEAR-EYE DISPLAYS," filed on Jun. 11, 2021, which claims the benefit of U.S. provisional patent application Ser. No. 63/038,414 filed on Jun. 12, 2020 and entitled "EYE TRACKING IN NEAR-EYE DISPLAYS". The contents of the aforementioned U.S. patent applications are hereby expressly incorporated by reference in their entirety for all purposes as though set forth in full.

TECHNICAL FIELD

This disclosure generally relates to methods and systems for tracking eye movement in near-eye display such as an augmented reality system and, more particularly, to tracking eye movement by using retina-based tracking with a deep learning model having a deep convolution neural network and an image registration process with a Kalman filter model, without using convention pupil-glint-based techniques.

DESCRIPTION OF THE RELATED ART

Spatial computing headsets, including virtual reality (VR), augmented reality (AR), mixed reality (MR), and extended reality (XR) headsets, have proven invaluable for many applications, spanning the fields of scientific visualization, medicine and military training, engineering design and prototyping, tele-manipulation and tele-presence, and personal entertainment systems. In spatial computing headsets, virtual or augmented scenes are displayed to a user via an optics assembly that is positionable and securable to a user's head in front of the user's eyes.

Head Mounted Displays (HMD) have been explored for a wide range of applications in the fields of 3D virtual and augmented environments. Accurate and high-speed eye tracking is important to enable key scenarios in HMD, e.g., the field of view interactive interfaces for people. Eye-trackers embedded in HMD can be divided into invasive methods, e.g., scleral coil and non-invasive video-based methods, the latter being more common. Current video-based methods mainly use different features of the eyeball, such as iris, pupil and glint, and pupil-glint methods are the most widely used. These methods have an average tracking error of 0.5°-1°, while the tracking resolution of such features is around 0.7°-1° per pixel. It is not easy to further improve the accuracy beyond the tracking resolution.

Besides using features of the eye surface, retina images are also utilized for eye-tracking in medical field, such as eye-tracking scanning laser ophthalmoscopes (SLOs). They leverage the scanning distortion for retinal movement estimation in small FOV high-resolution images, however this technique is designed for small saccades and SLOs are not easily integrated into an HMD. Retinal-based eye tracking in HMD has its own advantages: a higher tracking resolution without advanced sensors, linear gaze estimation models and direct localization of the fovea on the retina. Furthermore, retinal tracking provides a wide range of medical applications with the HMD.

Moreover, modern approaches to object recognition make essential use of machine learning methods. To improve their performance, some embodiments may collect larger datasets, learn more powerful models, and use better techniques for preventing overfitting. Until recently, datasets of labeled images were relatively small—on the order of tens of thousands of images. Simple recognition tasks upon which object tracking may be founded may be solved quite well with datasets of this size, especially if they are augmented with label-preserving transformations. For example, the current best error rate on the MNIST digit-recognition task (<0.3%) approaches human performance. But objects in realistic settings exhibit considerable variability, so to learn to recognize them it may be necessary to use much larger training sets. The shortcomings of small image datasets have been widely recognized, but it has only recently become possible to collect labeled datasets with millions of images.

To learn about thousands of objects from millions of images, a model with a large learning capacity is desperately needed. Nonetheless, the immense complexity of the object recognition task means that this problem cannot be specified even by a dataset as large as ImageNet, so a model in some embodiments should also have lots of prior knowledge to compensate for all the data modern techniques simply do not have. Convolutional neural networks (CNNs) constitute one such class of models. Their capacity may be controlled by varying their depth and breadth, and they also make strong and mostly correct assumptions about the nature of images (namely, stationarity of statistics and locality of pixel dependencies). Thus, compared to standard feedforward neural networks with similarly-sized layers, CNNs have much fewer connections and parameters and so they are easier to train, while their theoretically-best performance is likely to be only slightly worse.

Despite the attractive qualities of CNNs, and despite the relative efficiency of their local architecture, CNNs have still been prohibitively expensive to apply in large scale to high-resolution images.

Furthermore, visual object tracking is a basic building block in various tasks of computer vision, such as automatic driving and video surveillance. It is challenging in large appearance variance caused by illumination, deformation, occlusion and motion. Besides, the speed is also important in practical applications.

Modern trackers can be roughly divided into two branches. The first branch is based on correlation filter, which trains a regressor by exploiting the properties of circular correlation and performing operations in the Fourier domain. It can do online tracking and update the weights of filters at the same time efficiently. The original version is conducted in Fourier domain and is then widely used in the tracking community. Recent correlation filter based methods use deep features to improve the accuracy, but it largely harms the speed during model update. Another branch of methods aims to use very strong deep features and do not update the model. However, because the domain specific information is not used, performance of these methods is always not as good as correlation filter based methods.

Various embodiments described herein address at least the aforementioned challenges and shortcomings of conventional approaches and present a real-time localization method for object tracking based on movement videos of the object, where each frame may be localized on a mosaicked search image.

SUMMARY

According to some embodiments, a method for tracking eye movement in a near-eye display is described. In these embodiments, a plurality of base images of an object or a portion thereof may be identified; a search image may be generated based at least in part upon at least some of the plurality of base images; a deep learning result may be generated at least by performing a deep learning process on a base image using a neural network in a deep learning mode; and a captured image may be localized to the search image at least by performing an image registration process on the captured image and the search image using a Kalman filter model and the deep learning result.

In some of these embodiments, wherein the object comprises a retina of a user, and the captured image representing at least a portion of the retina is localized with respect to the search image without using pupil-glint techniques that capture glint from the pupil in response to one or more input light patterns.

In some embodiments, generating the deep learning result comprises extracting a feature in a region in the captured image using a deep convolution neural network (DCNN). In addition, the feature may be converted into a plurality of features that comprises a first feature and a second feature. The region may be classified into a positive region or a negative region based at least in part upon the first feature. Regression or correction may be determined for the region based at least in part upon the second feature.

In some embodiments, to generate the deep learning result, a feature in a region in the captured image may be extracted using a deep convolution neural network (DCNN); and the feature may be converted into a plurality of features that comprises a first feature and a second feature.

In some of the immediately preceding embodiments, to generate the deep learning result, a first response map may be generated at least by convolving at least the first feature using one or more convolution layers in the DCNN; and the region may be classified into a positive region or a negative region based at least in part upon the first response map.

In some embodiments, to generate the deep learning result, a second response map may be generated at least by convolving the second feature using the one or more convolution layers or one or more different convolution layers in the DCNN; and regression or correction may be determined for a predicted location of the region using at least the second response map.

In some embodiments, localizing the captured image comprises embedding the deep learning process into a state transition model; and receiving the deep learning result at the Kalman filter model as one or more measurements using at least the state transition model, where the state transition model is used to determine a next position state at a next time point based at least in part upon a prior position state at a prior time point and at least one of process noise or a control vector of a state estimation model.

In some of the immediately preceding embodiments, to localize the captured image, a measurement at a next time point may be determined by using at least the Kalman filter model in the image registration process; interference of similar background or one or more similar features may be reduced at least by performing the image registration process; and the captured image may be localized to the search image in the search image using the Kalman filter model and the image registration process.

In some embodiments, to embed the deep learning process, one or more control vectors may be determined for the state transition model; process noise may be derived from a statistical distribution; and a time step may also be determined for the state transition model.

In some of the preceding embodiments, localizing the captured image in the search image using the Kalman filter model and the image registration process comprises performing a coarse registration for an entire frame of the captured image; and performing a fine registration for one or more features or feature points in an outer region around a region referenced in the coarse registration.

In addition or in the alternative, to perform the coarse registration for the entire frame of the captured image, the one or more features or the feature points in one or more regions in the entire frame of the captured image or the search image may be detected; and the captured image may be registered to the one or more regions in the entire frame.

In some of the immediately preceding embodiments, performing the fine registration for the one or more features or feature points in the outer region around a region referenced in the coarse registration comprises selecting a feature or feature point within an enlarged region that corresponding to the region that is referenced in the coarse registration; and matching the feature or the feature point with a corresponding feature or feature point in the outer region of the search image.

In some embodiments, performing the fine registration for the one or more features or feature points in the outer region around a region referenced in the coarse registration may further comprise localizing the captured image in the search image based at least in part upon a result of matching the feature or the feature point with a corresponding feature or feature point in the outer region of the search image.

Some embodiments are directed to a system for tracking eye movement in a near-eye display, comprising a processor, a scanning fiber assembly, and memory storing thereupon instructions, which, when executed by the processor, causes the processor to perform any of the aforementioned methods for tracking eye movement in a near-eye display.

Some embodiments are directed to a non-transitory computer-readable medium storing thereupon instructions which, when executed by a microprocessor, causes the microprocessor to perform any of the aforementioned methods for tracking eye movement in a near-eye display.

Summary Recitation of Some Embodiments of the Disclosure

1. A method for tracking eye movement in a near-eye display, comprising: identifying a plurality of base images of an object or a portion thereof; generating a search image based at least in part upon at least some of the plurality of base images; generating a deep learning result at least by performing a deep learning process on a base image using a neural network in a deep learning model; and localizing a captured image to the search image at least by performing an image registration process on the captured image and the search image using a Kalman filter model and the deep learning result.

2. The method of claim 1, wherein the object comprises a retina of a user, and the captured image representing at least a portion of the retina is localized with respect to the search image without using pupil-glint techniques that capture glint from the pupil in response to one or more input light patterns.

3. The method of claim 1, wherein generating the deep learning result comprises: extracting a feature in a region in the captured image using a deep convolution neural network (DCNN); and converting the feature into a plurality of features that comprises a first feature and a second feature.

4. The method of claim 3, wherein generating the deep learning result comprises: classifying the region into a positive region or a negative region based at least in part upon the first feature.

5. The method of claim 3, wherein generating the deep learning result comprises: determining regression for the region based at least in part upon the second feature.

6. The method of claim 4, wherein classifying the region is based at least in part upon the first feature but not on the second feature.

7. The method of claim 5, wherein determining the regression for the region is based at least in part upon the second feature but not on the first feature.

8. The method of claim 1, wherein generating the deep learning result comprises: extracting a feature in a region in the captured image using a deep convolution neural network (DCNN); and converting the feature into a plurality of features that comprises a first feature and a second feature.

9. The method of claim 8, wherein generating the deep learning result further comprises: generating a first response map at least by convolving at least the first feature using one or more convolution layers in the DCNN; and classifying the region into a positive region or a negative region based at least in part upon the first response map.

10. The method of claim 9, wherein classifying the region is based at least in part upon the first response map but not upon the second response map.

11. The method of claim 9, wherein generating the deep learning result further comprises: generating a second response map at least by convolving the second feature using the one or more convolution layers or one or more different convolution layers in the DCNN; and determining regression or correction for a predicted location of the region using at least the second response map.

12. The method of claim 11, wherein determining the regression or the correction is based at least in part upon the second response map but not upon the first response map.

13. The method of claim 8, wherein generating the deep learning result further comprises: compensating for the DCNN and/or the deep learning model using at least an image registration process.

14. The method of claim 1, wherein localizing the captured image comprises: embedding the deep learning process into a state transition model.

15. The method of claim 14, wherein localizing the captured image comprises: receiving the deep learning result at the Kalman filter model as one or more measurements using at least the state transition model.

16. The method of claim 14, where the state transition model is used to determine a next position state at a next time point based at least in part upon a prior position state at a prior time point and at least one of process noise or a control vector of a state estimation model.

17. The method of claim 14, wherein localizing the captured image comprises: determining a measurement at a next time point by using at least the Kalman filter model in the image registration process.

18. The method of claim 17, wherein localizing the captured image comprises: reducing interference of similar background or one or more similar features at least by performing the image registration process.

19. The method of claim 17, wherein localizing the captured image comprises: localizing the captured image in the search image using the Kalman filter model and the image registration process.

20. The method of claim 14, wherein embedding the deep learning process comprises: determining one or more control vectors for the state transition model; deriving process noise from a statistical distribution; and determining a time step for the state transition model.

21. The method of claim 20, wherein the time step comprises a temporal duration between two immediately neighboring frames captured by an augmented reality system, and the state transition model is used to determine a next position state at a next time point based at least in part upon a prior position state at a prior time point and at least one of process noise or a control vector of a state estimation model.

22. The method of claim 20, wherein the process noise is derived from the statistical distribution, and the statistical distribution includes a zero-mean multivariate normal distribution.

23. The method of claim 19, wherein localizing the captured image in the search image using the Kalman filter model and the image registration process comprises: performing a coarse registration for an entire frame of the captured image; and performing a fine registration for one or more features or feature points in an outer region around a region referenced in the coarse registration.

24. The method of claim 23, wherein performing the coarse registration for the entire frame of the captured image comprises: detecting the one or more features or the feature points in one or more regions in the entire frame of the captured image or the search image.

25. The method of claim 24, wherein performing the coarse registration for the entire frame of the captured image comprises: registering the captured image to the one or more regions in the entire frame.

26. The method of claim 23, wherein performing the fine registration for the one or more features or feature points in the outer region around a region referenced in the coarse registration comprises: selecting a feature or feature point within an enlarged region that corresponding to the region that is referenced in the coarse registration.

27. The method of claim 26, wherein performing the fine registration for the one or more features or feature points in the outer region around a region referenced in the coarse registration comprises: matching the feature or the feature point with a corresponding feature or feature point in the outer region of the search image.

28. The method of claim 25, wherein performing the fine registration for the one or more features or feature points in the outer region around a region referenced in the coarse registration comprises: localizing the captured image in the search image based at least in part upon a result of matching the feature or the feature point with a corresponding feature or feature point in the outer region of the search image.

29. The method of claim 1, wherein the deep learning model comprises a modified Siamese region proposal network, wherein the deep learning model comprises a deep convolution neural network and an image registration process, and multiple different captured images captured at different time periods are localized based on the search image, rather than on multiple search images.

30. The method of claim 1, wherein the deep learning model comprises a modified Siamese region proposal network, wherein captured images are localized to the search image using one or more target positions in two orthogonal directions, rather than using bounding boxes.

31. The method of claim 1, wherein the search image is generated by stitching, mosaicking, or combining at least some of the plurality of base images into the search image.

32. The method of claim 1, wherein the deep learning model comprises a deep convolution neural network and an image registration process, and the deep learning model invokes only the deep convolution neural network but not the image registration process when one or more measurements of the Kalman filter model drop out until a next successful registration of a first captured image.

33. A system for tracking eye movement in a near-eye display, comprising a processor, a scanning fiber assembly, and memory storing thereupon instructions, which, when executed by the processor, causes the processor to perform any of the methods 1-32 for tracking eye movement in a near-eye display.

34. A non-transitory computer-readable medium storing thereupon instructions which, when executed by a microprocessor, causes the microprocessor to perform any of the methods 1-28 for tracking eye movement in a near-eye display.

BRIEF DESCRIPTION OF THE SEVERAL VIEWS OF THE DRAWINGS

FIGS. 16A-I illustrate example configurations of an array of micro-projectors and coupling the array of micro-projectors with an optical system in one or more embodiments.

DETAILED DESCRIPTION

Figure 1:
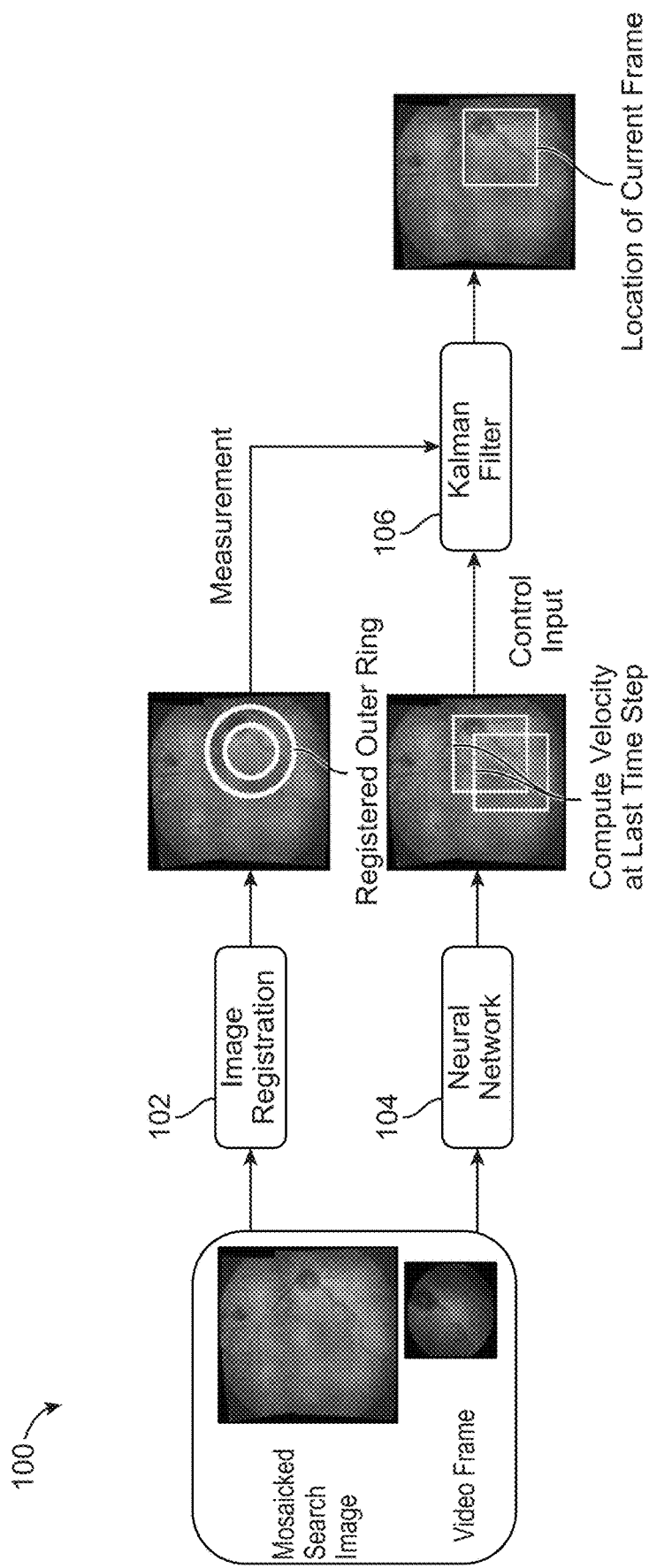
FIG. 1 illustrates a high block diagram of a method or system for eye tracking in near-eye displays in some embodiments.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with eyewear, including spatial computing headsets, and hinge systems for temple arms of eyewear have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with virtual reality (VR), augmented reality (AR), mixed reality (MR), and extended reality (XR) systems have not been shown or described in detail to avoid unnecessarily obscuring descriptions of the embodiments. It shall be note that the terms virtual reality (VR), augmented reality (AR), mixed reality (MR), and extended reality (XR) may be used interchangeably in the present disclosure to denote a method or system for displaying at least virtual contents to a user via at least a wearable optics assembly 12 described herein.

Unless the context requires otherwise, throughout the specification and claims which follow, the word "comprise" and variations thereof, such as, "comprises" and "comprising" are to be construed in an open, inclusive sense that is as "including, but not limited to."

Example devices, methods, and systems are described herein. It should be understood the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood aspects of the present disclosure, as generally described herein, and illustrated in the figures, can be arranged, substituted, combined, separated, and designed in a wide variety of different configurations, all of which are explicitly contemplated herein.

Furthermore, the particular arrangements shown in the figures shall not be viewed as limiting. It should be understood other embodiments may include more or less of each element shown in a given Figure. Further, some of the illustrated elements may be combined or omitted. Yet further, an example embodiment may include elements not illustrated in the figures. As used herein, with respect to measurements, "about" means +/−5%.

Head Mounted Displays (HMD) have been explored for a wide range of applications in the fields of 3D virtual and augmented environments. Accurate and high-speed eye tracking is important to enable key scenarios in HMD, e.g., the field of view (FOV) and resolution trade-off through fovea-contingent display schemes and novel interactive interfaces for people. Eye-trackers embedded in HMD can be divided into invasive methods, e.g., scleral coil and non-invasive video-based methods, the latter being more common. Current video-based methods mainly use different features of the eyeball, such as iris, pupil and glint, and pupil-glint methods are the most widely used. These methods have an average tracking error of 0.5°-1°, while the tracking resolution of such features is around 0.7°-1° per pixel. It is not easy to further improve the accuracy beyond the tracking resolution.

Besides using features of the eye surface, retina images are also utilized for eye-tracking in medical field, such as eye-tracking scanning laser ophthalmoscopes (SLOs). They leverage the scanning distortion for retinal movement estimation in small FOV high-resolution images, however this technique is designed for small saccades and SLOs are not easily integrated into an HMD. Retinal-based eye tracking in HMD has its own advantages: a higher tracking resolution without advanced sensors, linear gaze estimation models and direct localization of the fovea on the retina. Furthermore, retinal tracking provides a wide range of medical applications with the HMD.

Figure 12A:
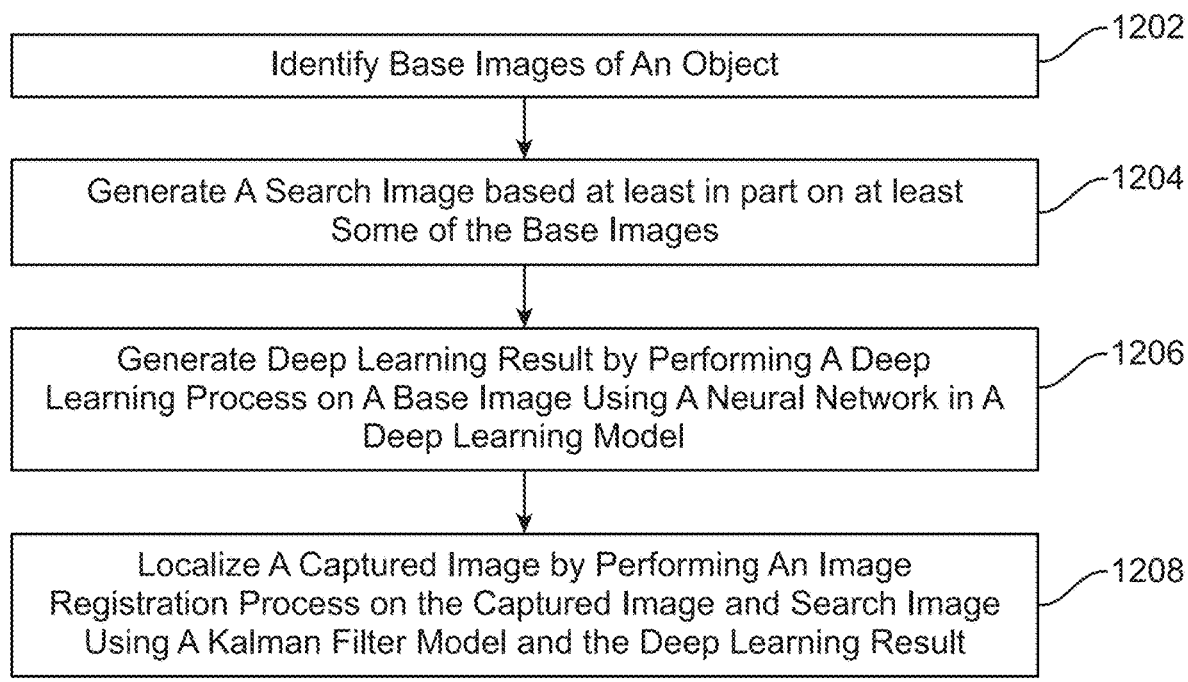
FIG. 12A illustrates a high-level block diagram for eye tracking in near-eye displays in one or more embodiments.

Various embodiments present a real-time localization method for object tracking based on movement videos of the object, where each frame may be localized on a mosaicked search image. FIG. 12A illustrates a high-level block diagram for eye tracking in near-eye displays in one or more embodiments.

In these embodiments, a plurality of base or template images of an object or a portion thereof (e.g., a retina or a portion thereof) may be identified at 1202. It shall be noted that the term "template image" and "base image" may be used interchangeably throughout this disclosure to distinguish from, for example, a search image that may be constructed with some or all of the plurality of base images. In some of these embodiments, the plurality of base images may be captured by using, for example, a scanning fiber endoscope (SFE) while a base image may be captured by any image capturing device in some other embodiments.

A search image may be generated at 1204 based at least in part upon at least some of the plurality of base images. For example, a search image may be mosaicked, stitched, or otherwise combined from multiple base images that may be captured with the same or different image capturing devices. A base image may have a lower resolution and/or a narrower field of view than a search image in some embodiments. A search image generated at 1204 may be further used for localizing and thus tracking the object that moves. It shall be noted that although some embodiments are described herein with reference to a retina of a user, various techniques described herein may also be applied to other objects as described below.

In some embodiments, once a search image is constructed, any subsequently captured image frames (e.g., by an eye tracking device of an XR system) may be registered with respect to the same search image, rather than with respect to multiple images as in some conventional approaches. Although in some other embodiments, subsequently captured image frames (e.g., by an eye tracking device of an XR system) may be registered with respect to multiple search images described herein.

Deep learning results may be generated at 1206 at least by performing a deep learning process on a base image or a captured image using a neural network in a deep learning model. With the deep learning result generated at 1206, a captured image may be localized at 1208 at least by performing an image registration process on the captured image and/or the search image with a Kalman filter model and the deep learning result. In these embodiments, the captured image representing at least a portion of the retina is localized with respect to the search image without using pupil-glint techniques that capture glint from the pupil in response to one or more input light patterns. More details about some of the block diagram illustrated in FIG. 12A are described below.

Figure 12B:
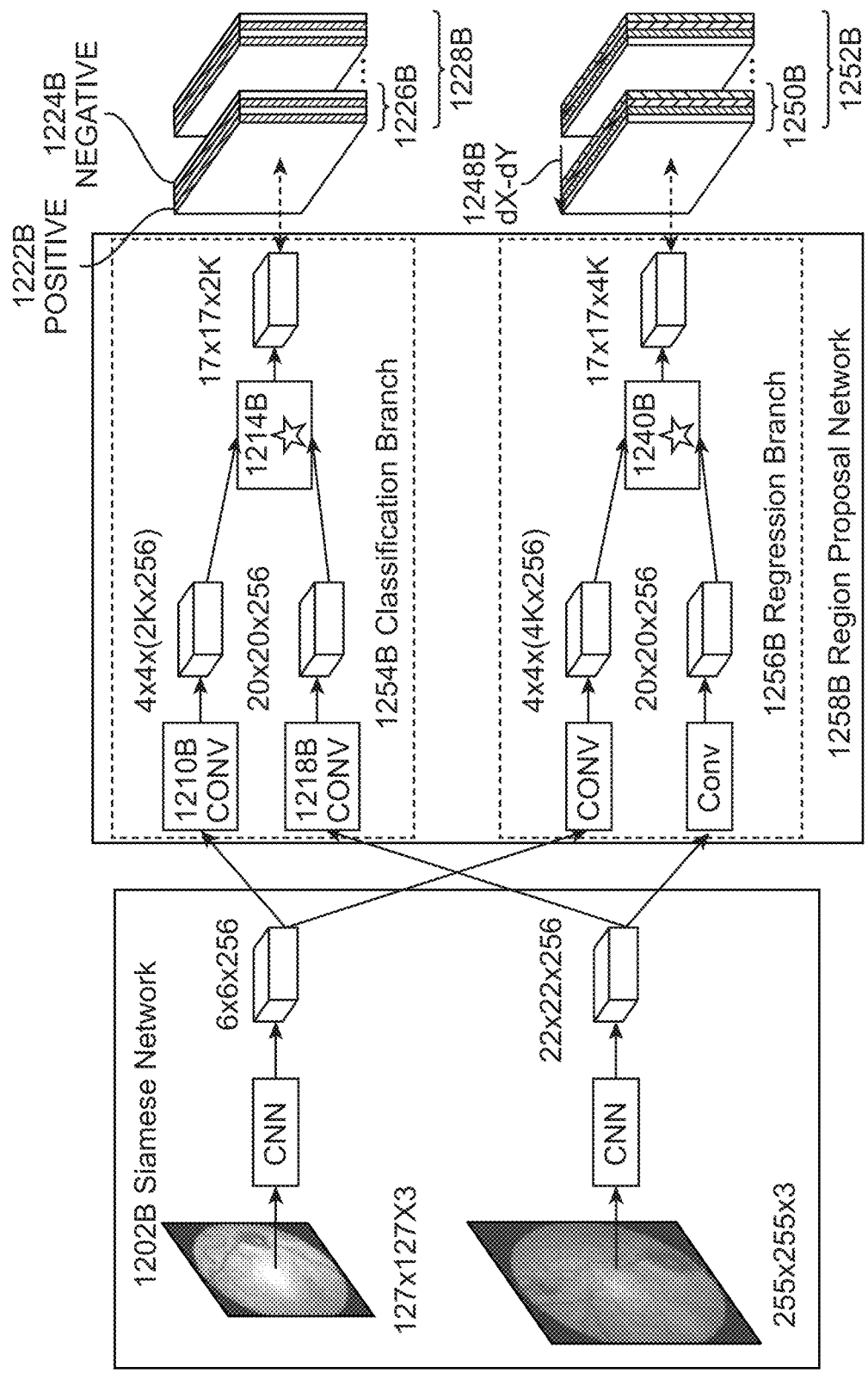
FIG. 12B illustrates an example Region Proposal Network (RPN) in one or more embodiments.

FIG. 12B illustrates an example Region Proposal Network (RPN) in one or more embodiments. More specifically, the example RPN network includes a Siamese subnetwork 1202B and a region proposal network 1258B that are jointly used to perform feature extraction that generates the first output having positive 1222B and negative 1224B region(s), feature(s), point(s), location(s), etc. In the first output, 1226B represents a group, and the first output includes multiple groups 1228B. The Siamese subnetwork 1202B and the region proposal network 1258B may further perform the feature extraction that further generates the second output having a plurality 1252B of individual groups 1250B.

Some embodiments may be trained offline with image pairs, which can take advantage of the large-scale training data, such as Youtube-BB. Ablation study shows that the more data can help to get even better performance. In addition or in the alternative, some embodiments find that the region proposal subnetwork usually predicts accurate scale and ratio of proposals to get compact bounding boxes as in FIG. 12E.

Figure 12C:
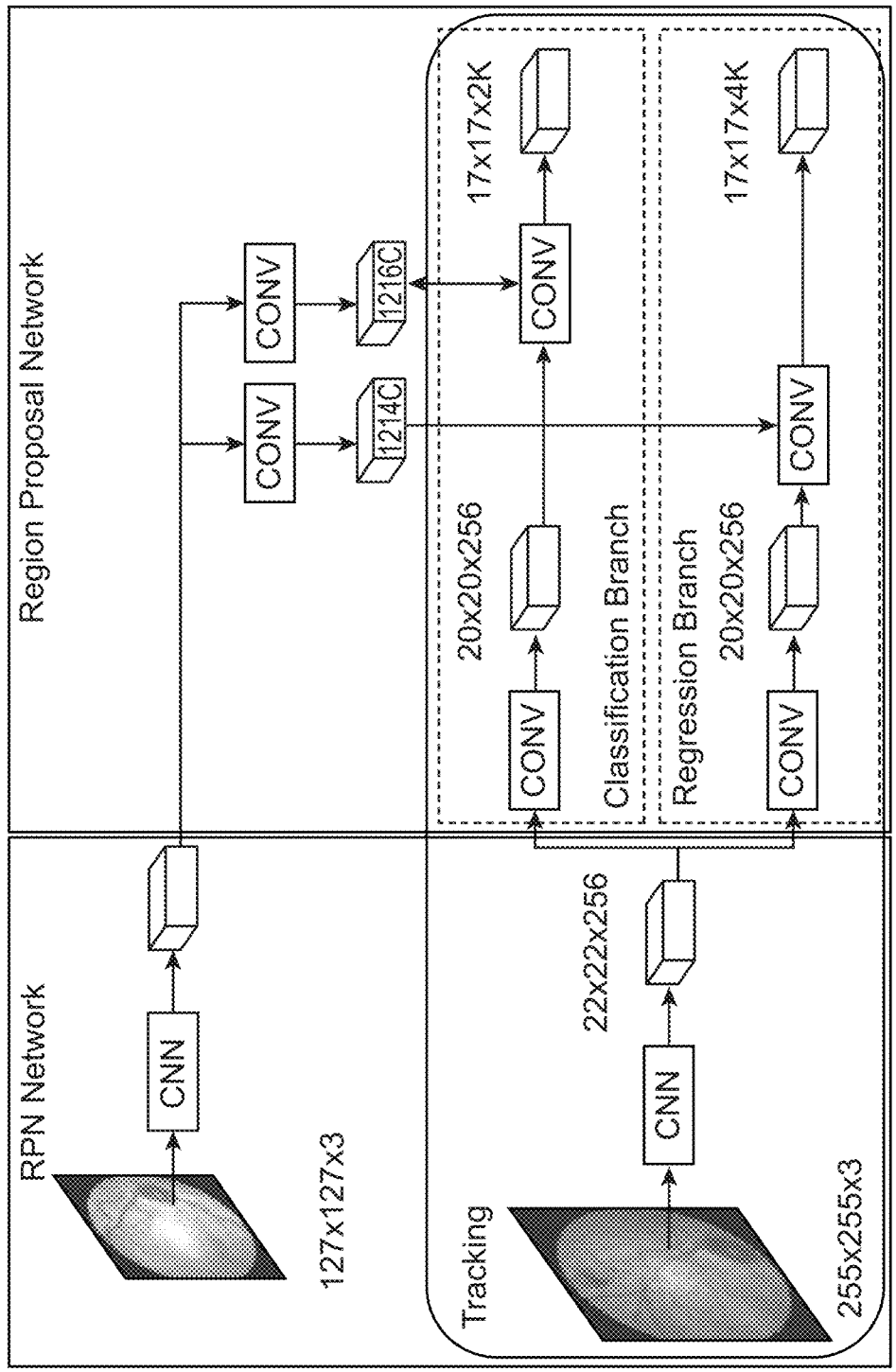
FIG. 12C illustrates another example tracking as one-shot detection in one or more embodiments.
Figure 12D:
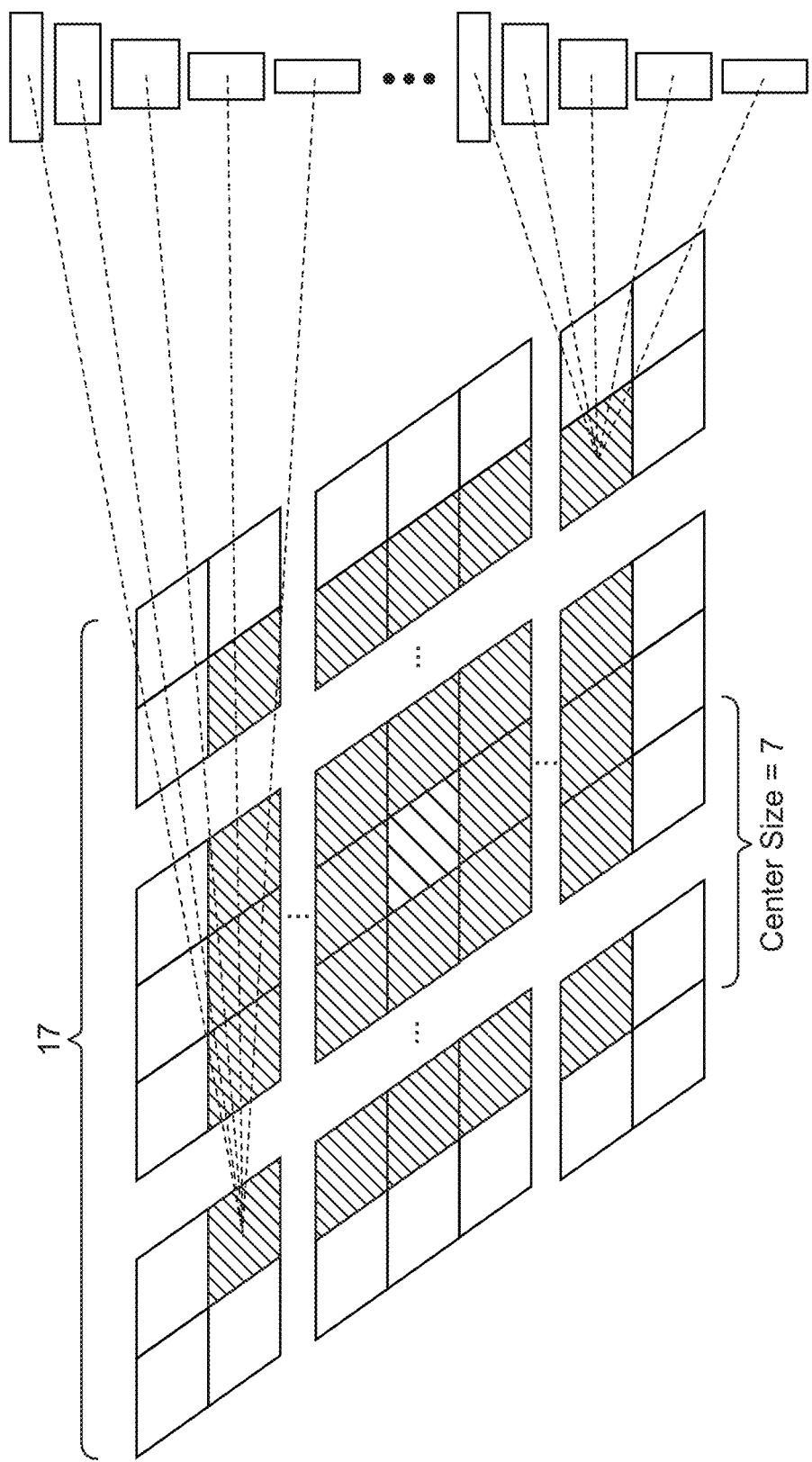
FIG. 12D illustrates an example center size in an RPN feature map in one or more embodiments.
Figure 12E:
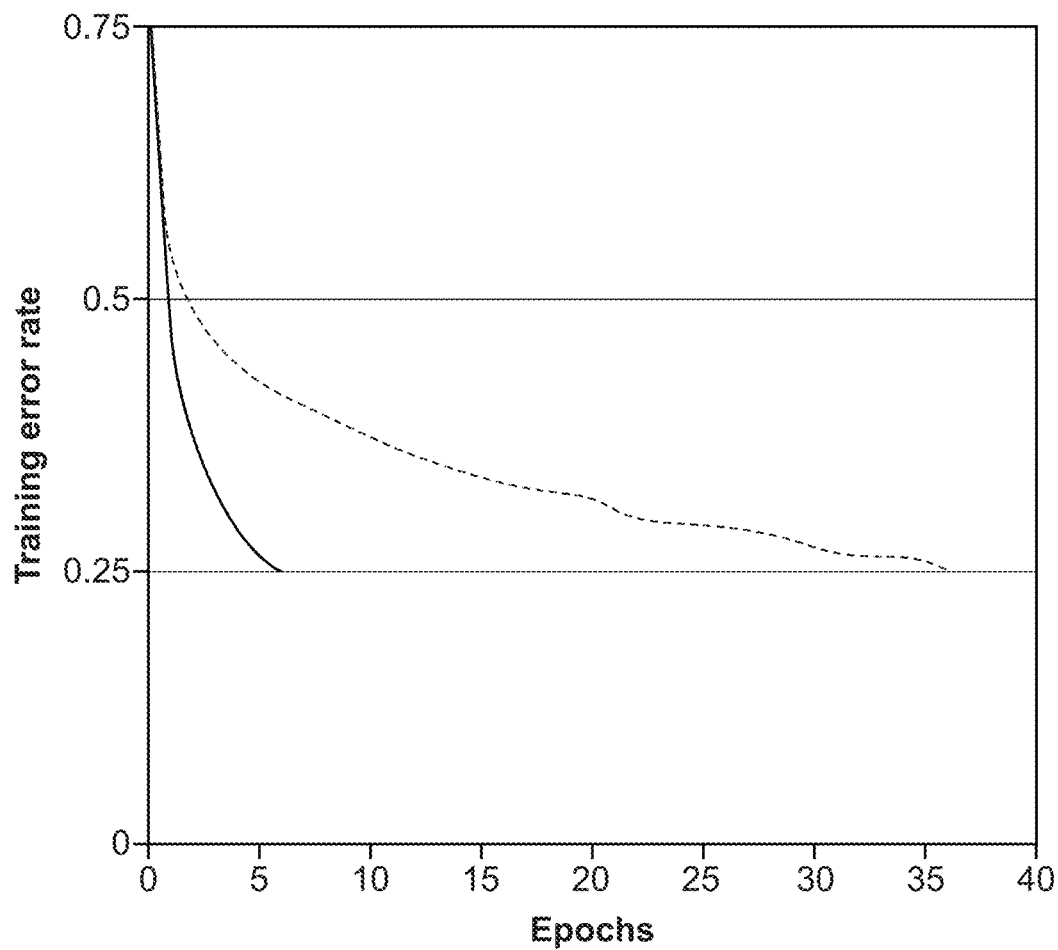
FIG. 12E illustrates some example training error rates of a four-layer convolutional neural network with ReLU (rectified linear unit) in one or more embodiments.

FIG. 12E illustrates that a four-layer convolutional neural network with ReLUs (solid line) reaches a 25% training error rate on CIFAR-10 six times faster than an equivalent network with tanh neurons (dashed line). The learning rates for each network were chosen independently to make training as fast as possible. No regularization of any kind was employed. The magnitude of the effect demonstrated here varies with network architecture, but networks with ReLUs consistently learn several times faster than equivalents with saturating neurons.

Some embodiments illustrated in FIG. 12B may employ the Siamese region proposal network (Siamese-RPN) which is end-to-end trained off-line with large-scale image pairs for the tracking task. During online tracking, the proposed framework is formulated as a local one-shot detection task, which can refine the proposal to discard the expensive multi-scale test. It achieves leading performance in VOT2015, VOT2016 and VOT2017 real-time challenges with the speed of 160 FPS, which proves its advantages in both accuracy and efficiency.

Region Proposal Network (RPN) is first proposed in Faster R-CNN. Before RPN, traditional proposal extraction methods are time consuming. For example, Selective Search needs 2 seconds to process one image. Besides, these proposals are not good enough for detection. The enumeration of multiple anchors and sharing convolution features make the proposal extraction method time efficient while achieving high quality. RPN is capable of extracting more precise proposals due to the supervision of both foreground-background classification and bounding box regression. There are several variants of Faster R-CNN which employs RPN. R-FCN takes component's position information into account and FPN employs a feature pyramid network to improve the performance of tiny object detection. In contrast to two stage detectors, the improved versions of RPN, such as SSD and YOLO9000 are efficient detectors. RPN has many successful applications in detection because of its speed and great performance, however, it hasn't been fully exploited in tracking.

In FIG. 12B, the region proposal subnetwork 1258B lies in the middle, which has two branches, one branch 1254B for classification and the other branch 1256B for regression. Pair-wise correlation is adopted to obtain the output of two branches (1228B and 1252B). Details of these two output feature maps (1226B, 1228B, 1250B, and 1252B) are illustrated. In the classification branch 1254B, an output feature map (1226B and 1228B) has 2k channels which corresponding to foreground and background of k anchors. In regression branch 1256B, an output feature map (1250B and 1252B) has 4k channels which corresponding to two coordinates (dx in the x-direction and dy in the y-direction, instead of having a bounding box with dw in the width direction and dl in the length direction in addition to dx and dy) used for proposal refinement of k anchors. In FIG. 12B, * 1240B and 1214B denote a correlation operator.

Figure 2:
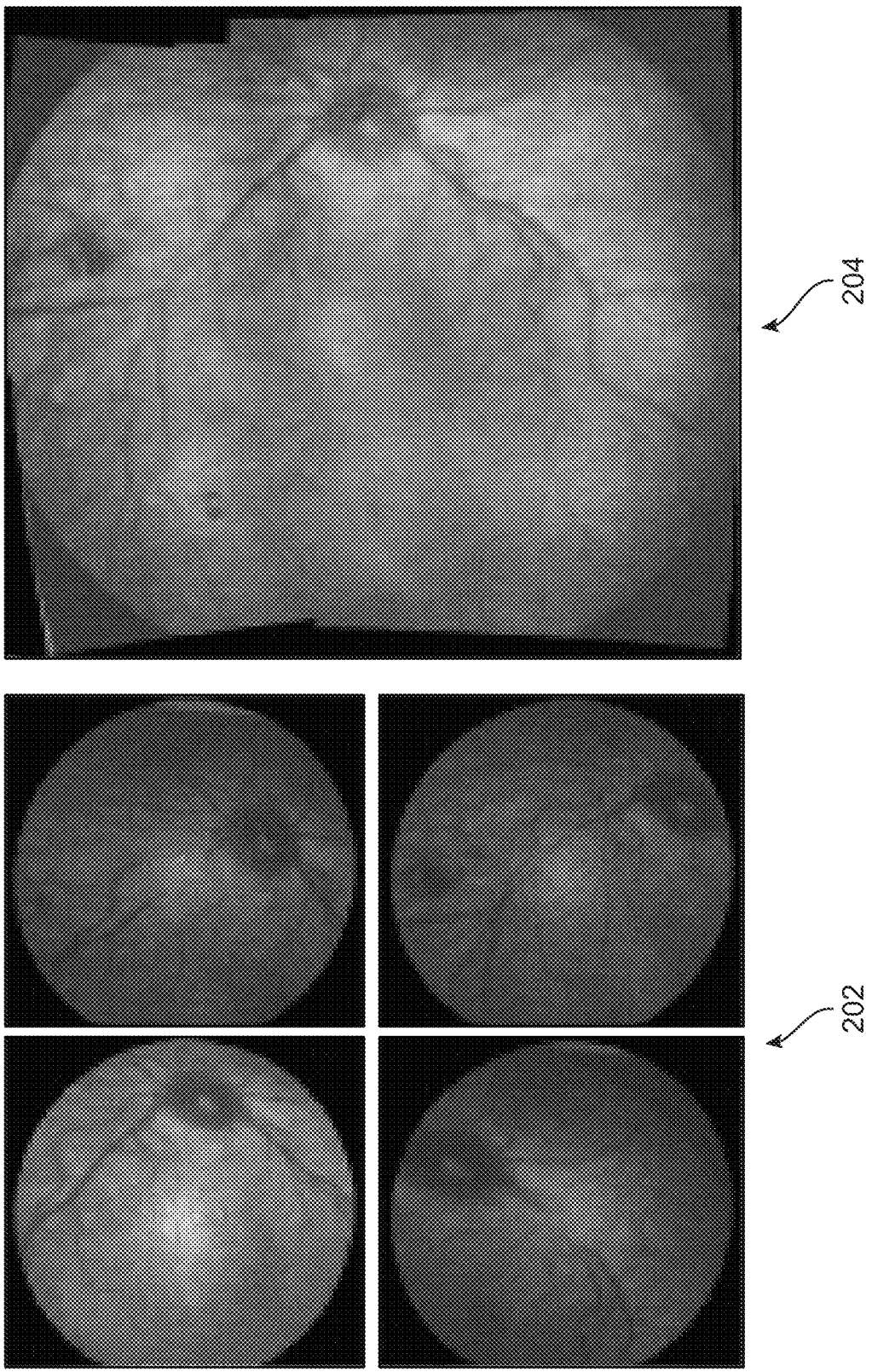
FIG. 2 illustrates some example retina frames, base frames, or template frames captured by a scanning fiber endoscope (SFE) and a mosaicked baseline or search image in some embodiments.

Some embodiments describe the proposed Siamese-RPN framework in detail. As shown in FIG. 2, the proposed framework consists of a Siamese subnetwork for feature extraction and a region proposal subnetwork for proposal generation. Specifically, there are two branches in RPN subnetwork, one is in charge of the foreground-background classification, another is used for proposal refinement. Image patches including the target objects are fed into the proposed framework and the whole system is trained end-to-end.

In Siamese network, some embodiments adopt a fully convolution network without padding. Let $L_\tau$ denote the translation operator $(L_\tau x)[u]=x[u-\tau]$, then all paddings are removed to satisfy the definition of fully convolution with stride k:

$$h(L_{k\tau}x)=L_k h(x) \tag{1A}$$

Some embodiments use the modified AlexNet, where the groups from conv2 and conv4 are removed. The Siamese feature extraction subnetwork consists of two branches. One is called the template branch which receives target patch in the historical frame as input (denoted as z). The other is called the detection branch which receives target patch in the current frame as input (denoted as x). The two branches share parameters in CNN so that the two patches are implicitly encoded by the same transformation which is suitable for the subsequent tasks. For the ease of illustration and description, some embodiments denote $\phi(z)$ and $\phi(x)$ as the output feature maps of Siamese subnetwork.

The region proposal subnetwork consists of a pair-wise correlation section and a supervision section. The supervision section has two branches, one for foreground-background classification and the other for proposal regression. If there are k anchors, network needs to output 2k channels for classification and 4k channels for regression. So the pair-wise correlation section first increase the channels of $\phi(z)$ to two branches $[\phi(z)]_{cls}$ and $[\phi(z)]_{reg}$ which have 2k and 4k times in channel respectively by two convolution layers. $\phi(x)$ is also split into two branches $[\phi(x)]_{cls}$ and $[\phi(x)]_{reg}$ by two convolution layers but keeping the channels unchanged. $[\phi(z)]$ is served as the correlation kernel of $[\phi(x)]$ in a "group" manner, that is to say, the channel number in a group of $[\phi(z)]$ is the same as the overall channel number of $[\phi(x)]$. The correlation is computed on both the classification branch and the regression branch:

$$A_{w \times h \times 2k}^{cls}=[\varphi(x)]_{cls}*[\varphi(z)]_{cls}$$

$$A_{w \times h \times 4k}^{cls}=[\varphi(x)]_{reg}*[\varphi(z)]_{reg} \tag{2A}$$

The template feature maps $[\varphi(z)]_{cls}$ and $[\phi(z)]_{reg}$ are used as kernels and * denotes the convolution operation. As shown in FIG. 2, each point in $A_{w \times h \times 2k}^{cls}$ denoted as $(\hat{w}, \hat{h}:)$ contains a 2k channel vector, which represents for negative and positive activation of each anchor at corresponding location on original map. Softmax loss is adopted to supervise the classification branch. Similarly, each point in A reg w×h×4k denoted as $\hat{w},\hat{h}:)$ contains a 4k channel vector, which represents for dx, dy, dw, dh measuring the distance between anchor and corresponding groundtruth. When training the network with several anchors, some embodiments employ the loss function that is used in Faster R-CNN. Loss for classification is the cross-entropy loss and some embodiments adopt smooth L1 loss with normalized coordinates for regression. Let $A_x$, $A_y$, $A_w$, $A_h$ respectively denote center point and shape of the anchor boxes and let $T_x$, $T_y$, $T_w$, $T_h$ respectively denote those of the ground truth boxes, the normalized distance is:

$$\delta[0] = \frac{T_x - A_x}{A_w}, \delta[1] = \frac{T_y - A_y}{A_h} \tag{3A}$$

$$\delta[2] = \ln\frac{T_w}{A_w}, \delta[3] = \ln\frac{T_h}{A_h}$$

Then they pass through smooth L1 loss which can be written as below, $$\text{smooth}_{L_i}(x, \sigma) = \begin{cases} 0.5\sigma^2 x^2, & |x| < \frac{1}{\sigma^2} \\ |x| - \frac{1}{2\sigma^2}, & |x| \geq \frac{1}{\sigma^2} \end{cases} \quad (4A)$$

Finally the loss function may be optimized:

$$\text{loss} = L_{cls} + \lambda L_{reg} \quad (5A)$$

where $\lambda$ is hyper-parameter to balance the two parts. $L_{cls}$ is the cross-entropy loss and $L_{reg}$ is:

$$L_{reg} = \Sigma_{i=0}^{3} \text{smooth}_{L_i}(\delta[i], \sigma) \quad (6)$$

During the training phase, sample pairs are picked from ILSVRC with a random interval and from Youtube-BB continuously. The template and the detection patches are extracted from two frames of the same video. Some embodiments train Siamese-RPN end-to-end using Stochastic Gradient Descent (SGD) after the Siamese subnetwork being pretrained using Imagenet. Because of the need of training regression branch, some data augmentations are adopted including affine transformation.

Some embodiments choose fewer anchors in tracking task than detection task by noticing that the same object in two adjacent frames won't change much. So only one scale with different ratios of anchor is adopted and the anchor ratios some embodiments adopted may be [0.33, 0.5, 1, 2, 3].

The strategy to pick positive and negative training samples is also important in this framework. The criterion used in object detection task is adopted here that Some embodiments use IoU together with two thresholds th_hi and th_lo as the measurement. Positive samples are defined as the anchors which have IoU>th_hi with their corresponding ground truth. Negative ones are defined as the anchors which satisfy IoU<th_lo. Some embodiments set th_lo to 0.3 and th_hi to 0.6. Some embodiments also limit at most 16 positive samples and totally 64 samples from one training pair.

In this subsection, some embodiments firstly formulate the tracking task as a local one-shot detection task. Afterwards, the inference phase under this interpretation is analyzed in detail and simplified to get a speed up. At last, some specific strategies are introduced to make the framework suitable for the tracking task.

Some embodiments consider one-shot detection as a discriminative task. Its objective is to find the parameters W that minimize the average loss L of a predictor function $\psi(x; W)$. It is computed over a dataset of n samples x i and corresponding labels $\ell$ i:

$$\min_{W} \frac{1}{n} \sum_{i=1}^{n} \mathcal{L}(\psi(x_i; W), \ell_i) \quad (7A)$$

One-shot learning is aiming to learn W from a single template z of the class of interest. The challenge in discriminative one-shot learning is to find a mechanism to incorporate category information in the learner, i.e., learning to learn. To address the challenge, Some embodiments use a method to learn the parameters W of the predictor from a single template z using a meta-learning process, i.e., a feed-forward function $\omega$ that maps (z; W') to W. Let $z_i$ be template samples in one batch then the problem can be formulated as:

$$\min_{W'} \frac{1}{n} \sum_{i=1}^{n} \mathcal{L}(\psi(x_i; w(z_i; W')), \ell_i) \quad (8A)$$

As the same above, let z denote for the template patch, x for the detection patch, function $\phi$ for the Siamese feature extraction subnetwork and function $\zeta$ for the region proposal subnetwork then the one-shot detection task can be formulated as:

$$\min_{W} \frac{1}{n} \sum_{i=1}^{n} \mathcal{L}(\zeta(\varphi(x_i; W)), \ell_i) \quad (9)$$

Some embodiments may now reinterpret the template branch in Siamese subnetwork as training parameters to predict the kernel of the local detection task, which is typically the learning to learn process. In this interpretation, the template branch is used to embed the category information into the kernel and the detection branch performs detection using the embedded information. During the training phase, the meta-learner doesn't need any other supervision except the pairwise bounding box supervision. In the inference phase, Siamese framework is pruned only leaving the detection branch except the initial frame thus leading to high speed. The target patch from the first frame is sent into the template branch and the detection kernel is pre-computed so that some embodiments can perform one-shot detection in other frames. Because the local detection task is based on the category information only given by the template on initial frame, it can be viewed as one-shot detection as shown in FIG. 12C. In FIG. 12C, 1214C represents the weight for regression; 1216C represent the weight for classification; cony represents a convolution layer; and CNN represents a connected neural network. Various numbers (e.g., 17×17×2K) represents the dimensionality of a dataset (e.g., a feature map).

Figure 3:
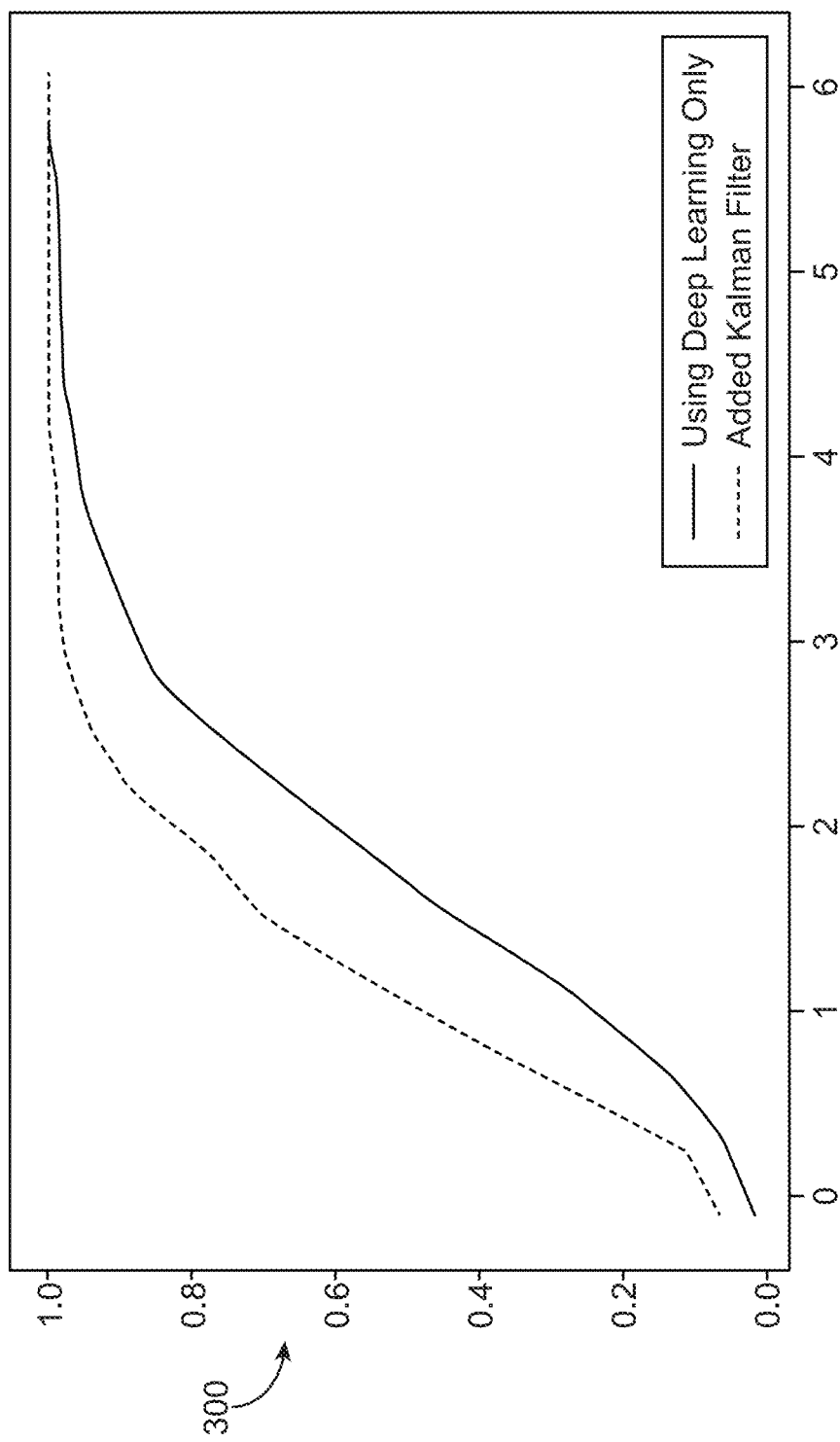
FIG. 3 illustrates an example cumulative distribution function (CDF) of retina tracking errors in degrees over 400 frames in some embodiments.

Some embodiments regard the template branches' outputs as the kernels for local detection. Both the kernels are pre-computed on the initial frame and fixed during the whole tracking period. With the current feature map convolved by the pre-computed kernels, the detection branch performs online inference as one-shot detection as shown in FIG. 3. The forward pass on the detection branch is performed to obtain the classification and regression output, thus getting the top M proposals. Specifically, after the notation some embodiments defined in Eq. 2, these embodiments denote the classification and regression feature map as the point sets:

$$A_{w \times h \times 2k}^{cls} = \{(x_i^{cls}, y_j^{cls}, c_l^{cls})\} \quad (10A)$$

where $i \in [0,w), j \in [0,h), l \in [0,2k)$ $$A_{w \times h \times 4k}^{cls} = \{(x_i^{reg}, y_j^{reg}, dx_p^{reg}, dy_p^{reg}, dw_p^{reg}, dh_p^{reg})\} \quad (11A)$$

where $i \in [0,w), j \in [0,h), p \in [0,k)$

Since the odd channels on the classification feature maps represent the positive activation, some embodiments collect the top K points in all $A_{w \times h \times 2k}^{cls}$ where l is an odd number and denotes the point set as CLS*={$(x_i^{cls}, y_j^{cls}, c_l^{cls})_{i \in I, j \in J, l \in L}$} where I, J, L are some example index sets. Variables i and j encode the location of corresponding anchor respectively, and l encode the ratio of corresponding anchor, so some embodiments ay derive the corresponding anchor set as ANC*={$(x_i^{an}, y_j^{an}, w_l^{an}, h_l^{an})_{i \in I, j \in J, l \in L}$}. Moreover, some embodiments find the activation of ANC* on $A_{w \times h \times 4k}^{cls}$ to get the corresponding refinement coordinates as $REG^* = \{(x_i^{reg}, y_j^{reg}, dx_l^{reg}, dy_l^{reg}, dw_l^{reg}, dh_l^{reg})_{i \in I, j \in J, l \in L}\}$. Afterwards, the refined top K proposals set $PRO^* = \{(x_i^{pro}, y_j^{pro}, w_l^{pro}, h_l^{pro})\}$ can be obtained by following equations Eq. 12:

$$x_i^{pro} = x_i^{an} + dx_i^{reg} * w_l^{an}$$

$$y_j^{pro} = y_j^{an} + dy_i^{reg} * h_l^{an}$$

$$w_l^{pro} = w_l^{an} * e^{dwl}$$

$$h_l^{pro} = h_l^{an} * e^{dhl} \quad (12)$$

After the top K proposals are generated, some embodiments use some proposal selection strategy to make them suitable for the tracking task and will be discussed in the next section.

Figure 4:
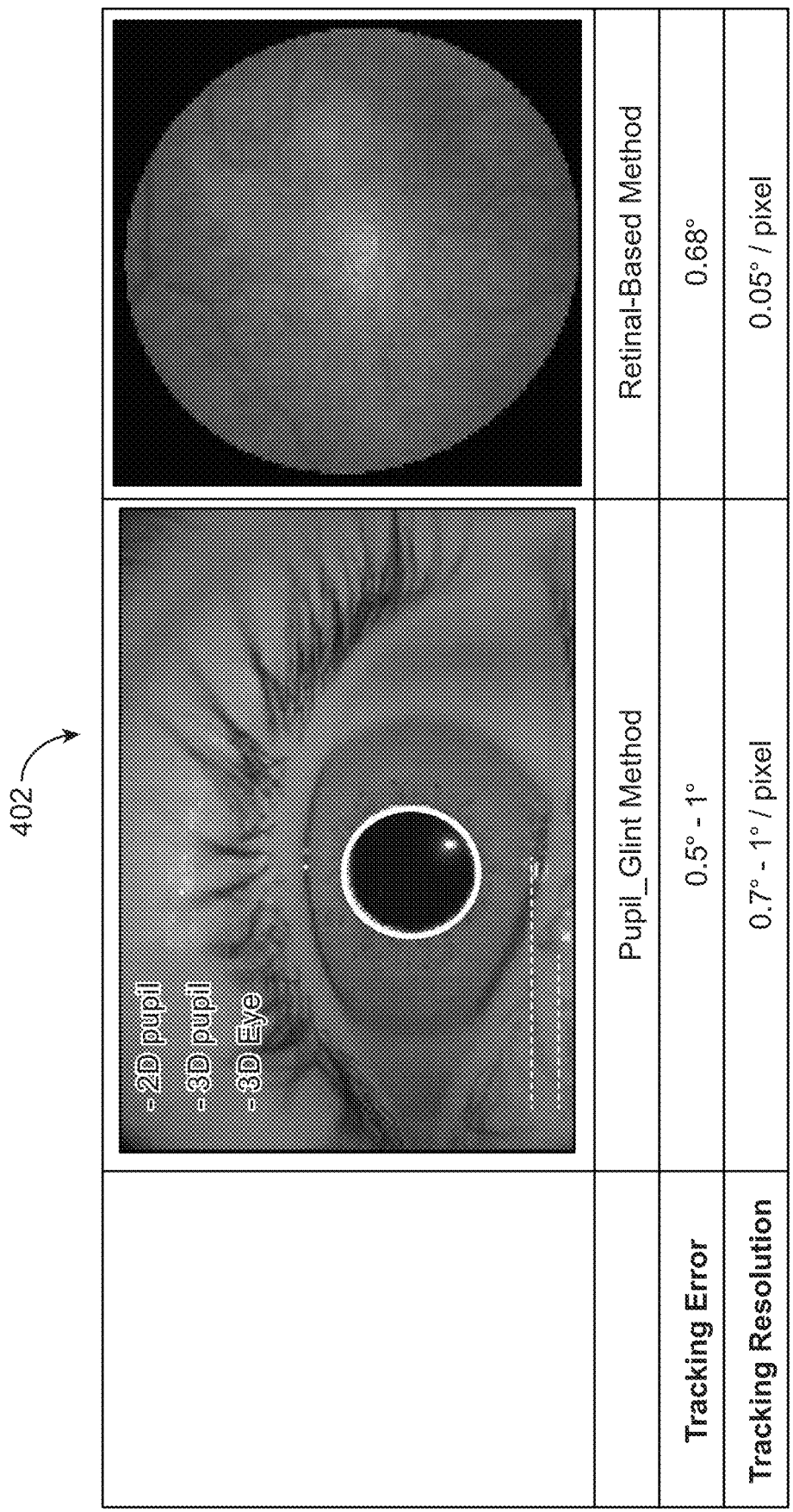
FIG. 4 illustrates some example benchmark results of an example retinal-based tracking compared to conventional pupil-glint methods in some embodiments.

To make the one-shot detection framework suitable for tracking task, some embodiments may adopt two strategies to select the proposals. The first proposal selection strategy is discarding the bounding boxes generated by the anchors too far away from the center. For example, some embodiments only keep the center g×g subregion on the $A_{w \times h \times 4k}^{cls}$ classification feature map to get g×g×k anchors instead of m×n×k anchors. Because the nearby frames always don't have large motion, the discard strategy can efficiently remove the outliers. FIG. 4 is an illustration of choosing target anchors whose distances are no more than 7 from the center in the classification feature map.

The second proposal selection strategy is that some embodiments use cosine window and scale change penalty to re-rank the proposals' score to get the best one. After the outliers are discarded, a cosine window is added to suppress the large displacement and then a penalty is added to suppress large change in size and ratio:

$$penalty = e^{k * max\left(\frac{r}{r'}, \frac{r'}{r}\right) * max\left(\frac{s}{s'}, \frac{s'}{s}\right)} \quad (13A)$$

Here k is a hyper-parameter. r represents the proposal's ratio of height and width and r' represents that of last frame. s and s' represent the overall scale of the proposal and last frame, which is computed as below:

$$(w+p) \times (h+p) = s^2 \quad (14A)$$

where w and h represent the width and height of the target, and p represents the padding which is equal to (w+h)/2. After these operations, the top K proposals are re-ranked after multiply the classification score by the temporal penalty. Non-maximum-suppression (NMS) is performed afterwards to get the final tracking bounding box. After the final bounding box is selected, target size is updated by linear interpolation to keep the shape changing smoothly.

FIG. 12D illustrates an example center size in an RPN feature map in one or more embodiments. More specifically, FIG. 12D illustrates center size 7 in RPN feature map, each grid represents encoded feature of k anchors at corresponding position. For example, there are 2k channels representing foreground and background activations in classification feature map. The center size of anchors indicates the search region of the model.

Regarding the Alexnet described above, some embodiments trained one of the largest convolutional neural networks to date on the subsets of ImageNet used in the ILSVRC-2010 and ILSVRC-2012 competitions and achieved by far the best results ever reported on these datasets. Some embodiments invoke a highly-optimized GPU implementation of 2D convolution and all the other operations inherent in training convolutional neural networks, which some embodiments make available publicly. The network includes a number of new and unusual features which improve its performance and reduce its training time, which are detailed below. The size of the network made overfitting a significant problem, even with 1.2 million labeled training examples, so some embodiments used several effective techniques for preventing overfitting described below. In some embodiments, a network includes five convolutional and three fully-connected layers, and this depth seems to be important: some embodiments found that removing any convolutional layer (each of which contains no more than 1% of the model's parameters) resulted in inferior performance. In some embodiments, the network's size is limited mainly by the amount of memory available on current GPUs and by the amount of training time that some embodiments may tolerate. Some embodiments network takes between five and six days to train on two GTX 580 3 GB GPUs. All of the experiments suggest that the results may be improved simply by waiting for faster GPUs and bigger datasets to become available.

ImageNet is a dataset of over 15 million labeled high-resolution images belonging to roughly 22,000 categories. The images were collected from the web and labeled by human labelers using Amazon's Mechanical Turk crowd-sourcing tool. Starting in 2010, as part of the Pascal Visual Object Challenge, an annual competition called the ImageNet Large-Scale Visual Recognition Challenge (ILSVRC) has been held. ILSVRC uses a subset of ImageNet with roughly 1000 images in each of 1000 categories. In all, there are roughly 1.2 million training images, 50,000 validation images, and 150,000 testing images.

ILSVRC-2010 is the only version of ILSVRC for which the test set labels are available, so this is the version on which some embodiments performed most of the experiments. Since some embodiments also entered the model in the ILSVRC-2012 competition, some embodiments report the results on this version of the dataset as well, for which test set labels are unavailable. On ImageNet, it is customary to report two error rates: top-1 and top-5, where the top-5 error rate is the fraction of test images for which the correct label is not among the five labels considered most probable by the model.

ImageNet consists of variable-resolution images, while the system requires a constant input dimensionality. Therefore, some embodiments down-sampled the images to a fixed resolution of 256×256. Given a rectangular image, some embodiments first rescaled the image such that the shorter side was of length 256, and then cropped out the central 256×256 patch from the resulting image. Some embodiments did not pre-process the images in any other way, except for subtracting the mean activity over the training set from each pixel. Therefore, some embodiments trained the network on the (centered) raw RGB (red green blue) values of the pixels.

The standard way to model a neuron's output f as a function of its input x is with $f(x) = tanh(x)$ or $f(x) = (1+e^{-x})^{-1}$. In terms of training time with gradient descent, these saturating nonlinearities are much slower than the non-saturating nonlinearity $f(x) = max(0, x)$. Some embodiments refer to neurons with this nonlinearity as Rectified Linear Units (ReLUs). Deep convolutional neural networks with ReLUs train several times faster than their equivalents with tanh units. This is demonstrated in FIG. 12E, which shows the number of iterations required to reach 25% training error on the CIFAR-10 dataset for a particular four-layer convolutional network. This plot shows that some embodiments would not have been able to experiment with such large neural networks for this work if some embodiments had used traditional saturating neuron models.

Some embodiments prevent overfitting, so the effect they are observing is different from the accelerated ability to fit the training set which some embodiments report when using ReLUs. Faster learning has a great influence on the performance of large models trained on large datasets.

Some embodiments spread the net across two GPUs. Current GPUs are particularly well-suited to cross-GPU parallelization, as they are able to read from and write to one another's memory directly, without going through host machine memory. The parallelization scheme that some embodiments employ essentially puts half of the kernels (or neurons) on each GPU, with one additional trick: the GPUs communicate only in certain layers. This means that, for example, the kernels of layer 3 take input from all kernel maps in layer 2. However, kernels in layer 4 take input only from those kernel maps in layer 3 which reside on the same GPU. Choosing the pattern of connectivity is a problem for cross-validation, but this allows us to precisely tune the amount of communication until it is an acceptable fraction of the amount of computation.

ReLUs have the desirable property that they do not require input normalization to prevent them from saturating. If at least some training examples produce a positive input to a ReLU, learning will happen in that neuron. However, some embodiments still find that the following local normalization scheme aids generalization. Denoting by $a_{x,y}^i$ the activity of a neuron computed by applying kernel i at position (x, y) and then applying the ReLU nonlinearity, the response-normalized activity $b_{x,y}^i$ is given by the expression:

$$b_{x,y}^i = a_{x,y}^i / \left( k + \alpha \sum_{j=\max(0,i-\frac{n}{2})}^{\min(N-1,i+\frac{n}{2})} (a_{x,y}^j)^2 \right)^\beta$$

where the sum runs over n "adjacent" kernel maps at the same spatial position, and N is the total number of kernels in the layer. The ordering of the kernel maps is of course arbitrary and determined before training begins. This sort of response normalization implements a form of lateral inhibition inspired by the type found in real neurons, creating competition for big activities amongst neuron outputs computed using different kernels. The constants k, n, α, and β are hyper-parameters whose values are determined using a validation set; some embodiments used k=2, n=5, $\alpha=10^{-4}$, and β=0.75. Some embodiments applied this normalization after applying the ReLU nonlinearity in certain layers.

This scheme bears some resemblance to the local contrast normalization scheme, but ours would be more correctly termed "brightness normalization", since some embodiments do not subtract the mean activity. Response normalization reduces the top-1 and top-5 error rates by 1.4% and 1.2%, respectively. Some embodiments also verified the effectiveness of this scheme on the CIFAR-10 dataset: a four-layer CNN achieved a 13% test error rate without normalization and 11% with normalization.

Pooling layers in CNNs summarize the outputs of neighboring groups of neurons in the same kernel map. Traditionally, the neighborhoods summarized by adjacent pooling units do not overlap. To be more precise, a pooling layer can be thought of as consisting of a grid of pooling units spaced s pixels apart, each summarizing a neighborhood of size z×z centered at the location of the pooling unit. If it is set that s=z, some embodiments obtain traditional local pooling as commonly employed in CNNs. If it is set that s<z, some embodiments obtain overlapping pooling. This is what some embodiments use throughout the network, with s=2 and z=3. This scheme reduces the top-1 and top-5 error rates by 0.4% and 0.3%, respectively, as compared with the non-overlapping scheme s=2, z=2, which produces output of equivalent dimensions. Some embodiments generally observe during training that models with overlapping pooling find it slightly more difficult to overfit.

The network includes eight layers with weights; the first five are convolutional and the remaining three are fully-connected. The output of the last fully-connected layer is fed to a 1000-way softmax which produces a distribution over the 1000 class labels. The network maximizes the multinomial logistic regression objective, which is equivalent to maximizing the average across training cases of the log-probability of the correct label under the prediction distribution.

The kernels of the second, fourth, and fifth convolutional layers are connected only to those kernel maps in the previous layer which reside on the same GPU (see FIG. 2). The kernels of the third convolutional layer are connected to all kernel maps in the second layer. The neurons in the fully-connected layers are connected to all neurons in the previous layer. Response-normalization layers follow the first and second convolutional layers. Max-pooling layers, of the kind described in Section 3.4, follow both response-normalization layers as well as the fifth convolutional layer. The ReLU non-linearity is applied to the output of every convolutional and fully-connected layer.

The first convolutional layer filters the 224×224×3 input image with 96 kernels of size 11×11×3 with a stride of 4 pixels (this is the distance between the receptive field centers of neighboring neurons in a kernel map). The second convolutional layer takes as input the (response-normalized and pooled) output of the first convolutional layer and filters it with 256 kernels of size 5×5×48. The third, fourth, and fifth convolutional layers are connected to one another without any intervening pooling or normalization layers. The third convolutional layer has 384 kernels of size 3×3×256 connected to the (normalized, pooled) outputs of the second convolutional layer. The fourth convolutional layer has 384 kernels of size 3×3×192, and the fifth convolutional layer has 256 kernels of size 3×3×192. The fully-connected layers have 4096 neurons each.

In some embodiments, a neural network architecture has 60 million parameters. Although the 1000 classes of ILSVRC make each training example impose 10 bits of constraint on the mapping from image to label, this turns out to be insufficient to learn so many parameters without considerable overfitting. Below, some embodiments describe the two primary ways in which some embodiments combat overfitting.

In some embodiments, to reduce overfitting on image data is to artificially enlarge the dataset using label-preserving transformations. Some embodiments employ two distinct forms of data augmentation, both of which allow transformed images to be produced from the original images with very little computation, so the transformed images do not need to be stored on disk. In an example implementation, the transformed images are generated in Python code on the CPU while the GPU is training on the previous batch of images. In these embodiments, these data augmentation schemes are, in effect, computationally free.

The first form of data augmentation consists of generating image translations and horizontal reflections. Some embodiments do this by extracting random 224×224 patches (and their horizontal reflections) from the 256×256 images and training the network on these extracted patches 4. This increases the size of the training set by a factor of 2048, though the resulting training examples are, of course, highly inter-dependent. Without this scheme, the network suffers from substantial overfitting, which would have forced us to use much smaller networks. At test time, the network makes a prediction by extracting five 224×224 patches (the four corner patches and the center patch) as well as their horizontal reflections (hence ten patches in all), and averaging the predictions made by the network's softmax layer on the ten patches.

The second form of data augmentation consists of altering the intensities of the RGB channels in training images. Specifically, some embodiments perform PCA on the set of RGB pixel values throughout the ImageNet training set. To each training image, some embodiments add multiples of the found principal components, with magnitudes proportional to the corresponding eigenvalues times a random variable drawn from a Gaussian with mean zero and standard deviation 0.1. Therefore, to each RGB image pixel $I_{xy}=[I_{xy}^R, I_{xy}^G, I_{xy}^G]^T$ some embodiments add the following quantity:

$$[p_1, p_2, p_3][\alpha_1 \lambda_1, \alpha_2 \lambda_2, \alpha_3 \lambda_3]^T$$

$\lambda_3$ where $p_i$ and $\lambda_i$ are i-th eigenvector and eigenvalue of the 3×3 covariance matrix of RGB pixel values, respectively, and $\alpha$ i is the aforementioned random variable. Each $\alpha$ i is drawn only once for all the pixels of a particular training image until that image is used for training again, at which point it is re-drawn. This scheme approximately captures an important property of natural images, namely, that object identity is invariant to changes in the intensity and color of the illumination. This scheme reduces the top-1 error rate by over 1%.

Combining the predictions of many different models is a very successful way to reduce test errors, but it appears to be too expensive for big neural networks that already take several days to train. There is, however, a very efficient version of model combination that only costs about a factor of two during training. The recently-introduced technique, called "dropout", consists of setting to zero the output of each hidden neuron with probability 0.5. The neurons which are "dropped out" in this way do not contribute to the forward pass and do not participate in back-propagation. Therefore, every time an input is presented, the neural network samples a different architecture, but all these architectures share weights. This technique reduces complex co-adaptations of neurons, since a neuron cannot rely on the presence of particular other neurons. It is, therefore, forced to learn more robust features that are useful in conjunction with many different random subsets of the other neurons. At test time, some embodiments use all the neurons but multiply their outputs by 0.5, which is a reasonable approximation to taking the geometric mean of the predictive distributions produced by the exponentially-many dropout networks.

Some embodiments use dropout in the first two fully-connected layers of FIG. 2. Without dropout, the network exhibits substantial overfitting. Dropout roughly doubles the number of iterations required to converge.

Some embodiments trained the models using stochastic gradient descent with a batch size of 128 examples, momentum of 0.9, and weight decay of 0.0005. Some embodiments found that this small amount of weight decay was important for the model to learn. In other words, weight decay here is not merely a regularizer: it reduces the model's training error. The update rule for weight w was:

$$v_{i+1} := 0.9 \cdot v_i - 0.0005 \cdot \epsilon \cdot w_i - \epsilon \cdot \left\langle \frac{\partial L}{\partial w} \bigg| w_i \right\rangle_{D_i}$$

where i is the iteration index, v is the momentum variable, $\epsilon$ is the learning rate, and $$\left\langle \frac{\partial L}{\partial w} \bigg| w_i \right\rangle_{D_i}$$

is the average over the ith batch D i of the derivative of the objective with respect to w, evaluated at $w_i$.

Some embodiments initialized the weights in each layer from a zero-mean Gaussian distribution with standard deviation 0.01. Some embodiments initialized the neuron biases in the second, fourth, and fifth convolutional layers, as well as in the fully-connected hidden layers, with the constant 1. This initialization accelerates the early stages of learning by providing the ReLUs (rectified linear units) with positive inputs. Some embodiments initialized the neuron biases in the remaining layers with the constant 0.

Some embodiments used an equal learning rate for all layers, which some embodiments adjusted manually throughout training. The heuristic which some embodiments followed was to divide the learning rate by 10 when the validation error rate stopped improving with the current learning rate. The learning rate was initialized at 0.01 and reduced three times prior to termination. Some embodiments trained the network for roughly 90 cycles through the training set of 1.2 million images.

Figure 13:
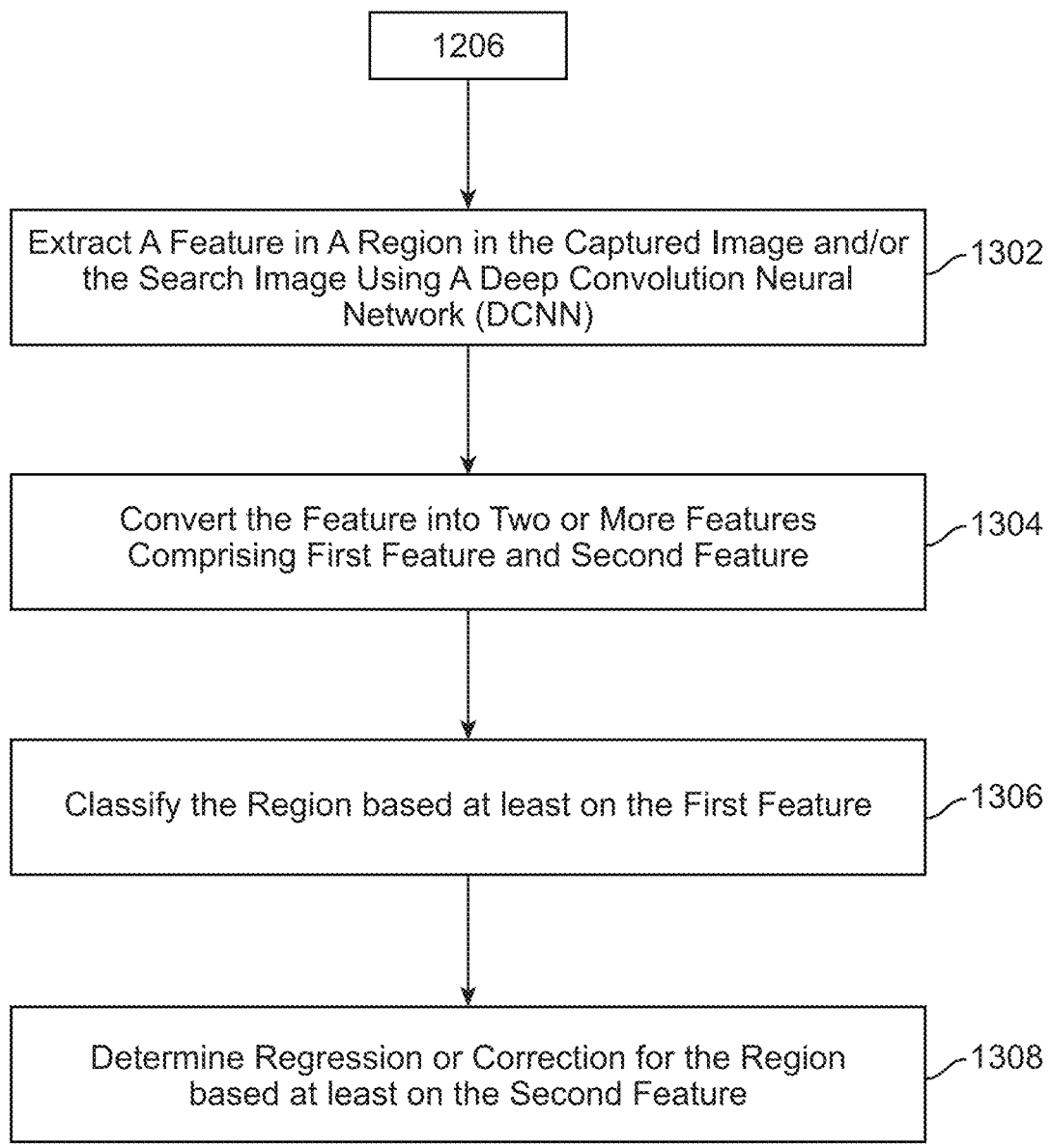
FIG. 13 illustrates more details about a portion of the high-level block diagram illustrated in FIG. 12 in one or more embodiments.

FIG. 13 illustrates more details about a portion of the high-level block diagram illustrated in FIG. 12A in one or more embodiments. More particularly, FIG. 13 illustrates more details about generating a deep learning result by performing a deep learning process on an image using a deep learning model at 1206 of FIG. 12A. In these one or more embodiments, a feature (e.g., a vertex, an edge, a surface, etc.) or a feature point (e.g., a point node pertaining to a feature) in a region of the captured image and/or the search image may be extracted at 1302 by using at least a deep convolution neural network (DCNN) in a deep learning model. In some of these embodiments, the deep learning model may further include an image registration process in addition to the DCNN. It shall be noted that unless otherwise explicitly distinguished from each other, the term "feature" and "feature point" may be used interchangeably throughout the entire disclosure.

The feature or the feature point extracted at 1302 may be converted at 1304 into a plurality of features that includes at least a first feature and a second feature. The region may be classified at 1306 based at least in part upon the first feature; and regression or correction may be determined for the region at 1308 based at least in part upon the second feature. In some embodiments, the region may be classified at 1306 based solely on the first feature but not on the second feature. In addition or in the alternative, wherein determining the regression for the region is based at least in part upon the second feature but not on the first feature.

Figure 14A:
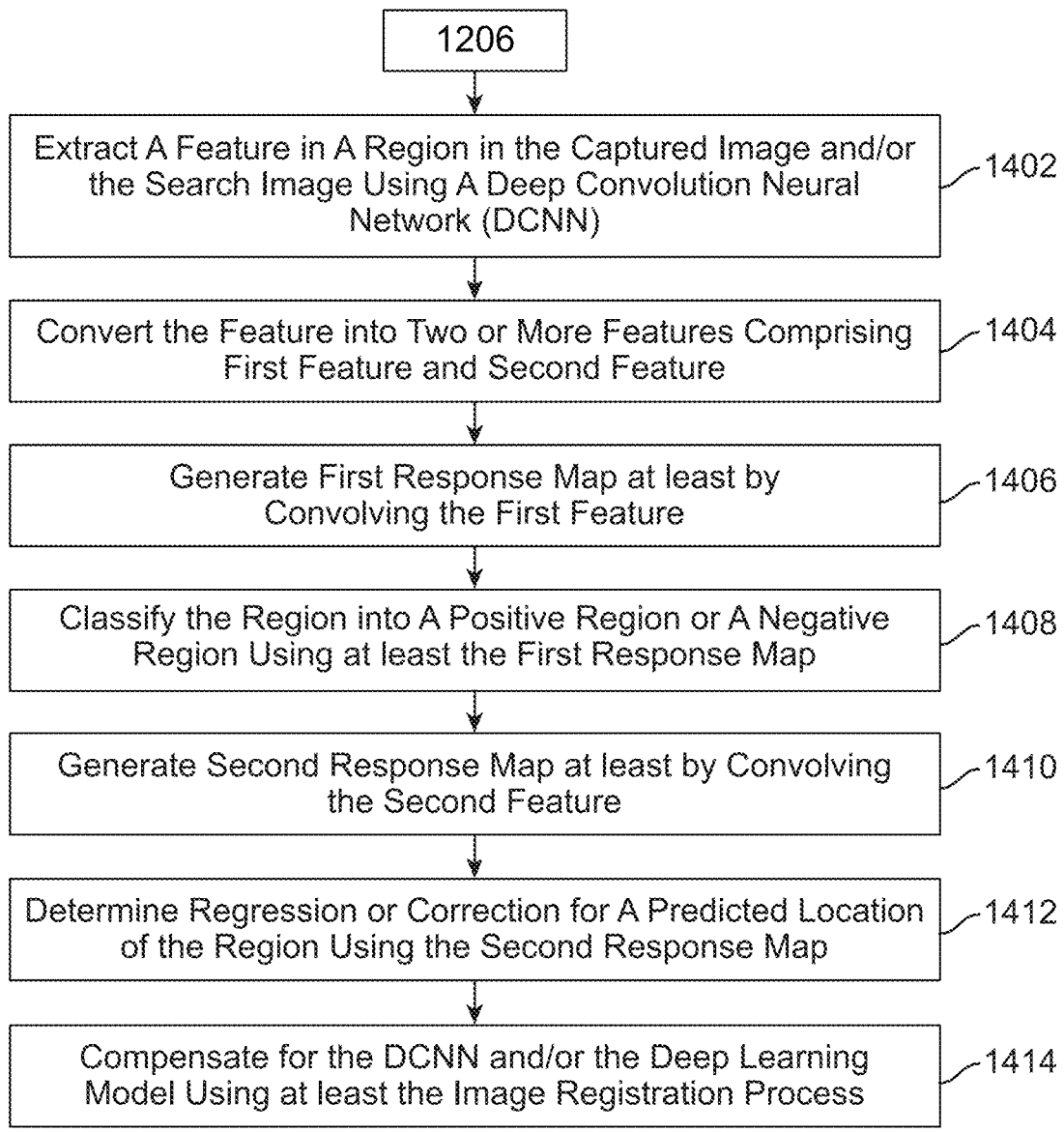
FIG. 14A illustrates more details about another portion of the high-level block diagram illustrated in FIG. 12 in one or more embodiments.

FIG. 14A illustrates more details about another portion of the high-level block diagram illustrated in FIG. 12A in one or more embodiments. More specifically, FIG. 14A illustrates more details about generating a deep learning result by performing a deep learning process on an image using a deep learning model at 1206 of FIG. 12A. In these one or more embodiments, a feature or feature point in a region of a captured image and/or the search image may be extracted at 1402 using a DCNN.

The feature or the feature point extracted at 1402 may be converted at 1404 into a plurality of features that includes at least a first feature and a second feature. A first response map may be generated at 1406 at least by convolving the first feature using one or more convolution layers in the DCNN such as providing the second feature to a set of convolution layers in the DCNN. The region may then be classified at 1408 into a position region (e.g., a target region of interest) or a negative region (e.g., a non-target region that may be ignored) using at least the first response map.

A second response map may also be generated at 1410 at least by convolving the second feature with the DCNN such as providing the second feature to a set of convolution layers in the DCNN. Regression or correction may be determined for the region at 1412 using at least the second response map. In some embodiments, the deep convolution neural network and/or the deep learning model including the DCNN may be compensated for at 1414 using at least an image registration process. In some of these embodiments, a deep learning model may include the image registration process in addition to the deep convolution neural network (DCNN).

In some embodiments illustrated in FIG. 13 and/or 14A, a deep convolution neural network may include, for example, a number of new and unusual features which improve its performance and reduce its training time, which are described in greater details below. The size of the network made overfitting a significant problem, even with 1.2 million labeled training examples, so some embodiments used several effective techniques for preventing overfitting, which are described in greater details below. The final network contains five convolutional and three fully-connected layers, and this depth seems to be important: it was found that removing any convolutional layer (each of which contains no more than 1% of the model's parameters) resulted in inferior performance.

In some embodiments, the network's size is limited mainly by the amount of memory available on current GPUs and by the amount of training time that some embodiments may tolerate. The network takes between five and six days to train on two GTX 580 3 GB GPUs. All of these experiments suggest that the results may be improved simply by waiting for faster GPUs and bigger datasets to become available.

The Dataset:

ImageNet includes a dataset of over 15 million labeled high-resolution images belonging to roughly 22,000 categories. The images were collected from the web and labeled by human labelers using Amazon's Mechanical Turk crowdsourcing tool. Starting in 2010, as part of the Pascal Visual Object Challenge, an annual competition called the ImageNet Large-Scale Visual Recognition Challenge (ILSVRC) has been held. ILSVRC uses a subset of ImageNet with roughly 1000 images in each of 1000 categories. In all, there are roughly 1.2 million training images, 50,000 validation images, and 150,000 testing images.

ILSVRC-2010 is a version of ILSVRC for which the test set labels are available, so this is the version on which some embodiments performed most of the experiments. Because some embodiments also entered the model in the ILSVRC-2012 competition, Some embodiments report the results on this version of the dataset as well, for which test set labels are unavailable. On ImageNet, it is customary to report two error rates: top-1 and top-5, where the top-5 error rate is the fraction of test images for which the correct label is not among the five labels considered most probable by the model.

ImageNet comprises variable-resolution images, while the example system requires a constant input dimensionality. Therefore, some embodiments down-sampled the images to a fixed resolution of 256×256. Given a rectangular image, some embodiments first rescaled the image such that the shorter side was of length 256, and then cropped out the central 256×256 patch from the resulting image. Some embodiments did not pre-process the images in any other way, except for subtracting the mean activity over the training set from each pixel. Some embodiments trained the network on the (centered) raw RGB values of the pixels.

The Architecture:

The architecture of the network is summarized in FIG. 2. It contains eight learned layers—five convolutional and three fully-connected. Below, some embodiments describe some of the novel or unusual features of the network's architecture.

ReLU Nonlinearity:

The standard way to model a neuron's output f as a function of its input x is with $f(x)=\tanh(x)$ or $f(x)=(1+e^{-x})^{-1}$. In terms of training time with gradient descent, these saturating nonlinearities are much slower than the non-saturating nonlinearity $f(x)=\max(0, x)$. Some embodiments refer to neurons with this nonlinearity as Rectified Linear Units (ReLUs). Deep convolutional neural networks with ReLUs train several times faster than their equivalents with tanh units. This is demonstrated in FIG. 12E, which shows the number of iterations required to reach 25% training error on the CIFAR-10 dataset for a particular four-layer convolutional network. This plot shows that some embodiments would not have been able to experiment with such large neural networks for this work if some embodiments had used traditional saturating neuron models.

Some embodiments consider alternatives to traditional neuron models in CNNs. In some embodiments, the nonlinearity $f(x)=|\tanh(x)|$ works well with their type of contrast normalization followed by local average pooling on the Caltech-101 dataset. However, on this dataset the primary concern is preventing overfitting, so the effect they are observing is different from the accelerated ability to fit the training set which some embodiments report when using ReLUs. Faster learning has a great influence on the performance of large models trained on large datasets.

Local Response Normalization:

ReLUs have the desirable property that they do not require input normalization to prevent them from saturating. If at least some training examples produce a positive input to a ReLU, learning will happen in that neuron. However, some embodiments may still find that the following local normalization scheme aids generalization. Denoting by a i x,y the activity of a neuron computed by applying kernel i at position (x, y) and then applying the ReLU nonlinearity, the response-normalized activity b i x,y is given by the expression:

$$b_{x,y}^i = a_{x,y}^i / \left(k + \alpha \sum_{j=\max(0,i-\frac{n}{2})}^{\min(N-1,i+\frac{n}{2})} (a_{x,y}^i)^2\right)^\beta$$

where the sum runs over n "adjacent" kernel maps at the same spatial position, and N is the total number of kernels in the layer. The ordering of the kernel maps is of course arbitrary and determined before training begins. This sort of response normalization implements a form of lateral inhibition inspired by the type found in real neurons, creating competition for big activities amongst neuron outputs computed using different kernels. The constants k, n, $\alpha$, and $\beta$ are hyper-parameters whose values are determined using a validation set; some embodiments used k=2, n=5, $\alpha=10^{-4}$, and $\beta=0.75$. Some embodiments applied this normalization after applying the ReLU nonlinearity in certain layers.

These embodiments described herein may be more termed "brightness normalization", because some embodiments do not subtract the mean activity. Response normalization reduces the top-1 and top-5 error rates by 1.4% and 1.2%, respectively. Some embodiments also verified the effectiveness of this scheme on the CIFAR-10 dataset: a four-layer CNN achieved a 13% test error rate without normalization and 11% with normalization.

Overlapping Pooling:

Pooling layers in CNNs summarize the outputs of neighboring groups of neurons in the same kernel map. Traditionally, the neighborhoods summarized by adjacent pooling units do not overlap. To be more precise, a pooling layer may be thought of as consisting of a grid of pooling units spaced s pixels apart, each summarizing a neighborhood of size z×z centered at the location of the pooling unit. If some embodiments set s=z, these embodiments may obtain traditional local pooling as commonly employed in CNNs. If some embodiments set s<z, these embodiments obtain overlapping pooling. This is what some embodiments use throughout the example network, with s=2 and z=3. This scheme reduces the top-1 and top-5 error rates by 0.4% and 0.3%, respectively, as compared with the non-overlapping scheme s=2, z=2, which produces output of equivalent dimensions. Some embodiments generally observe during training that models with overlapping pooling find it slightly more difficult to overfit.

Overall Architecture:

Some embodiments are ready to describe the overall architecture of the example CNN. As depicted in FIG. 2, the net contains eight layers with weights; the first five are convolutional and the remaining three are fully-connected. The output of the last fully-connected layer is fed to a 1000-way softmax which produces a distribution over the 1000 class labels. The example network maximizes the multinomial logistic regression objective, which is equivalent to maximizing the average across training cases of the log-probability of the correct label under the prediction distribution.

Figure 14B:
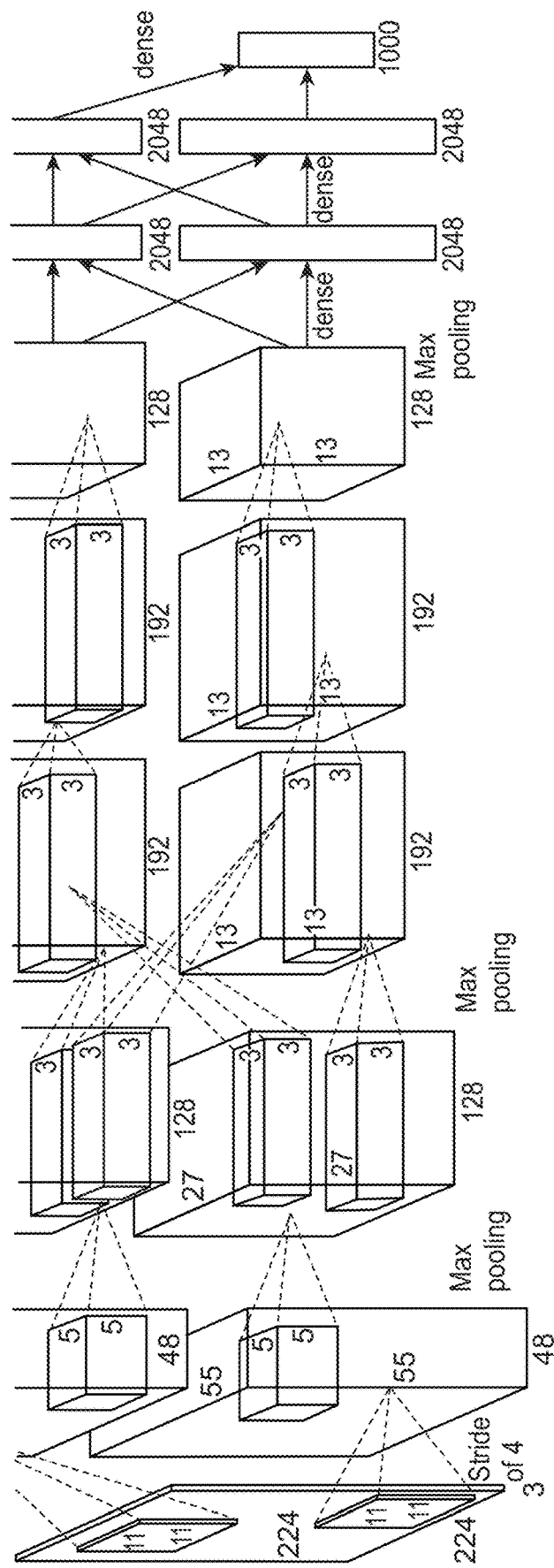
FIG. 14B illustrates an example deep convolutional neural network in one or more embodiments.

The kernels of the second, fourth, and fifth convolutional layers are connected only to those kernel maps in the previous layer which reside on the same GPU (see FIG. 14B that illustrates an example deep convolutional neural network in one or more embodiments). The kernels of the third convolutional layer are connected to all kernel maps in the second layer. The neurons in the fully connected layers are connected to all neurons in the previous layer. Response-normalization layers follow the first and second convolutional layers. Max-pooling layers, of the kind described below, follow both response-normalization layers as well as the fifth convolutional layer. The ReLU non-linearity is applied to the output of every convolutional and fully-connected layer.

The first convolutional layer filters the 224×224×3 input image with 96 kernels of size 11×11×3 with a stride of 4 pixels (this is the distance between the receptive field centers of neighboring neurons in a kernel map). The second convolutional layer takes as input the (response-normalized and pooled) output of the first convolutional layer and filters it with 256 kernels of size 5×5×48. The third, fourth, and fifth convolutional layers are connected to one another without any intervening pooling or normalization layers. The third convolutional layer has 384 kernels of size 3×3×256 connected to the (normalized, pooled) outputs of the second convolutional layer. The fourth convolutional layer has 384 kernels of size 3×3×192, and the fifth convolutional layer has 256 kernels of size 3×3×192. The fully-connected layers have 4096 neurons each.

Reducing Overfitting:

An example neural network architecture has 60 million parameters. Although the 1000 classes of ILSVRC make each training example impose 10 bits of constraint on the mapping from image to label, this turns out to be insufficient to learn so many parameters without considerable overfitting. Below, some embodiments describe the two primary ways in which these embodiments combat overfitting.

Data Augmentation:

One way to reduce overfitting on image data is to artificially enlarge the dataset using label-preserving transformations. Some embodiments employ two distinct forms of data augmentation, both of which allow transformed images to be produced from the original images with very little computation, so the transformed images do not need to be stored on disk. In an example implementation, the transformed images are generated in Python code on the CPU while the GPU is training on the previous batch of images. Therefore, these data augmentation schemes are, in effect, computationally free.

The first form of data augmentation consists of generating image translations and horizontal reflections. Some embodiments do this by extracting random 224×224 patches (and their horizontal reflections) from the 256×256 images and training the example network on these extracted patches 4. This increases the size of the example training set by a factor of 2048, though the resulting training examples are, of course, highly interdependent. Without this scheme, the example network suffers from substantial overfitting, which would have forced us to use much smaller networks. At test time, the network makes a prediction by extracting five 224×224 patches (the four corner patches and the center patch) as well as their horizontal reflections (hence ten patches in all), and averaging the predictions made by the network's softmax layer on the ten patches.

The second form of data augmentation consists of altering the intensities of the RGB channels in training images. Specifically, some embodiments perform PCA on the set of RGB pixel values throughout the ImageNet training set. To each training image, some embodiments add multiples of the found principal components, with magnitudes proportional to the corresponding eigenvalues times a random variable drawn from a Gaussian with mean zero and standard deviation 0.1. Therefore, to each RGB image pixel $I_{xy}=[I_{xy}^R, I_{xy}^G, I_{xy}^B]^T$ some embodiments add the following quantity:

$$[P_1, P_2, P_3][\alpha_1\lambda_1, \alpha_2\lambda_2, \alpha_3\lambda_3]^T$$

In the above formulation, $p_i$ and $\lambda_i$ are i-th eigenvector and eigenvalue of the 3×3 covariance matrix of RGB pixel values, respectively, and α i is the aforementioned random variable. Each $\alpha_i$ is drawn only once for all the pixels of a particular training image until that image is used for training again, at which point it is re-drawn. This scheme approximately captures an important property of natural images, namely, that object identity is invariant to changes in the intensity and color of the illumination. This scheme reduces the top-1 error rate by over 1%.

Dropout:

Combining the predictions of many different models is a very successful way to reduce test errors, but it appears to be too expensive for big neural networks that already take several days to train. There is, however, a very efficient version of model combination that only costs about a factor of two during training. The recently-introduced technique, called "dropout", includes setting to zero the output of each hidden neuron with probability 0.5. The neurons which are "dropped out" in this way do not contribute to the forward pass and do not participate in backpropagation. Therefore, every time an input is presented, the neural network samples a different architecture, but all these architectures share weights. This technique reduces complex co-adaptations of neurons, since a neuron cannot rely on the presence of particular other neurons. It is, therefore, forced to learn more robust features that are useful in conjunction with many different random subsets of the other neurons. At test time, some embodiments use all the neurons but multiply their outputs by 0.5, which is a reasonable approximation to taking the geometric mean of the predictive distributions produced by the exponentially-many dropout networks.

Some embodiments use dropout in the first two fully-connected layers of FIG. 2. Without dropout, the example network exhibits substantial overfitting. Dropout roughly doubles the number of iterations required to converge.

Details of Learning:

Some embodiments trained the models using stochastic gradient descent with a batch size of 128 examples, momentum of 0.9, and weight decay of 0.0005. Some embodiments determined this small amount of weight decay was important for the model to learn. In other words, weight decay here is not merely a regularizer: it reduces the model's training error. The update rule for weight w was:

$$v_{i+1} := 0.9 \cdot v_i - 0.0005 \cdot \epsilon \cdot w_i - \epsilon \cdot \left\langle \frac{\partial L}{\partial w} \bigg|_{w_i} \right\rangle_{D_i}$$

$$w_{i+1} := w_i + v_{i+1}$$

where i is the iteration index, v is the momentum variable, ε is the learning rate, and $$\left\langle \frac{\partial L}{\partial w} \bigg|_{w_i} \right\rangle_{D_i}$$

is the average over the ith batch $D_i$ of the derivative of the objective with respect to w, evaluated at $w_i$.

Some embodiments initialized the weights in each layer from a zero-mean Gaussian distribution with standard deviation 0.01. Some embodiments initialized the neuron biases in the second, fourth, and fifth convolutional layers, as well as in the fully-connected hidden layers, with the constant 1. This initialization accelerates the early stages of learning by providing the ReLUs with positive inputs. Some embodiments initialized the neuron biases in the remaining layers with the constant 0.

Some embodiments used an equal learning rate for all layers, which some of these embodiments adjusted manually throughout training. The heuristic which some embodiments followed was to divide the learning rate by 10 when the validation error rate stopped improving with the current learning rate. The learning rate was initialized at 0.01 and reduced three times prior to termination. Some embodiments trained the network for roughly 90 cycles through the training set of 1.2 million images.

Figure 15A:
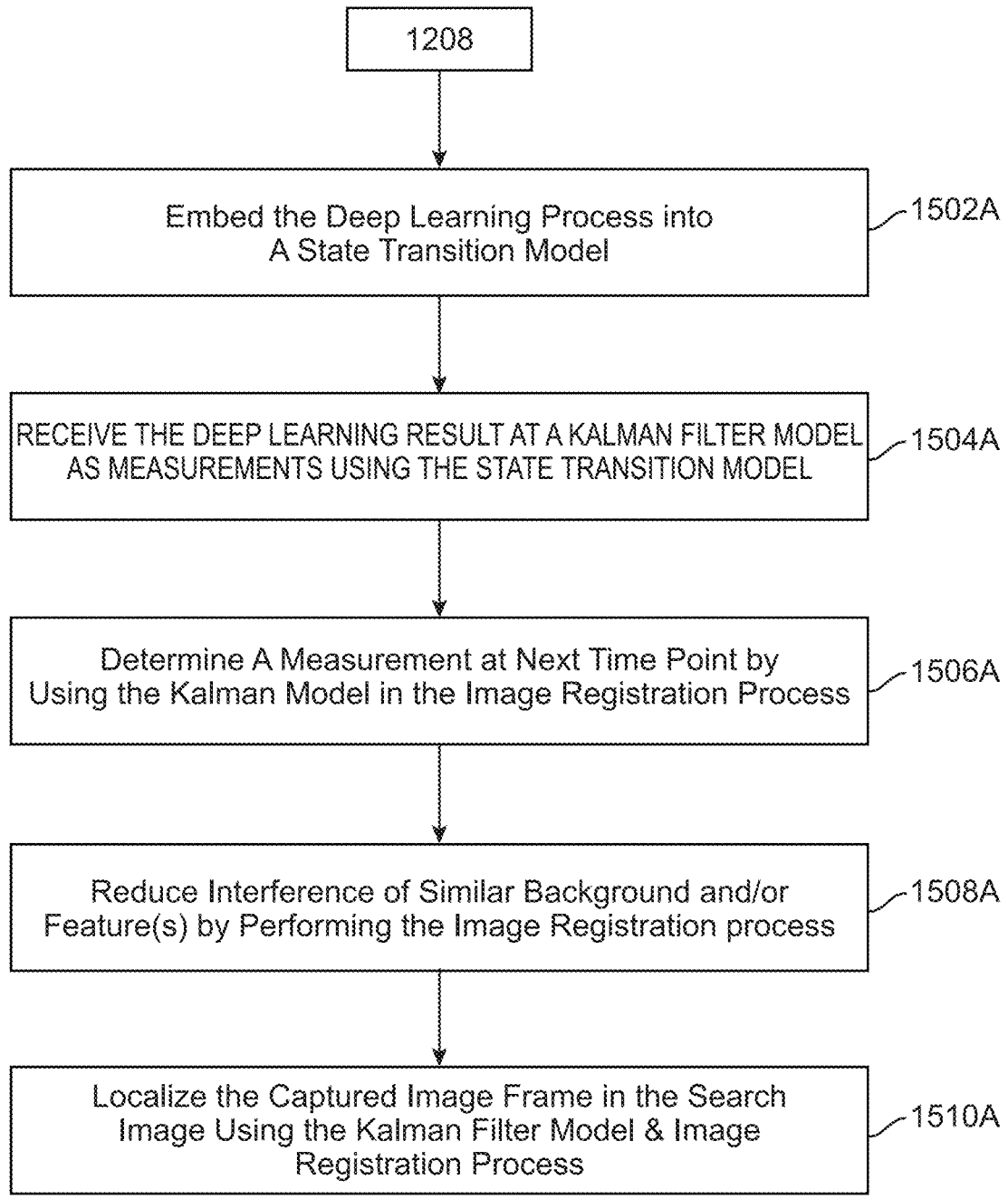
FIG. 15A illustrates more details about another portion of the high-level block diagram illustrated in FIG. 12 in one or more embodiments.

FIG. 15A illustrates more details about another portion of the high-level block diagram illustrated in FIG. 12A in one or more embodiments. More particularly, FIG. 15A illustrates more details about localizing an image at least by performing an image registration process with a Kalman filter model and the aforementioned deep learning result. In these one or more embodiments, the deep learning process and/or the deep learning results generated by the deep learning process may be embedded at 1502A into state transition model. In some embodiments, a state transition model determines a next position state at a next time point based at least in part upon a prior position state at a prior time point and at least one of process noise or a control vector of a state estimation model. In some of these embodiments, a state transition model includes a first order state estimation model.

An example state transition model may be as follows:

$$\begin{bmatrix} X_k \\ Y_k \end{bmatrix} = \begin{bmatrix} 1 & 0 \\ 0 & 1 \end{bmatrix} * \begin{bmatrix} X_{k-1} \\ Y_{k-1} \end{bmatrix} + \begin{bmatrix} 1 & 0 \\ 0 & 1 \end{bmatrix} * \begin{bmatrix} x'_{k-1} \\ y'_{k-1} \end{bmatrix} + w_k \quad (1)$$

In Eq. (1) above, $X_k$, $Y_k$ represents the position state at time k in x and y directions. $w_k$ is the process noise drawn from a zero mean multivariate normal distribution in some embodiments.

$$\begin{bmatrix} x'_{k-1} \\ y'_{k-1} \end{bmatrix}$$

forms the control vector of the first order state estimation model. It is the velocity within a time unit computed from the difference be-tween the deep neural network results at time k and k−1. The proposed formation allows us to embed the deep learning into a classic Kalman filter model. Here one time step is the duration between continuous frames.

The deep learning result generated by the aforementioned deep learning model may be received at a Kalman filter model as measurement(s) at 1504A at least by using the state transition model described above with reference to 1502A. In some embodiments, the Kalman filter model is enabled to receive the deep learning result by using the state transition model into which the deep learning process and/or the deep learning results are embedded.

A measurement at the next time point may be determined at 1506A by using at least the Kalman filter model in an image registration process. In some embodiments, a time step may be determined to be the duration between two immediately neighboring frames. For example, in a 30 frames/sec video sequence, a time step may be determined to be 1/30 seconds. It shall be noted that other consistent, fixed time steps or even variable time steps may be used in different embodiments. In some embodiments, interference of similar background and/or feature(s) in the captured image and/or the search image may be reduced at 1508A at least by performing the image registration process. The Kalman filter model may be configured to receive the image registration result in some embodiments. In addition or in the alternative, the Kalman filter model may comprise a linear model (e.g., a linear Markov model or any other suitable model) and additive Gaussian noise.

The aforementioned captured image frame may be localized to or in the search image at 1510A by using at least the Kalman filter model and the image registration process. More details about some of the aforementioned acts will be described below with reference to FIGS. 15B and 15C.

Figure 15B:
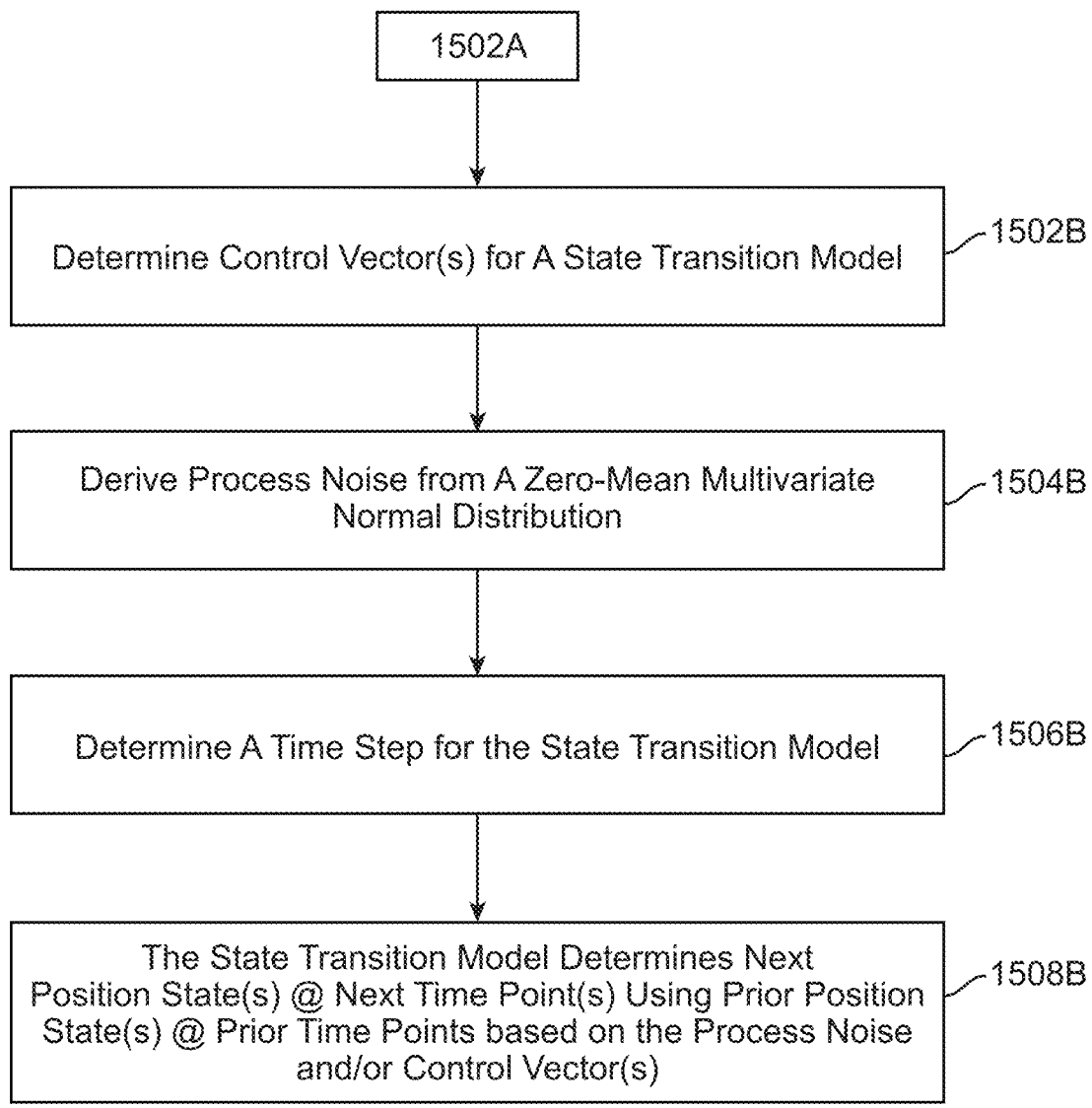
FIG. 15B illustrates more details about a portion of FIG. 15A in one or more embodiments.

FIG. 15B illustrates more details about a portion of FIG. 15A in one or more embodiments. More specifically, FIG. 15B illustrates more details about embedding a deep learning process into a state transition model in 1502A of FIG. 15A. In these one or more embodiments, one or more control vectors may be determined at 1502B for the state transition model. Process noise may be derived at 1504B from a statistical distribution such as, without limitation, a zero-mean multivariate normal distribution.

A time step may be determined at 1506B for the state transition model. As described above, a time step may be determined to be the duration between two immediately neighboring frames in some embodiments although it shall also be noted that other consistent, fixed time steps or even variable time steps may be used in different embodiments.

The state transition model may be used to determine, at 1508B, one or more next position states at one or more corresponding time points at least by using one or more prior position states at one or more corresponding prior time points based at least in part upon the process noise derived at 1504B and/or the one or more control vectors determined at 1502B. The example state transition model described above with reference to FIG. 15A allows the embedding of a deep learning process into a Kalman filter model.

Figure 15C:
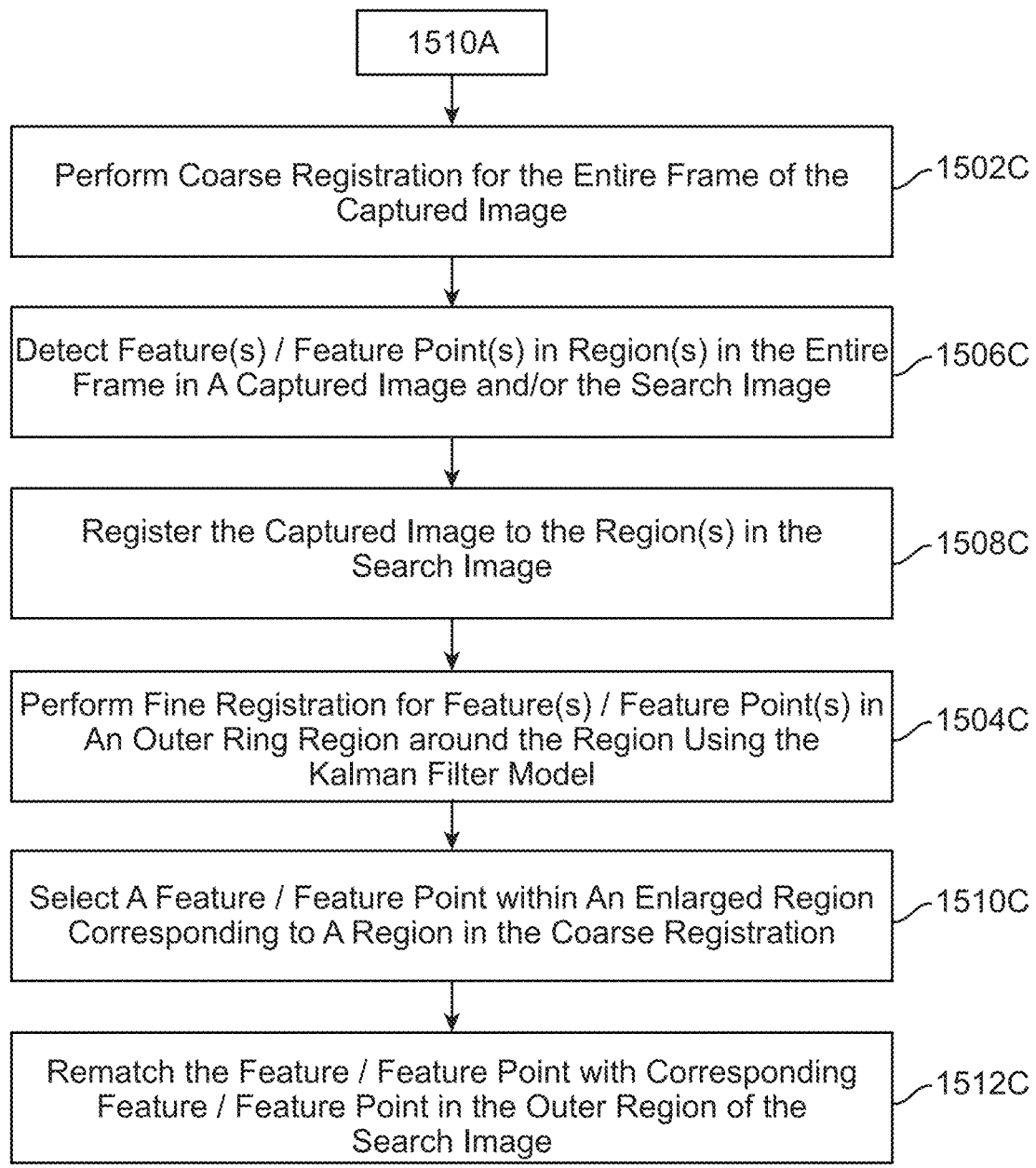
FIG. 15C illustrates more details about another portion of FIG. 15A in one or more embodiments.

FIG. 15C illustrates more details about another portion of FIG. 15A in one or more embodiments. More specifically, FIG. 15B illustrates more details about localizing an image in or to a search image by using a Kalman filter model and an image registration process at 1510A of FIG. 15A. In these one or more embodiments, localizing the captured image may comprise performing a coarse registration for an entire frame of the captured image at 1502C. In some of these embodiments, performing a coarse registration includes detecting one or more features or feature points in one or more regions in the entire frame of the captured image at 1506C.

In some of these embodiments, performing a coarse registration may further include detecting (if coarse registration has not been performed for the search image) or identifying (if coarse registration has already been performed for the search image) one or more corresponding features or feature points from one or more regions in the search image. The capture image may then be registered to the search image at 1508C based at least in part upon the one or more features or feature points detected from the capture image and the one or more corresponding features or feature points from the search image.

With the coarse registration completed, a fine registration may be performed at 1504C for at least one of the one or more features or feature points detected from the captured image and/or at least one of the one or more corresponding features or feature points from the search image. In some embodiments, coarse registration may be performed on the entire frame of an image while fine registration may be performed with the outer ring(s) only. In these embodiments, the use of the Kalman filter model for measurements with outer-ring registration avoids repeated computation of features or feature points. In some of these embodiments, a deep learning model includes a convolution neural network and an image registration process; and In some embodiments, the fine registration may be performed for at least one feature or feature point in an outer ring region around the region by using the Kalman filter at 1504C. In some of these embodiments, performing a fine registration may include selecting, at 1510C, a feature or a feature point within an enlarged region that corresponds to the region described above with reference to 1506C for coarse registration. Using an enlarged region may improve the robustness of the localization process, especially in scenarios where matched features or feature points in the coarse registration are more concentrated in an inside area or an area closer to the inside (as opposed to closer to the outer ring(s) or otherwise distributed across the search image).

The feature or feature point selected at 1510C may then be compared with a corresponding feature or a corresponding feature point in an outer region on the search image. In an example of eye tracking where the search image includes a plurality of mosaicked base images of a retina of a user, some embodiments take the imaging position on the retina as the ground truth when the frame is completed. As a result, the outer rings in each frame are closer to the ground truth.

Regarding a Kalman filter model, a Kalman filter includes a set of mathematical equations that provides an efficient computational (recursive) means to estimate the state of a process, in a way that minimizes the mean of the squared error. The filter is very powerful in several aspects: it supports estimations of past, present, and even future states, and it may do so even when the precise nature of the modeled system is unknown.

A Discrete Kalman Filter:

The Kalman filter addresses the general problem of trying to estimate the state $x \in \Re^n$ of a discrete-time controlled process that is governed by the linear stochastic difference equation:

$$x_k = Ax_{k-1} + Bu_{k-1} + w_{k-1} \tag{1.1}$$

Where a measurement $z \in \Re^m$, that is $$z_k = Hx_k + v_k \tag{1.2}$$

The random variables $w_k$ and $v_k$ represent the process and measurement noise (respectively). They are assumed to be independent (of each other), white, and with normal probability distributions $$p(w) \sim N(0, Q), \tag{1.3}$$

$$p(v) \sim N(0, R), \tag{1.4}$$

In practice, the process noise covariance Q and measurement noise covariance R matrices might change with each time step or measurement, however here some embodiments assume they are constant.

The n×n matrix A in the difference equation (1.1) relates the state at the previous time step k−1 to the state at the current step k, in the absence of either a driving function or process noise. Note that in practice A might change with each time step, but here some embodiments assume it is constant. The n×Z matrix B relates the optional control input $u \in \Re^l$ to the state x. The m×n matrix H in the measurement equation (1.2) relates the state to the measurement zk. In practice H might change with each time step or measurement, but here some embodiments assume it is constant.

Some embodiments define $\hat{x}_k^- \in \Re^n$ (note the "super minus") to be the a priori state estimate at step k given knowledge of the process prior to step k, and $\hat{x}_k \in \Re^n$ to be the a posteriori state estimate at step k given measurement $z_k$. Some embodiments then define a priori and a posteriori estimate errors as $e_k^- \equiv x_k - \hat{x}_k^-$, and $e_k \equiv x_k - \hat{x}_k$.

The a priori estimate error covariance is then $$P_k^- = E[e_k^- e_k^{-T}], \quad (1.5)$$

and the a posteriori estimate error covariance is $$P_k = E[e_k e_k^T]. \quad (1.6)$$

In deriving the equations for the Kalman filter, some embodiments begin with the goal of finding an equation that computes an a posteriori state estimate $\hat{x}_k$ as a linear combination of an a priori estimate $\hat{x}_k^-$ and a weighted difference between an actual measurement $z_k$ and a measurement prediction $H\hat{x}_k^-$ as shown below in (1.7).

$$\hat{x}_k = \hat{x}_k^- + K(z_k - H\hat{x}_k^-) \quad (1.7)$$

The difference $(z_k - H\hat{x}_k^-)$ in (1.7) is called the measurement innovation, or the residual. The residual reflects the discrepancy between the predicted measurement $H\hat{x}_k^-$ and the actual measurement $z_k$. A residual of zero means that the two are in complete agreement.

The n×m matrix K in (1.7) is chosen to be the gain or blending factor that minimizes the a posteriori error covariance (1.6). This minimization may be accomplished by first substituting (1.7) into the above definition for $e_k$, substituting that into (1.6), performing the indicated expectations, taking the derivative of the trace of the result with respect to K, setting that result equal to zero, and then solving for K. One form of the resulting K that minimizes (1.6) is given by $$K_k = P_k^- H^T (HP_k^- H^T + R)^{-1} \quad (1.8)$$
$$= \frac{P_k^- H^T}{HP_k^- H^T + R}$$

From Eq. (1.8), as the measurement error covariance R approaches zero, the gain K weights the residual more heavily. Specifically, $$\lim_{R_k \to 0} K_k = H^{-1}.$$

On the other hand, as the a priori estimate error covariance Pk approaches zero, the gain K weights the residual less heavily. Specifically, $$\lim_{P_k^- \to 0} K_k = 0.$$

Another way of thinking about the weighting by K is that as the measurement error covariance R approaches zero, the actual measurement $z_k$ is "trusted" more and more, while the predicted measurement $H\hat{x}_k^-$ is trusted less and less. On the other hand, as the a priori estimate error covariance Pk approaches zero the actual measurement $z_k$ is trusted less and less, while the predicted measurement $H\hat{x}_k^-$ is trusted more and more.

The justification for (1.7) is rooted in the probability of the a priori estimate ick conditioned on all prior measurements zk (Bayes' rule). For now, let it suffice to point out that the Kalman filter maintains the first two moments of the state distribution, The a posteriori state estimate (1.7) reflects the mean (the first moment) of the state distribution—it is normally distributed if the conditions of (1.3) and (1.4) are met. The a posteriori estimate error covariance (1.6) reflects the variance of the state distribution (the second non-central moment). In other words, $p(x_k|z_k) \sim N(E[x_k], E[(x_k - \hat{x}_k)(x_k - \hat{x}_k)^T]) = N(\hat{x}_k, P_k)$.

Discrete Kalman Filter Algorithm:

A Kalman filter estimates a process by using a form of feedback control: the filter estimates the process state at some time and then obtains feedback in the form of (noisy) measurements. As such, the equations for the Kalman filter fall into two groups: time update equations and measurement update equations. The time update equations are responsible for projecting forward (in time) the current state and error covariance estimates to obtain the a priori estimates for the next time step. The measurement update equations are responsible for the feedback—e.g., for incorporating a new measurement into the a priori estimate to obtain an improved a posteriori estimate.

Figure 17:
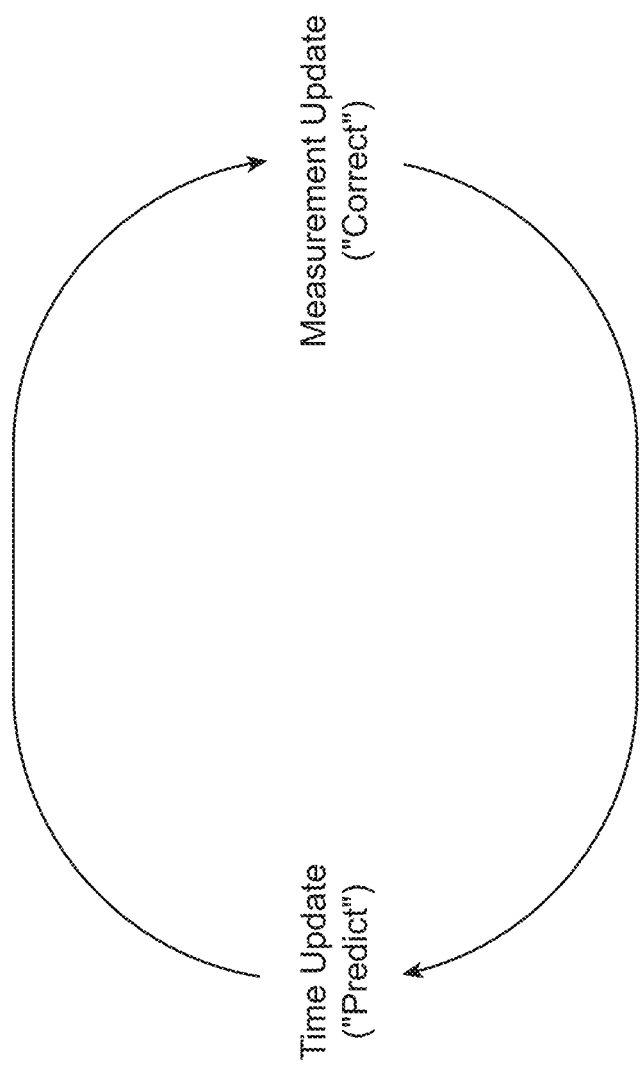
FIG. 17 illustrates an estimation algorithm in one or more embodiments.

The time update equations may also be thought of as predictor equations, while the measurement update equations can be thought of as corrector equations. Indeed, the final estimation algorithm resembles that of a predictor-corrector algorithm for solving numerical problems as shown in FIG. 17.

The specific equations for the time and measurement updates are presented below in Table 1-1 and Table 1-2 immediately below.

TABLE 1-1

Discrete Kalamn filter time update equations.

| | |
|---|---|
| $\hat{x}_k^- = A\hat{x}_{k-1} + Bu_{k-1}$ | (1.9) |
| $P_k^- = AP_{k-1}A^T + Q$ | (1.10) |

TABLE 1-2

Discrete Kalman filter measurement update equations.

| | |
|---|---|
| $K_k = P_k^- H^T(HP_k^- H^T + R)^{-1}$ | (1.11) |
| $\hat{x}_k = \hat{x}_k^- + K_k(z_k - H\hat{x}_k^-)$ | (1.12) |
| $P_k = (1 - K_k H)P_k^-$ | (1.13) |

The first task during the measurement update is to compute the Kalman gain, $K_k$. Notice that the equation given here as (1.11) is the same as (1.8). The next step is to actually measure the process to obtain $Z_k$, and then to generate an a posteriori state estimate by incorporating the measurement as in (1.12). Again (1.12) is simply (1.7) repeated here for completeness. The final step is to obtain an a posteriori error covariance estimate via (1.13).

After each time and measurement update pair, the process is repeated with the previous a posteriori estimates used to project or predict the new a priori estimates. This recursive nature is one of the very appealing features of the Kalman filter—it makes practical implementations much more feasible than (for example) an implementation of a Wiener filter which is designed to operate on all of the data directly for each estimate. The Kalman filter instead recursively conditions the current estimate on all of the past measurements.
Filter Parameters and Tuning:

In the actual implementation of the filter, the measurement noise covariance R is usually measured prior to operation of the filter. Measuring the measurement error covariance R is generally practical (possible) because some embodiments need to be able to measure the process anyway (while operating the filter) so these embodiments should generally be able to take some off-line sample measurements in order to determine the variance of the measurement noise.

The determination of the process noise covariance Q is generally more difficult as some embodiments typically do not have the ability to directly observe the process some embodiments are estimating. Sometimes a relatively simple (poor) process model may produce acceptable results if one "injects" enough uncertainty into the process via the selection of Q. Certainly in this case one would hope that the process measurements are reliable.

Figure 18:
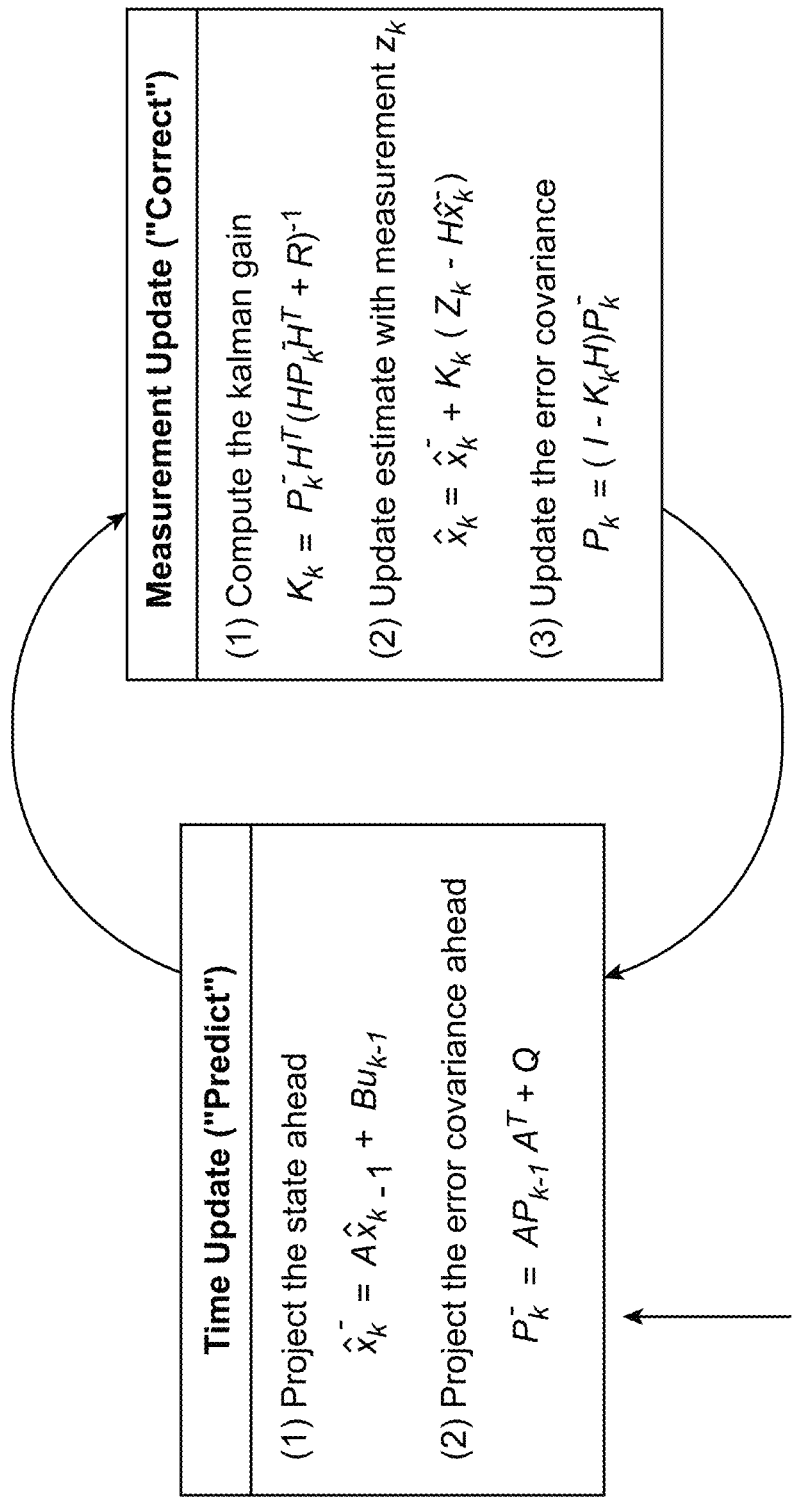
FIG. 18 illustrates tuning filter parameters in one or more embodiments.

In either case, whether or not some embodiments have a rational basis for choosing the parameters, often times superior filter performance (statistically speaking) can be obtained by tuning the filter parameters Q and R. The tuning is usually performed off-line, frequently with the help of another (distinct) Kalman filter in a process generally referred to as system identification as shown in FIG. 18.

Under conditions where Q and R are in fact constant, both the estimation error covariance Pk and the Kalman gain $K_k$ will stabilize quickly and then remain constant (see the filter update equations immediately above). If this is the case, these parameters can be pre-computed by either running the filter off-line, or for example by determining the steady-state value of $P_k$.

It is frequently the case however that the measurement error (in particular) does not remain constant. For example, when sighting beacons in an optoelectronic tracker ceiling panels, the noise in measurements of nearby beacons will be smaller than that in far-away beacons. Also, the process noise Q is sometimes changed dynamically during filter operation—becoming $Q_k$—in order to adjust to different dynamics. For example, in the case of tracking the head of a user of a 3D virtual environment some embodiments may reduce the magnitude of $Q_k$ if the user seems to be moving slowly, and increase the magnitude if the dynamics start changing rapidly. In such cases, $Q_k$ might be chosen to account for both uncertainty about the user's intentions and uncertainty in the model.

Extended Kalman Filter (EKF):

As described above, the Kalman filter addresses the general problem of trying to estimate the state $x \in \Re^m$ of a discrete-time controlled process that is governed by a linear stochastic difference equation. But what happens if the process to be estimated and (or) the measurement relationship to the process is non-linear? Some of the most interesting and successful applications of Kalman filtering have been such situations. A Kalman filter that linearizes about the current mean and covariance is referred to as an extended Kalman filter or EKF. In something akin to a Taylor series, some embodiments may linearize the estimation around the current estimate using the partial derivatives of the process and measurement functions to compute estimates even in the face of non-linear relationships. To do so, some embodiments begin by modifying some of the material presented above. Let us assume that the process again has a state vector $x \in \Re^n$, but that the process is now governed by the non-linear stochastic difference equation $$x_k = f(x_{k-1}, u_{k-1}, w_{k-1}), \tag{2.1}$$

with a measurement $z \in \Re^m$ that is $$z_k = h(x_k, v_k), \tag{2.2}$$

where the random variables $w_k$ and $v_k$ again represent the process and measurement noise as in (1.3) and (1.4). In this case the non-linear function f in the difference equation (2.1) relates the state at the previous time step k−1 to the state at the current time step k. It includes as parameters any driving function $u_{k-1}$ and the zero-mean process noise $w_k$. The non-linear function h in the measurement equation (2.2) relates the state $x_k$ to the measurement $z_k$.

In practice of course one does not know the individual values of the noise $w_k$ and $v_k$ at each time step. However, one can approximate the state and measurement vector without them as $$\tilde{x}_k = f(\hat{x}_{k-1}, u_{k-1}, 0), \tag{2.3}$$

and $$\tilde{z}_k = h(\tilde{x}_k, 0), \tag{2.4}$$

where $\hat{x}_k$ is some a posteriori estimate of the state (from a previous time step k).

It is noted that a fundamental flaw of the EKF is that the distributions (or densities in the continuous case) of the various random variables are no longer normal after undergoing their respective nonlinear transformations. The EKF is simply an ad hoc state estimator that only approximates the optimality of Bayes' rule by linearization. Some interesting work has been done by Julier et al. in developing a variation to the EKF, using methods that preserve the normal distributions throughout the non-linear transformations.

To estimate a process with non-linear difference and measurement relationships, some embodiments begin by writing new governing equations that linearize an estimate about (2.3) and (2.4), $$x_k \approx \tilde{x}_k + A(x_{k-1} - \hat{x}_{k-1}) + W w_{k-1}, \tag{2.5}$$

$$z_k \approx \tilde{z}_k + H(x_k - \tilde{x}_k) + V v_k. \tag{2.6}$$

where
  $x_k$ and $z_k$ are the actual state and measurement vectors,
  $\tilde{x}_k$ and $\tilde{z}_k$ are the approximate state and measurement vectors from (2.3) and (2.4),
  $\hat{x}_k$ is an a posteriori estimate of the gate at step k,
  the random variables $w_k$ and $v_k$ represent the process and measurement noise as in (1.3) and (1.4),
  A is the Jacobian matrix of partial derivatives of f with respect x, that is $$A_{[i,j]} = \frac{\partial f_{[i]}}{\partial x_{[j]}}(\hat{x}_{k-1}, u_{k-1}, 0),$$

W is the Jacobian matrix of partial derivatives of f with respect to w, $$W_{[i,j]} = \frac{\partial f_{[i]}}{\partial w_{[j]}}(\hat{x}_{k-1}, u_{k-1}, 0),$$

H is the Jacobian matrix of partial derivatives of h with respect to x, $$H_{[i,j]} = \frac{\partial h_{[i]}}{\partial x_{[j]}}(\bar{x}_k, 0),$$

V is the Jacobian matrix of partial derivatives of h with respect to v, $$V_{[i,j]} = \frac{\partial h_{[i]}}{\partial v_{[j]}}(\bar{x}_k, 0),$$

Note that for simplicity in the notation some embodiments may not use the time step subscript k with the Jacobians A, W, H, and V, even though they are in fact different at each time step.

Some embodiments define a new notation for the prediction error, $$\tilde{e}_{x_k} \equiv x_k - \tilde{x}_k, \qquad (2.7)$$

and the measurement residual, $$\tilde{e}_{z_k} \equiv \tilde{z}_k - \tilde{\tilde{z}}_k. \qquad (2.8)$$

Remember that in practice one does not have access to $x_k$ in (2.7), it is the actual state vector, e.g., the quantity one is trying to estimate. On the other hand, one does have access to $z_k$ in (2.8), it is the actual measurement that one is using to estimate $x_k$. Using (2.7) and (2.8) some embodiments may write governing equations for an error process as $$\tilde{e}_{x_k} \approx A(x_{k-1} - \hat{x}_{k-1}) + \varepsilon_k, \qquad (2.9)$$

$$\tilde{e}_{z_k} \approx H\tilde{e}_{x_k} + \eta_k, \qquad (2.10)$$

where $\varepsilon_k$ and $\eta_k$ represent new independent random variables having zero mean and covariance matrices $WQW^T$ and $VRV^T$, with Q and R in (1.3) and (1.4) respectively.

Notice that the equations (2.9) and (2.10) are linear, and that they closely resemble the difference and measurement equations (1.1) and (1.2) from the discrete Kalman filter. This motivates us to use the actual measurement residual $\tilde{e}_{z_k}$ in (2.8) and a second (hypothetical) Kalman filter to estimate the prediction error $\tilde{e}_{x_k}$ given by (2.9). This estimate, call it $\hat{e}_k$, could then be used along with (2.7) to obtain the a posteriori state estimates for the original non-linear process as $$\hat{x}_k = \bar{x}_k + \hat{e}_k, \qquad (2.11)$$

The random variables of (2.9) and (2.10) have approximately the following probability distributions:

$$p(\tilde{e}_{x_k}) \sim N(0, E[\tilde{e}_{x_k} \tilde{e}_{x_k}^T])$$

$$p(\varepsilon_k) \sim N(0, WQ_k W^T)$$

$$p(\eta_k) \sim N(0, VR_k V^T)$$

Given these approximations and letting the predicted value of $\hat{e}_k$ be zero, the Kalman filter equation used to estimate $\hat{e}_k$ is $$\hat{e}_k = K_k \tilde{e}_{z_k}. \qquad (2.12)$$

By substituting (2.12) back into (2.11) and making use of (2.8), the second (hypothetical) Kalman filter may not be needed or used:

$$\hat{x}_k = \bar{x}_k + K_k \tilde{e}_{z_k} \qquad (2.13)$$

$$= \bar{x}_k + K_k(z_k - \tilde{z}_k)$$

Equation (2.13) may now be used for the measurement update in the extended Kalman filter, with ick and $Z_k$ coming from (2.3) and (2.4), and the Kalman gain $K_k$ coming from (1.11) with the appropriate substitution for the measurement error covariance.

The complete set of EKF equations is shown below in Table 2-1 and Table 2-2 below. Note that some embodiments have substituted for ick to remain consistent with the earlier "super minus" a priori notation, and that some embodiments may attach the subscript k to the Jacobians A, W, H, and V, to reinforce the notion that they are different at (and therefore may be recomputed at) each time step.

TABLE 2-1

| EKF time update equations. | |
|---|---|
| $\hat{x}_k^- = f(\hat{x}_{k-1}, u_{k-1}, 0)$ | (2.14) |
| $P_k^- = A_k P_{k-1} A_k^T + W_k Q_{k-1} W_k^T$ | (2.15) |

As with the basic discrete Kalman filter, the time update equations in Table 2-1 project the state and covariance estimates from the previous time step k−1 to the current time step k. Again, f in (2.14) comes from (2.3), $A_k$ and $W_k$ are the process Jacobians at step k, and $Q_k$ is the process noise covariance (1.3) at step k.

TABLE 2-2

| EKF measurement update equations. | |
|---|---|
| $K_k = P_k^- H_k^T (H_k P_k^- H_k^T + V_k R_k V_k^T)^{-1}$ | (2.16) |
| $\hat{x}_k = \hat{x}_k^- + K_k(z_k - h(\hat{x}_k^-, 0))$ | (2.17) |
| $P_k = (I - K_k H_k) P_k^-$ | (2.18) |

As with the basic discrete Kalman filter, the measurement update equations in Table 2-2 correct the state and covariance estimates with the measurement $z_k$. Again, h in (2.17) comes from (2.4), $H_k$ and V are the measurement Jacobians at step k, and $R_k$ is the measurement noise covariance (1.4) at step k. (Note some embodiments now subscript R allowing it to change with each measurement.)

Figure 19:
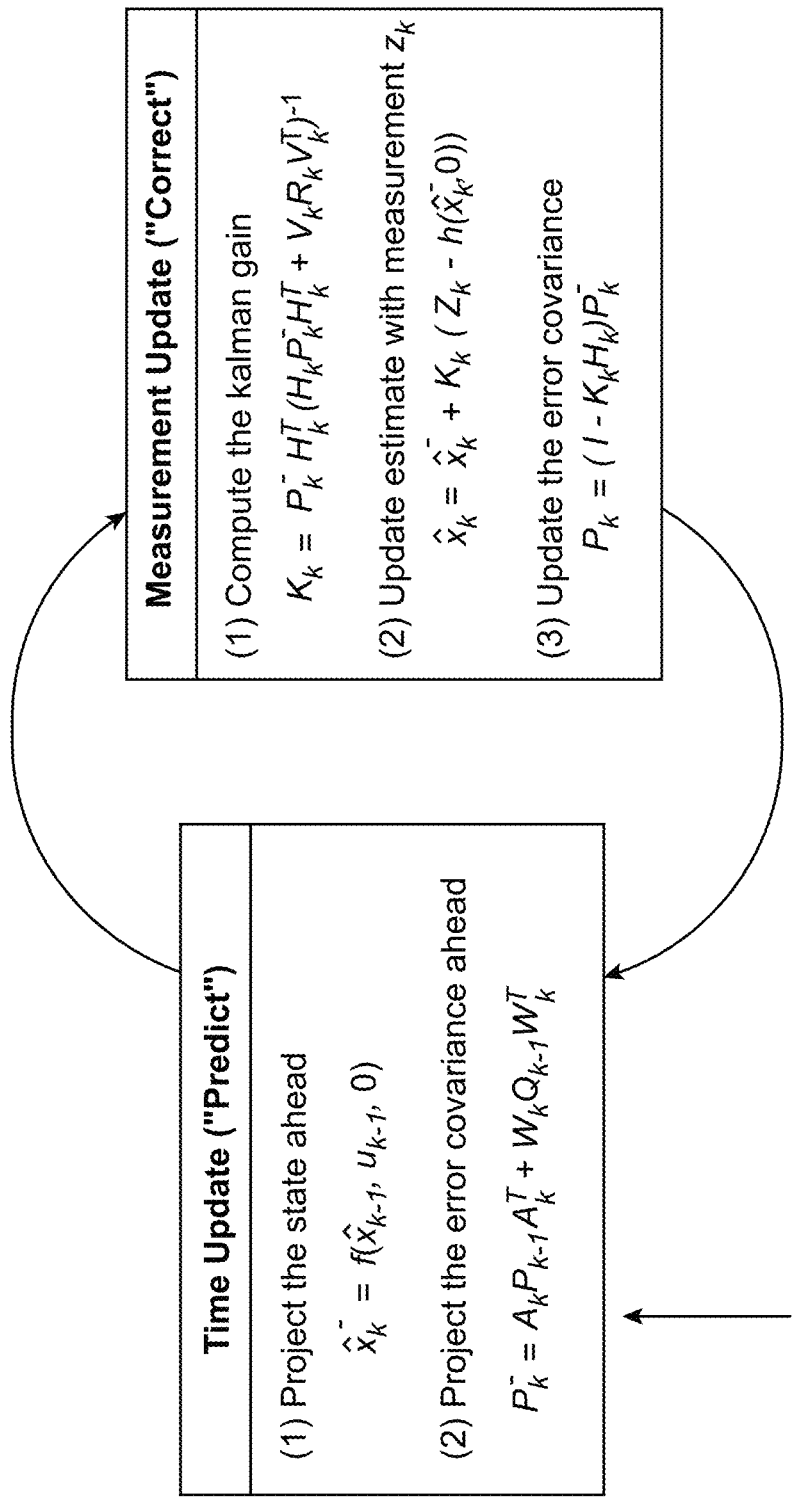
FIG. 19 illustrates operation of an Extended Kalman Filter in one or more embodiments.

The basic operation of the EKF is the same as the linear discrete Kalman filter as shown in FIG. 19, which offers a complete picture of the operation of the EKF, combining the high-level diagram of FIG. 1 with the equations from Table 2-1 and Table 2-2.

An important feature of the EKF is that the Jacobian $H_k$ in the equation for the Kalman gain $K_k$ serves to correctly propagate or "magnify" only the relevant component of the measurement information. For example, if there is not a one-to-one mapping between the measurement $Z_k$ and the state via h, the Jacobian $H_k$ affects the Kalman gain so that it only magnifies the portion of the residual $z_k - h(\hat{x}_k^-, 0)$ that does affect the state. If overall measurements there is not a one-to-one mapping between the measurement $z_k$ and the state via h, then as you might expect the filter will quickly diverge. In this case, the process may be unobservable.

Process model for Estimating a Random Constant:

The following attempts to estimate a scalar random constant, a voltage for example. Some embodiments have the ability to take measurements of the constant, but that the measurements are corrupted by a 0.1-volt RMS (root mean squared) white measurement noise (e.g., an analog to digital converter is not very accurate). In this example, the process is governed by the linear difference equation $$x_k = Ax_{k-1} + Bu_{k-1} + w_k,$$
$$= x_{k-1} + w_k,$$

with a measurement $z \in \Re^1$ that is $$z_k = Hx_k + v_k$$
$$= x_k + v_k.$$

The state does not change from step to step so A=1. There is no control input so u=0. The noisy measurement is of the state directly so H=1. (Notice that these embodiments dropped the subscript k in several places because the respective parameters remain constant in this simple model.)
The Filter Equations and Parameters:
The time update equations are $$\hat{x}_k^- = \hat{x}_{k-1},$$

$$P_k^- = P_{k-1} + Q,$$

and the measurement update equations are $$K_k = P_k^- (P_k^- + R)^{-1} \quad (3.1)$$
$$= \frac{P_k^-}{P_k^- + R},$$

$$\hat{x}_k = \hat{x}_k^- + K_k(z_k - \hat{x}_k^-),$$

$$P_K = (1 - K_k)P_k^-.$$

Presuming a very small process variance, some embodiments may let $Q=1e^{-5}$ in some embodiments while some other embodiments may let Q=0 but assuming a small but non-zero value gives more flexibility in "tuning" the filter as some embodiments will demonstrate below.) In some embodiments, the true value of the random constant has a standard normal probability distribution, so some embodiments will "seed" the filter with the guess that the constant is 0. In other words, before starting some embodiments let $\hat{x}_{k-1}=0$.

Similarly, some embodiments may choose an initial value for $P_{k-1}$, call it $P_0$. If the initial state estimate $\hat{x}_k=0$ was correct in some embodiments, these embodiments may let $P_0=0$. However, given the uncertainty in the initial estimate $\hat{x}_0$, choosing $P_0=0$ would cause the filter to initially and always believe $\hat{x}_k=0$. As it turns out, the alternative choice is not critical. Some embodiments may choose almost any $P_0 \neq 0$, and the filter may eventually converge. Some embodiments may start the filter with $P_0=1$.

Figure 11A:
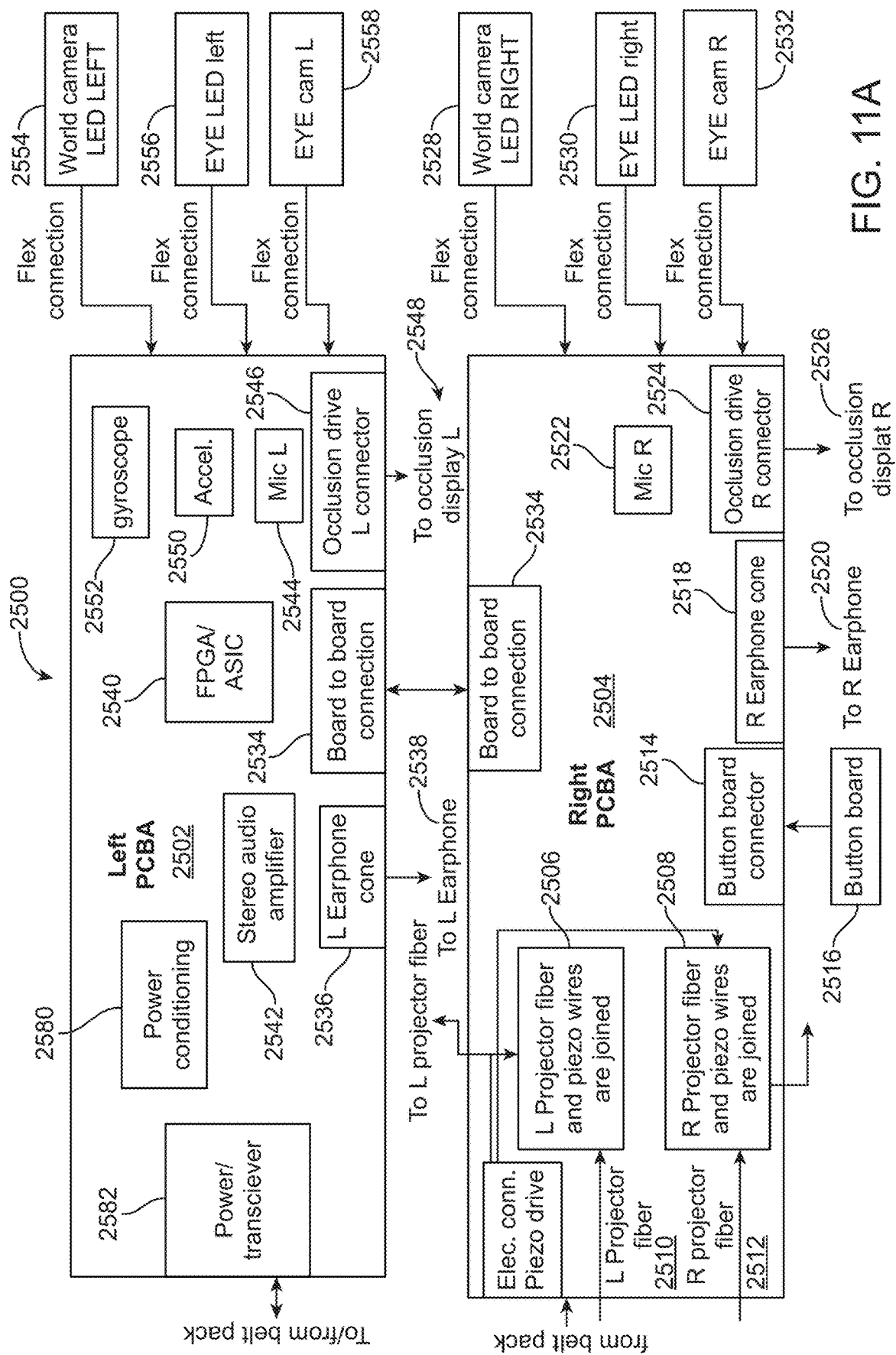
FIG. 11A illustrates example configurations of an array of micro-projectors and coupling the array of micro-projectors with an optical system in one or more embodiments.

Various embodiments described herein may be implemented on a head-mounted display (HMD) such as an XR system or other types of systems such as a standalone computing node, a clustered environment with multiple computing nodes, etc. A system may include a display subsystem (e.g., an array of projectors or micro-projectors) to project virtual contents to a user. FIG. 11A illustrates example configurations of an array of micro-projectors and coupling the array of micro-projectors with an optical system in one or more embodiments. More specifically, FIG. 11A shows an example architecture 2500 for the electronics operatively coupled to an optics system or XR device in one or more embodiments. The optics system or XR device itself or an external device (e.g., a belt pack) coupled to the or XR device may include one or more printed circuit board components, for instance left (2502) and right (2504) printed circuit board assemblies (PCBA). As illustrated, the left PCBA 2502 includes most of the active electronics, while the right PCBA 604 supports principally supports the display or projector elements.

The right PCBA 2504 may include a number of projector driver structures which provide image information and control signals to image generation components. For example, the right PCBA 2504 may carry a first or left projector driver structure 2506 and a second or right projector driver structure 2508. The first or left projector driver structure 2506 joins a first or left projector fiber 2510 and a set of signal lines (e.g., piezo driver wires). The second or right projector driver structure 2508 joins a second or right projector fiber 2512 and a set of signal lines (e.g., piezo driver wires). The first or left projector driver structure 2506 is communicatively coupled to a first or left image projector, while the second or right projector drive structure 2508 is communicatively coupled to the second or right image projector.

In operation, the image projectors render virtual content to the left and right eyes (e.g., retina) of the user via respective optical components, for instance waveguides and/or compensation lenses to alter the light associated with the virtual images.

The image projectors may, for example, include left and right projector assemblies. The projector assemblies may use a variety of different image forming or production technologies, for example, fiber scan projectors, liquid crystal displays (LCD), LCOS (Liquid Crystal On Silicon) displays, digital light processing (DLP) displays. Where a fiber scan projector is employed, images may be delivered along an optical fiber, to be projected therefrom via a tip of the optical fiber. The tip may be oriented to feed into the waveguide. The tip of the optical fiber may project images, which may be supported to flex or oscillate. A number of piezoelectric actuators may control an oscillation (e.g., frequency, amplitude) of the tip. The projector driver structures provide images to respective optical fiber and control signals to control the piezoelectric actuators, to project images to the user's eyes.

Continuing with the right PCBA 2504, a button board connector 2514 may provide communicative and physical coupling to a button board 2516 which carries various user accessible buttons, keys, switches or other input devices. The right PCBA 2504 may include a right earphone or speaker connector 2518, to communicatively couple audio signals to a right earphone 2520 or speaker of the head worn component. The right PCBA 2504 may also include a right microphone connector 2522 to communicatively couple audio signals from a microphone of the head worn component. The right PCBA 2504 may further include a right occlusion driver connector 2524 to communicatively couple occlusion information to a right occlusion display 2526 of the head worn component. The right PCBA 2504 may also include a board-to-board connector to provide communications with the left PCBA 2502 via a board-to-board connector 2534 thereof.

The right PCBA 2504 may be communicatively coupled to one or more right outward facing or world view cameras 2528 which are body or head worn, and optionally a right cameras visual indicator (e.g., LED) which illuminates to indicate to others when images are being captured. The right PCBA 2504 may be communicatively coupled to one or more right eye cameras 2532, carried by the head worn component, positioned and orientated to capture images of the right eye to allow tracking, detection, or monitoring of orientation and/or movement of the right eye. The right PCBA 2504 may optionally be communicatively coupled to one or more right eye illuminating sources 2530 (e.g., LEDs), which as explained herein, illuminates the right eye with a pattern (e.g., temporal, spatial) of illumination to facilitate tracking, detection or monitoring of orientation and/or movement of the right eye.

The left PCBA 2502 may include a control subsystem, which may include one or more controllers (e.g., microcontroller, microprocessor, digital signal processor, graphical processing unit, central processing unit, application specific integrated circuit (ASIC), field programmable gate array (FPGA)) 2540, and/or programmable logic unit (PLU)). The control system may include one or more non-transitory computer- or processor readable medium that stores executable logic or instructions and/or data or information. The non-transitory computer- or processor readable medium may take a variety of forms, for example volatile and nonvolatile forms, for instance read only memory (ROM), random access memory (RAM, DRAM, SD-RAM), flash memory, etc. The non-transitory computer or processor readable medium may be formed as one or more registers, for example of a microprocessor, FPGA or ASIC.

The left PCBA 2502 may include a left earphone or speaker connector 2536, to communicatively couple audio signals to a left earphone or speaker 2538 of the head worn component. The left PCBA 2502 may include an audio signal amplifier (e.g., stereo amplifier) 2542, which is communicative coupled to the drive earphones or speakers. The left PCBA 2502 may also include a left microphone connector 2544 to communicatively couple audio signals from a microphone of the head worn component. The left PCBA 2502 may further include a left occlusion driver connector 2546 to communicatively couple occlusion information to a left occlusion display 2548 of the head worn component.

The left PCBA 2502 may also include one or more sensors or transducers which detect, measure, capture or otherwise sense information about an ambient environment and/or about the user. For example, an acceleration transducer 2550 (e.g., three axis accelerometer) may detect acceleration in three axes, thereby detecting movement. A gyroscopic sensor 2552 may detect orientation and/or magnetic or compass heading or orientation. Other sensors or transducers may be similarly employed.

The left PCBA 2502 may be communicatively coupled to one or more left outward facing or world view cameras 2554 which are body or head worn, and optionally a left cameras visual indicator (e.g., LED) 2556 which illuminates to indicate to others when images are being captured. The left PCBA may be communicatively coupled to one or more left eye cameras 2558, carried by the head worn component, positioned and orientated to capture images of the left eye to allow tracking, detection, or monitoring of orientation and/or movement of the left eye. The left PCBA 2502 may optionally be communicatively coupled to one or more left eye illuminating sources (e.g., LEDs) 2556, which as explained herein, illuminates the left eye with a pattern (e.g., temporal, spatial) of illumination to facilitate tracking, detection or monitoring of orientation and/or movement of the left eye.

The PCBAs 2502 and 2504 are communicatively coupled with the distinct computation component (e.g., belt pack) via one or more ports, connectors and/or paths. For example, the left PCBA 2502 may include one or more communications ports or connectors to provide communications (e.g., bi-directional communications) with the belt pack. The one or more communications ports or connectors may also provide power from the belt pack to the left PCBA 2502. The left PCBA 2502 may include power conditioning circuitry 2580 (e.g., DC/DC power converter, input filter), electrically coupled to the communications port or connector and operable to condition (e.g., step up voltage, step down voltage, smooth current, reduce transients).

The communications port or connector may, for example, take the form of a data and power connector or transceiver 2582 (e.g., Thunderbolt® port, USB® port). The right PCBA 2504 may include a port or connector to receive power from the belt pack. The image generation elements may receive power from a portable power source (e.g., chemical battery cells, primary or secondary battery cells, ultra-capacitor cells, fuel cells), which may, for example be located in the belt pack.

As illustrated, the left PCBA 2502 includes most of the active electronics, while the right PCBA 2504 supports principally supports the display or projectors, and the associated piezo drive signals. Electrical and/or fiber optic connections are employed across a front, rear or top of the body or head worn component of the optics system or XR device. Both PCBAs 2502 and 2504 are communicatively (e.g., electrically, optically) coupled to the belt pack. The left PCBA 2502 includes the power subsystem and a high-speed communications subsystem. The right PCBA 2504 handles the fiber display piezo drive signals. In the illustrated embodiment, only the right PCBA 2504 needs to be optically connected to the belt pack. In other embodiments, both the right PCBA and the left PCBA may be connected to the belt pack.

While illustrated as employing two PCBAs 2502 and 2504, the electronics of the body or head worn component may employ other architectures. For example, some implementations may use a fewer or greater number of PCBAs. As another example, various components or subsystems may be arranged differently than illustrated in FIG. 11A. For example, in some alternative embodiments some of the components illustrated in FIG. 11A as residing on one PCBA may be located on the other PCBA, without loss of generality.

As described herein with reference to, for example, FIG. 1, an optics system or an XR device described herein may present virtual contents to a user so that the virtual contents may perceived as three-dimensional contents in some embodiments. In some other embodiments, an optics system or XR device may present virtual contents in a four- or five-dimensional lightfield (or light field) to a user.

Figure 11B:
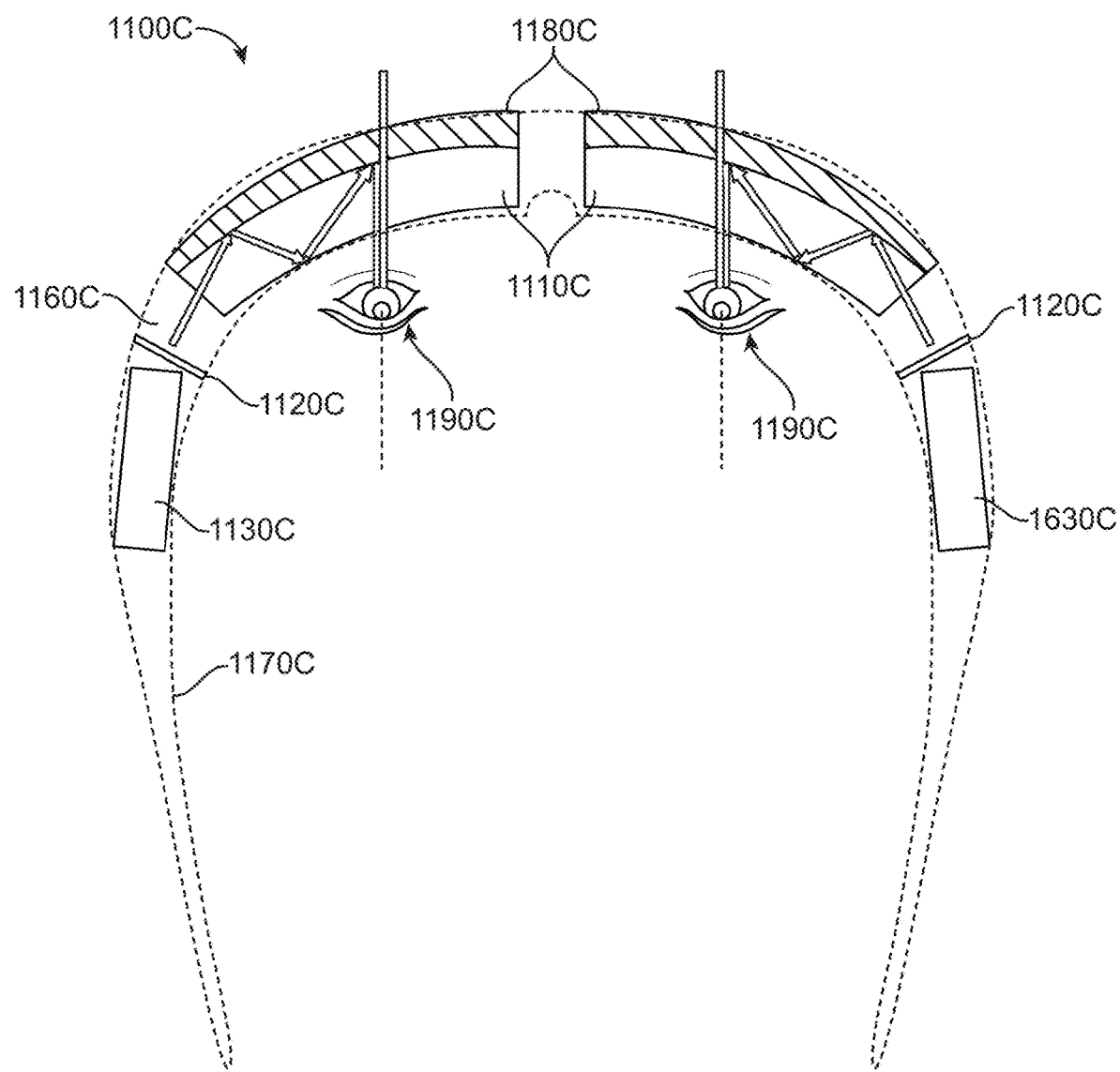
FIG. 11B illustrates a top view of some example components of a schematic representation of a wearable XR device in one or more embodiments.
Figure 11C:
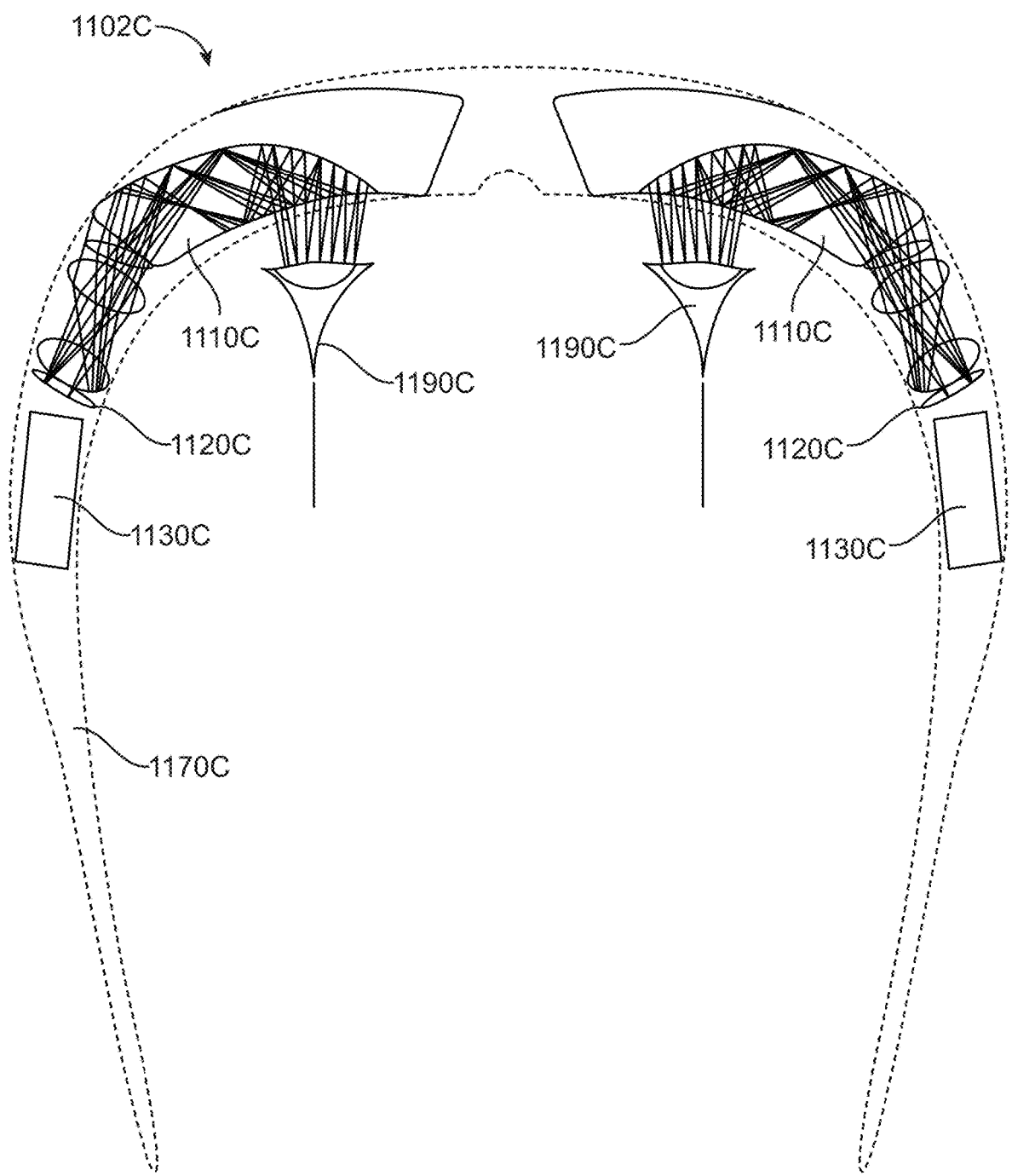
FIG. 11C illustrates an example embodiment of a schematic representation of wearable XR device in one or more embodiments.

As illustrated in FIGS. 11B-C, the light field generation subsystem (e.g., 1100C and 1102C respectively) is preferably operable to produce a light field. For example, an optical apparatus 1160C or subsystem may generate or project light to simulate a four-dimensional (4D) or five-dimensional (5D) light field that would be produced by light reflecting from a real three-dimensional object or scene. For instance, an optical apparatus such as a wave guide reflector array projector (WRAP) apparatus 1110C or multiple depth plane three-dimensional (3D) display system may generate or project multiple virtual depth planes at respective radial focal distances to simulate a 4D or 5D light field in some embodiments. In these embodiments, the optics system or XR device functions as a near-eye light field generator and display of 4D or 5D light field by interpreting input images as two-dimensional (2D) slices of a 4D function that represents the light field. It shall be noted that FIGS. 11B-C may illustrate an optics system or XR device having a light field generation subsystem described herein in some embodiments or a stereoscopic virtual content generation subsystem that projects light beams corresponding to multiple depth planes to a user's eye(s) in some other embodiments.

In some embodiments, the optics system or XR device renders stereoscopic representations of virtual contents to a user with image-based rendering that generates different views of a virtual content from a set of pre-acquired or pre-computed imagery. The virtual content may be blended or placed in an environment in which a user viewing the virtual content is located by using, for example, one or more of an environment map, a world map, a topological map (e.g., a map having point nodes representing respective locations and/or features and edges connecting nodes and representing one or more relations between connected nodes, etc.) In these embodiments, the optics system or XR device uses one or more display or rendering algorithms for image-based rendering that requires relatively modest (e.g., compared to generation of a light field for the same virtual content) computational resources, especially in real-time implementations of the virtual content. Moreover, the cost of interactions with the generated virtual content may be independent of the complexities of the virtual content. Moreover, the source of the images used in generating the virtual content may be real (e.g., photographs or video sequences of a physical object) or virtual (e.g., from one or more models).

These embodiments based on image-based rendering and one or more maps may be based on one or more fixed viewpoints (e.g., a viewpoint from which a set of images for rendering the imaged-based virtual content is acquired). Some of these embodiments use depth values (e.g., depth information acquired by a depth sensor or computed by localization techniques such as triangulation, etc.) to relax the fixed viewpoint limit by view interpolation. In these embodiments, the optics system or XR device uses depth information (e.g., depth data for a smaller subset of pixels in an image or for each pixel in the image) for view interpretation in order to reproject points in, for example, the environment map (e.g., a geometric map having detailed geometric and/or geographical information of features, points, etc. in the map) relative to the user based on, for example, the location, the orientation, and/or the gaze direction of the user.

Some other embodiments using the image-based rendering and one or more maps relaxed the fixed viewpoint limit by determining corresponding point(s) and/or correspondences in a pair of images used for rendering the virtual content based at least in part upon the positions of the image sensor(s) capturing the pair of images. Both classes of embodiments with image-based rendering effectively generate and present virtual contents that may be perceived as stereoscopic by viewing users although there may exist situations where, for example, determining the correspondences between pair(s) of images may not necessarily be deterministically performed.

Some other embodiments thus generate a 4D or 5D light field with the optics system or XR device, rather than adopting the aforementioned image-based rendering. A light field may be generated with a 5D function (e.g., a 5D plenoptic function) and includes the radiance at a point in a given direction in a three-dimensional space. Therefore, a light field may include the 5D function that defines a set of spatial-angular images. In these embodiments where the radiance R at a point A having the coordinate (x, y, z) in space propagates along a direction $D(\phi,\theta)$ may have the form of $R(x, y, z, \phi,\theta)$ where $\phi$ has a range of $[0, \pi]$, inclusive, and $\theta$ has the range of $[0, 2\pi]$, also inclusive. In this form, $\phi$ denotes the angle from the horizontal plane defined by the x-axis and y-axis; and $\theta$ denotes an angle between a vector connecting the point in the 3D space and the origin of the coordinate system and a reference unit vector (e.g., a unit vector along the x-axis).

In some embodiments, radiance is conserved in a medium (e.g., a transparent medium such as air). The above 5D function exhibits a certain amount of redundancy due to radiance conservation. In these embodiments, the aforementioned 5D function representing the light field may be reduced to a 4D function $R(x, y, \phi,\theta)$ when the optics system or XR device creates the 5D function in a surface (e.g., the plane z=0) and thus effectively reduces the 5D function having three spatial dimensions (x, y, z) and two angular dimensions $(\phi,\theta)$ into a 4D function having two spatial dimensions (x, y) and two angular dimensions $(\phi,\theta)$. Reducing the dimensionality of the light field function from a 5D function into a 4D function not only expedites the generation of the light field for virtual contents but also conserves computational resources.

In these embodiments, an optics system or XR device described herein generate and present a light field for a virtual content to a user by computing the respective radiance of a plurality of points for the virtual content with the aforementioned 4D function (or 5D function in a more general application of the light field techniques). The computed radiance (or radiance flux) for a point includes data for the light emitted, reflected, transmitted, or received by the point and may be computed based on a per projected area basis. The radiance for a point may also include frequency and/or wavelength information and is directional as the radiance represents what the point representing a point (e.g., a pixel or a set of pixels) or a portion of the virtual content may be perceived by a user of the optics system or XR device. The radiance may be computed with any techniques such as parameterizing a line (e.g., a line from a user's eye to a point of a virtual content) by the point and a direction with orthographic image(s) or image(s) with a fixed field of view using homogeneous coordinates. For example, radiance of a point may be determined by using the light slab techniques that restrict the point for the virtual content and the point representing an eye of the user to lie with a respective convex quadrilateral and by mapping between the point of the virtual content (e.g., an image pixel of the virtual content) and the point representing an eye of a user with a linear projective map (e.g., a 3×3 matrix).

For example, an optics system or XR device or the electronics (e.g., the aforementioned belt pack) may generate a light slab by rendering 2D array of images where each image represents a slice of the 4D light slab at a fixed plane and is formed by placing the center of the projection of a virtual camera at the sample location corresponding to the point of the virtual content by performing a sheared perspective projection that is substantially similar to that used to generate a stereo pair of images. In some embodiments, a light slab may be formed from a 2D array of orthographic views.

For generating and presenting a light field representation for a virtual content to a user via the optics system or XR device, a lens (e.g., 1180C in FIG. 11B) of the optics system or XR device may include a stack of one or more planar or free-form waveguides where a waveguide may define one or more distinct focal planes that respectively correspond to one or more distinct focal distances. The stack of one or more planar or free-form waveguides may thus define a plurality of focal planes located at corresponding focal distances in some embodiments. A 2D slice of image may be rendered on a focal plane at a specific focal distance, and a set of 2D slices may thus be rendered at a plurality of focal planes to represent a virtual content that may then be perceived as stereoscopic by a user of the optics system or XR device.

In some embodiments, a waveguide may comprise an orthogonal pupil expansion (OPE) element associated with the first face of the planar optical waveguide for splitting the in-coupled light beam into a first set of orthogonal light beamlets, and a second orthogonal pupil expansion (OPE) element associated with the second face of the planar optical waveguide for splitting the in-coupled light beam into a second set of orthogonal light beam lets. In some embodiments, the first OPE element is disposed on the first face of the planar optical waveguide, and the second OPE element is disposed on the second face of the planar optical waveguide. The in-coupling element may be configured for optically coupling the collimated light beam from the image projection assembly as the in-coupled light beam for propagation within the planar optical waveguide via total internal reflection (TIR) along a first optical path that alternately intersects the first OPE element and the second OPE element, such that portions of the in-coupled light beam are deflected as the respective first set of orthogonal light beam lets and the second set of orthogonal light beamlets that propagate within the planar optical waveguide via TIR along second parallel optical paths. In this case, the second parallel optical paths may be orthogonal to the first optical path.

In some embodiments, the semi-reflective interfaces are configured for splitting the in-coupled light beam into at least two in-coupled light beamlets. In this case, the DOE(s) comprises an orthogonal pupil expansion (OPE) element configured for respectively splitting the at least two in-coupled light beamlets into at least two sets of orthogonal light beam lets, the semi-reflective interfaces are further configured for splitting the at least two sets of orthogonal light beam lets into at least four sets of orthogonal light beamlets, and the DOE(s) comprises an exit pupil expansion (EPE) element configured for splitting the at least four sets of orthogonal light beam lets into the set of out-coupled light beam lets. The OPE element and EPE element may be disposed on a face of the optical planar waveguide.

In some embodiments, a waveguide may comprise an exit pupil expansion (EPE) element associated with the planar optical waveguide for splitting the orthogonal light beamlets into an array of out-coupled light beamlets (e.g., a two-dimensional out-coupled light beamlet array) that exit the planar optical waveguide. The collimated light beam may define an entrance pupil, and the out-coupled light beam let array may define an exit pupil larger than the entrance pupil, e.g., at least ten times larger than the entrance pupil, or even at least one hundred times larger than the entrance pupil.

In some embodiments, the EPE element is disposed on one of the first and second surfaces of the planar optical waveguide. The first set of orthogonal light beam lets and the second set of orthogonal light beam lets may intersect the EPE element, such that portions of the first set of orthogonal light beam lets and the second set of orthogonal light beamlets are deflected as the out-coupled light beamlet array out of the planar optical waveguide. In some embodiments, the EPE element is configured for imparting a convex wavefront profile on the out-coupled light beamlet array exiting the planar optical waveguide. In this case, the convex wavefront profile may have a center of radius at a focal point to produce an image at a given focal plane. In another embodiment, each of the IC element, OPE element, and EPE element is diffractive.

The virtual image generation system further comprises one or more diffractive optical elements (DOEs) associated with the planar optical waveguide for further splitting the plurality of primary light beamlets into an array of out-coupled light beamlets (e.g., a two-dimensional out-coupled beam let array) that exit a face of the planar optical waveguide. The collimated light beam may define an entrance pupil, and the out-coupled light beam let array may define an exit pupil larger than the entrance pupil, e.g., at least ten times larger than the entrance pupil, or even at least one hundred times larger than the entrance pupil. In some embodiments, the first thickness of the primary substrate and the second thicknesses of the secondary substrates are selected, such that spacings between centers of at least two adjacent ones of the out-coupled light beamlets are equal to or less than a width of the collimated light beam. In another embodiment, the first thickness and the second thicknesses are selected, such that no gap resides between edges of greater than half of adjacent ones of the out-coupled light beamlets.

In some embodiments, the semi-reflective interfaces are configured for splitting the in-coupled light beam into at least two in-coupled light beamlets. In this case, the DOE(s) comprises an orthogonal pupil expansion (OPE) element configured for respectively splitting the at least two in-coupled light beamlets into at least two sets of orthogonal light beam lets, the semi-reflective interfaces are further configured for splitting the at least two sets of orthogonal light beam lets into at least four sets of orthogonal light beamlets, and the DOE(s) comprises an exit pupil expansion (EPE) element configured for splitting the at least four sets of orthogonal light beam lets into the set of out-coupled light beam lets. The OPE element and EPE element may be disposed on a face of the optical planar waveguide.

The at least two in-coupled light beamlets may propagate within the planar optical waveguide via total internal reflection (TIR) along a first optical path that intersects the OPE element, such that portions of the at least two in-coupled light beamlets are diffracted as the at least two sets of orthogonal light beamlets that propagate within the planar optical waveguide via TIR along second parallel optical paths. The second parallel optical paths may be orthogonal to the first optical path. The at least two sets of orthogonal light beamlets may intersect the EPE element, such that portions of the at least two sets of orthogonal light beamlets are diffracted as the out-coupled set of light beamlets out of the face of the planar optical waveguide. In some embodiments, the EPE element may be configured for imparting a convex wavefront profile on the out-coupled light beamlet array exiting the planar optical waveguide. In this case, the convex wavefront profile may have a center of radius at a focal point to produce an image at a given focal plane.

In accordance with a third aspect of the present disclosure, a virtual image generation system comprises a planar optical waveguide comprising a plurality of substrates including a primary substrate having a first thickness, at least one secondary substrate respectively having at least one second thicknesses, and at least one semi-reflective interface respectively disposed between the substrates.

The first thickness is at least twice each of the at least one second thickness. In some embodiments, the first thickness is a non-multiple of each of the second thickness(es). In another embodiment, the secondary substrate(s) comprises a plurality of secondary substrates. In this case, the second thicknesses may be equal to each other or two or more of the secondary substrate(s) may have second thicknesses that are not equal to each other. The first thickness may be a non-multiple of at least one of the second thicknesses. At least two of the unequal second thicknesses may be non-multiples of each other.

In some embodiments, each of the semi-reflective interface(s) comprises a semi-reflective coating, which may be, e.g., respectively disposed between the substrates via one of physical vapor deposition (PVD), ion-assisted deposition (IAD), and ion beam sputtering (IBS). Each of the coatings may, e.g., be composed of one or more of a metal (Au, Al, Ag, Ni—Cr, Cr and so on), dielectric (Oxides, Fluorides and Sulfides), and semiconductors (Si, Ge). In yet another embodiment, adjacent ones of the substrates are composed of materials having different indices of refraction.

The virtual image generation system further comprises an in-coupling (IC) element configured for optically coupling a collimated light beam from an image projection assembly for propagation as an in-coupled light beam within the planar optical waveguide. The image projection assembly may comprise a scanning device configured for scanning the collimated light beam. The semi-reflective interface(s) are configured for splitting the in-coupled light beam into a plurality of primary light beamlets that propagate within the primary substrate.

The virtual image generation system further comprises one or more diffractive optical elements (DOEs) associated with the planar optical waveguide for further splitting the plurality of primary light beamlets into an array of out-coupled light beamlets (e.g., a two-dimensional out-coupled beam let array) that exit a face of the planar optical waveguide. The collimated light beam may define an entrance pupil, and the out-coupled light beam let array may define an exit pupil larger than the entrance pupil, e.g., at least ten times larger than the entrance pupil, or even at least one hundred times larger than the entrance pupil. In some embodiments, the first thickness of the primary substrate and the second thickness(es) of the secondary substrate(s) are selected, such that spacings between centers of at least two adjacent ones of the out-coupled light beamlets are equal to or less than a width of the collimated light beam. In another embodiment, the first thickness and the second thickness(es) are selected, such that no gap resides between edges of greater than half of adjacent ones of the out-coupled light beamlets.

In some embodiments, the semi-reflective interface(s) are configured for splitting the in-coupled light beam into at least two in-coupled light beamlets. In this case, the DOE(s) comprises an orthogonal pupil expansion (OPE) element configured for respectively splitting the at least two in-coupled light beamlets into at least two sets of orthogonal light beamlets, the semi-reflective interface(s) are further configured for splitting the at least two sets of orthogonal light beamlets into at least four sets of orthogonal light beamlets, and the DOE(s) comprises an exit pupil expansion (EPE) element configured for splitting the at least four sets of orthogonal light beamlets into the set of out-coupled light beamlets. The OPE element and EPE element may be disposed on a face of the optical planar waveguide.

The at least two in-coupled light beamlets may propagate within the planar optical waveguide via total internal reflection (TIR) along a first optical path that intersects the OPE element, such that portions of the at least two in-coupled light beamlets are diffracted as the at least two sets of orthogonal light beamlets that propagate within the planar optical waveguide via TIR along second parallel optical paths. The second parallel optical paths may be orthogonal to the first optical path. The at least two sets of orthogonal light beamlets may intersect the EPE element, such that portions of the at least two sets of orthogonal light beamlets are diffracted as the out-coupled set of light beamlets out of the face of the planar optical waveguide. In some embodiments, the EPE element may be configured for imparting a convex wavefront profile on the out-coupled light beamlet array exiting the planar optical waveguide. In this case, the convex wavefront profile may have a center of radius at a focal point to produce an image at a given focal plane.

In accordance with a fourth aspect of the present disclosure, a virtual image generation system comprises a pre-pupil expansion (PPE) element configured for receiving a collimated light beam from an imaging element and splitting the collimated light beam into a set of initial out-coupled light beamlets. The virtual image generations system further comprises a planar optical waveguide, an in-coupling (IC) element configured for optically coupling the set of initial out-coupled light beamlets into the planar optical waveguide as a set of in-coupled light beamlets, and one or more diffractive elements associated with the planar optical waveguide for splitting the set of in-coupled light beam lets into a set of final out-coupled light beam lets that exit a face of the planar optical waveguide. The diffractive element(s) may comprise an orthogonal pupil expansion (OPE) element associated with the planar optical waveguide for further splitting the set of in-coupled light beam lets into a set of orthogonal light beamlets, and an exit pupil expansion (EPE) element associated with the planar optical waveguide for splitting the set of orthogonal light beam lets into the set of final out-coupled light beamlets.

In some embodiments, the collimated light beam defines an entrance pupil, the set of initial out-coupled light beamlets define a pre-expanded pupil larger than the entrance pupil, and the set of final out-coupled light beamlets define an exit pupil larger than the pre-expanded pupil. In one example, the pre-expanded pupil is at least ten times larger than the entrance pupil, and the exit pupil is at least ten times larger than the pre-expanded pupil. In some embodiments, the set of initial out-coupled light beamlets is optically coupled into the planar optical waveguide as a two-dimensional light beamlet array, and the set of final out-coupled light beam lets exits the face of the planar optical waveguide as a two-dimensional light beamlet array. In another embodiment, the set of initial out-coupled light beamlets is optically coupled into the planar optical waveguide as a one-dimensional light beam let array, and the set of final out-coupled set of light beam lets exits the face of the planar optical waveguide as a two-dimensional light beam let array.

In some embodiments, the PPE element comprises a mini-planar optical waveguide, a mini-OPE element associated with the mini-planar optical waveguide for splitting the collimated light beam into a set of initial orthogonal light beamlets, and a mini-EPE element associated with the mini-planar optical waveguide for splitting the set of initial orthogonal light beamlets into the set of initial out-coupled light beamlets that exit a face of the mini-planar optical waveguide. The PPE may further comprise a mini-IC element configured for optically coupling the collimated light beam into the planar optical waveguide.

In another embodiment, the PPE element comprises a diffractive beam splitter (e.g., a 1×N beam splitter or a M×N beam splitter) configured for splitting the collimated light beam into an initial set of diverging light beamlets, and a lens (e.g., a diffractive lens) configured for re-collimating the initial set of diverging light beam lets into the set of initial out-coupled light beam lets.

In still another embodiment, the PPE element comprises a prism (e.g., a solid prism or a cavity prism) configured for splitting the collimated light beam into the set of in-coupled light beamlets. The prism may comprise a semi-reflective prism plane configured for splitting the collimated light beam into the set of in-coupled light beamlets. The prism may comprise a plurality of parallel prism planes configured for splitting the collimated light beam into the set of in-coupled light beamlets. In this case, the parallel prism planes may comprise the semi-reflective prism plane. The plurality of parallel prism planes may comprise a completely reflective prism plane, in which case, a portion of the collimated light beam may be reflected by the at least one semi-reflective prism in a first direction, and a portion of the collimated light beam may be transmitted to the completely reflective prism plane for reflection in the first direction. The prism may comprise a first set of parallel prism planes configured for splitting the collimated light beam into a set of initial orthogonal light beamlets that are reflected in a first direction, and a second set of parallel prism planes configured for splitting the initial orthogonal light beam lets into the set of in-coupled light beam lets that are reflected in a second direction different from the first direction. The first and second directional may be orthogonal to each other.

In yet another embodiment, the PPE element comprises a first planar optical waveguide assembly configured for splitting the collimated light beam into a two-dimensional array of out-coupled light beamlets (e.g., an N×N light beamlet array) that exits a face of the first planar optical waveguide assembly, and a second planar optical waveguide assembly configured for splitting the two-dimensional out-coupled light beam let array into multiple two-dimensional arrays of out-out-coupled light beamlets that exit a face of the second planar optical waveguide assembly as the set of in-coupled light beam lets. The first and second planar optical waveguide assemblies may respectively have unequal thicknesses.

The two-dimensional out-coupled light beamlet array has an inter-beamlet spacing, and the multiple two-dimensional out-coupled light beamlet arrays are spatially offset from each other by an inter-array spacing different from the inter-beamlet spacing of the two-dimensional out-coupled light beam let array. In some embodiments, the inter-array spacing of the multiple two-dimensional out-coupled light beamlet arrays and the inter-beamlet spacing of the two-dimensional out-coupled light beamlet array are non-multiples of each other. The inter-array spacing of the multiple two-dimensional out-coupled light beam let arrays may be greater than the inter-beam let spacing of the two-dimensional out-coupled light beam let array.

In some embodiments, the first planar optical waveguide assembly comprises a first planar optical waveguide having opposing first and second faces, a first in-coupling (IC) element configured for optically coupling the collimated light beam for propagation within the first planar optical waveguide via total internal reflection (TIR) along a first optical path, a first exit pupil expander (EPE) element associated with the first planar optical waveguide for splitting the collimated light beam into a one-dimensional light beamlet array that exit the second face of the first planar optical waveguide, a second planar optical waveguide having opposing first and second faces, a second IC element configured for optically coupling the one-dimensional light beam let array for propagation within the second planar optical waveguide via TIR along respective second optical paths that are perpendicular to the first optical path, and a second exit pupil expander (EPE) element associated with the second planar optical waveguide for splitting the one-dimensional light beamlet array into the two-dimensional light beamlet array that exit the second face of the second planar optical waveguide. In this case, the first face of the second planar optical waveguide may be affixed to the second face of the first planar optical waveguide. The first and second planar optical waveguides may respectively have substantially equal thicknesses.

The second planar optical waveguide assembly may comprise a third planar optical waveguide having opposing first and second faces, a third IC element configured for optically coupling the first two-dimensional light beamlet array for propagation within the third planar optical waveguide via TIR along respective third optical paths, a third EPE element associated with the third planar optical waveguide for splitting the two-dimensional light beam let array into a plurality of two-dimensional light beam let arrays that exit the second face of the third planar optical waveguide, a fourth planar optical waveguide having opposing first and second faces, a fourth IC element configured for optically coupling the plurality of two-dimensional light beam let arrays for propagation within the fourth planar optical waveguide via TIR along respective fourth optical paths that are perpendicular to the third optical paths, and a fourth EPE element associated with the fourth planar optical waveguide for splitting the plurality of two-dimensional light beamlet arrays into the multiple two-dimensional light beamlet arrays that exit the second face of the fourth planar optical waveguide as the input set of light beam lets. In this case, the first face of the fourth planar optical waveguide may be affixed to the second face of the third planar optical waveguide, and first face of the third planar optical waveguide may be affixed to the second face of the second planar optical waveguide. The first and second planar optical waveguides may respectively have substantially equal thicknesses, and the third and fourth planar optical waveguides may respectively have substantially equal thicknesses. In this case, the substantially equal thicknesses of the first and second planar optical waveguides may be different from the substantially equal thicknesses of the third and fourth planar optical waveguides. The equal thicknesses of the third and fourth planar optical waveguides may be greater than the equal thicknesses of the first and second planar optical waveguides.

The optical apparatus 1160C in the form of a WRAP apparatus 1110C or multiple depth plane 3D display system may, for instance, project images into each eye of a user, either directly or indirectly. When the number and radial placement of the virtual depth planes is comparable to the depth resolution of the human vision system as a function of radial distance, a discrete set of projected depth planes mimics the psycho-physical effect that is produced by a real, continuous, three-dimensional object or scene. In one or more embodiments, the system 1100C may comprise a frame 1170C that may be customized for each AR user. Additional components of the system 1100C may include electronics 1130C (e.g., some or all of the electronics illustrated in FIG. 11A) to connect various electrical and electronic subparts of the AR system to each other.

The system 1100C may further comprise a microdisplay 1120C that projects light associated with one or more virtual images into the waveguide prism 1110C. As shown in FIG. 11B, the light produced from the microdisplay 1120C travels within the waveguide 1110C, and some of light reaches the user's eyes 1190C. In one or more embodiments, the system 1100C may further comprise one or more compensation lenses 1180C to alter the light associated with the virtual images. FIG. 11C illustrates the same components as FIG. 11B, but illustrates how light from the microdisplays 1120C travels through the waveguides 1110C to reach the user's eyes 1190C.

It should be appreciated that the optical apparatus 1160C may include a number of linear wave guides, each with a respective series of deconstructed curved spherical reflectors or mirrors embedded, located or formed within each of the linear wave guides. The series of deconstructed curved spherical reflectors or mirrors are designed to refocus infinity-focused light at specific radial distances. A convex spherical mirror can be used to produce an output spherical wave to represent a virtual point source which appears to be located at a defined distance behind the convex spherical mirror.

By concatenating in a linear or rectangular wave guide a series of micro-reflectors whose shapes (e.g., radii of curvature about two axes) and orientation together, it is possible to project a 3D image that corresponds to a spherical wave front produced by a virtual point source at a particular x, y, z coordinate. Each of the 2D wave guides or layers provides an independent optical path relative to the other wave guides, and shapes the wave front and focuses incoming light to project a virtual depth plane that corresponds to a respective radial distance. With a plurality of 2D wave guides each providing a focal plane at a different focal depth, a user viewing the projected virtual depth planes experiences a 3D effect.

Illustrative Embodiments and Working Examples

Head Mounted Displays (HMD) have been explored for a wide range of applications in the fields of 3D virtual and augmented environments. Accurate and high-speed eye tracking is important to enable key scenarios in HMD, e.g., the field of view interactive interfaces for people.

Eye-trackers embedded in HMD can be divided into invasive methods, e.g., scleral coil and non-invasive video-based methods, the latter being more common. Current video-based methods mainly use different features of the eyeball, such as iris, pupil and glint, and pupil-glint methods are the most widely used. These methods have an average tracking error of 0.5°-1°, while the tracking resolution of such features is around 0.7°-1° per pixel. It is not easy to further improve the accuracy beyond the tracking resolution.

Besides using features of the eye surface, retina images are also utilized for eye-tracking in medical field, such as eye-tracking scanning laser ophthalmoscopes (SLOs). They leverage the scanning distortion for retinal movement estimation in small FOV high-resolution images, however this technique is designed for small saccades and SLOs are not easily integrated into an HMD.

Retinal-based eye tracking in HMD has its own advantages: a higher tracking resolution without advanced sensors, linear gaze estimation models and direct localization of the fovea on the retina. Furthermore, retinal tracking provides a wide range of medical applications with the HMD.

Various embodiments present a real-time retinal localization method for eye-tracking based on retinal movement videos, where each frame is localized on a mosaicked search image. The schematic of the proposed method is shown in FIG. 1. In some embodiments, the novelty of the methods described herein is using Kalman filter 106 to combine the performance of one or more machine-learning or deep-learning model(s) 100 with neural network(s) 104 and an image registration method 102, where the result of deep learning is used to build the state transition model and image registration provides the measurement.

Figure 6:
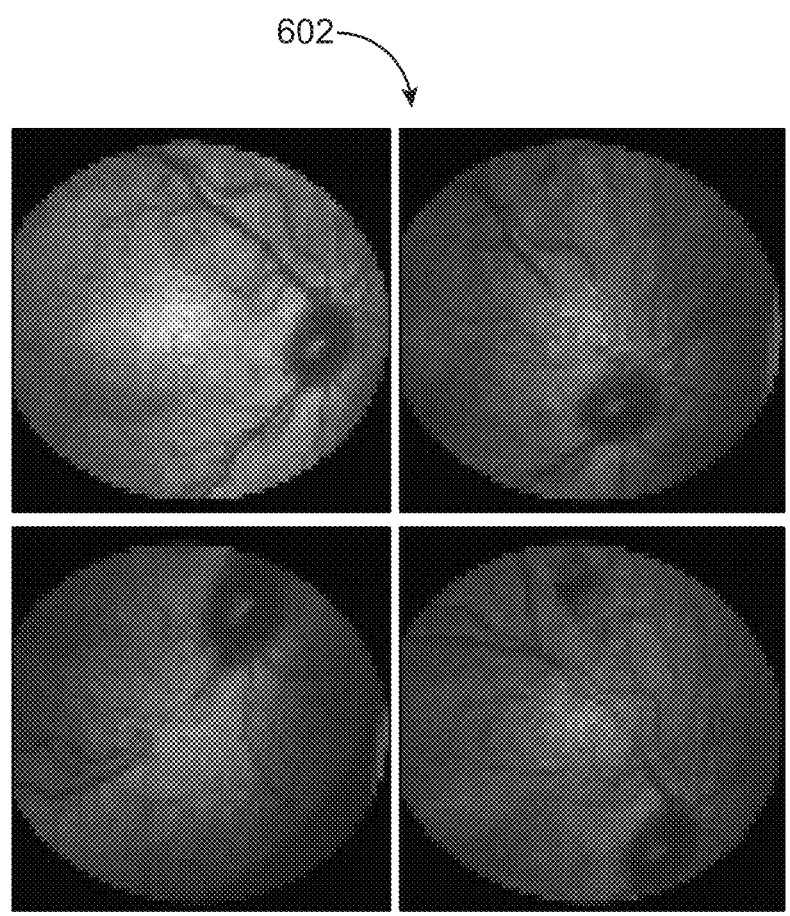
FIG. 6 illustrates some example template images or base images of a retina in some embodiments.

FIG. 6 illustrates some example template images or base images 602 of a retina that may be obtained by, for example, a scanning fiber endoscope described here in some embodiments. For example, a scanning fiber endoscope (SFE) may capture a plurality of base or template images at respective time instants. A base or template image may have a lower resolution and/or a narrower field-of-view (FOV) than, for example, a search image that may be generated from a plurality of such lower resolution and/or narrower FOV base or template images. In some embodiments, once a search image is constructed, any subsequently captured image frames (e.g., by an eye tracking device of an XR system) may be registered with respect to the same search image, rather than with respect to multiple images as in some conventional approaches. Although in some other embodiments, subsequently captured image frames (e.g., by an eye tracking device of an XR system) may be registered with respect to multiple search images described herein.

In some embodiments, the method is validated on the synthetic data and retinal movement videos imaged with the scanning fiber endoscope (SFE). The details of the dataset and its challenges are described herein. Using the retina videos, the eye tracking resolution in an example system is 0.05°/pixel. In some embodiments, a retinal localization method currently achieves 0.68° mean error prior to optimization, not considering the annotation variation. Compared to the classic pupil-glint methods which have a low tracking resolution, some embodiments greatly improve retinal-based eye tracking accuracy.

Figure 5:
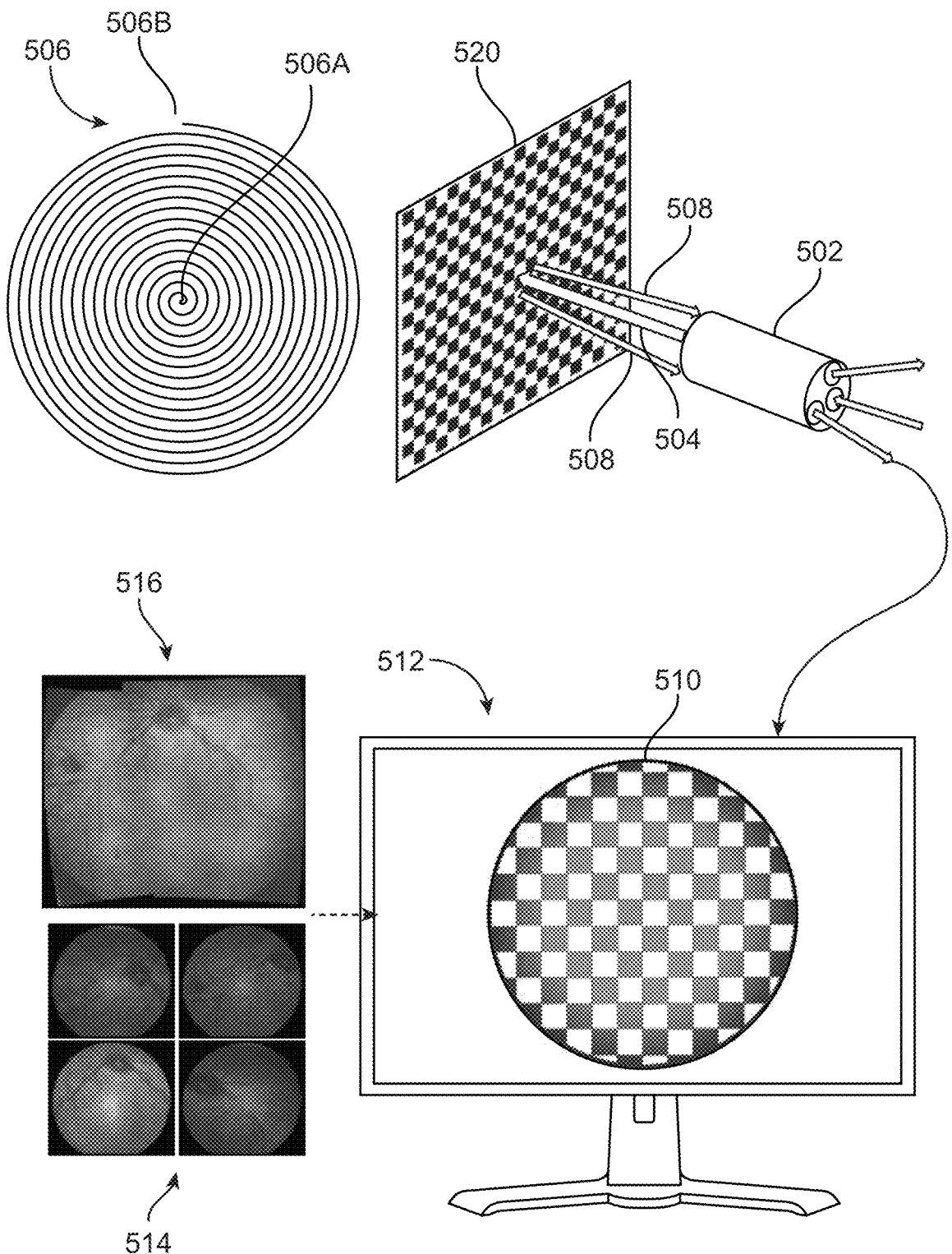
FIG. 5 illustrates a simplified example of a system for capturing SFE images of a retina in some embodiments.

FIG. 5 illustrates a simplified example of a system for capturing SFE images of a retina in some embodiments. In these embodiments, a scanning fiber endoscope (SFE) 502 may emit scanning light beams through one or more scanning fibers 504. The SFE 502 may scan an object 520 (e.g., a retina) by following a scanning pattern 506 from a beginning point 506A to an end point 506B of the scanning pattern 506. The reflected light 508 may be received through one or more return fibers in the SFE 502; and the reflected light 508 may be further processed to present a scanned image 510 (e.g., one or more base or template images 514 of a retina) on a display 512. Some techniques described herein generate a search image 516 by mosaicking a plurality of base or template images 514 in some embodiments.

Data Acquisition and Characteristics

Virtual retinal display (retinal scan display) for AR/VR has been proposed for a long time. To maintain the compactness of the HMD system, the retinal imaging can share most of the optic path with the retinal scan display. VRD draws a scanning display directly onto the retina, thus the SFE imaging device with a scanning pattern is used since it is low cost and has a miniature probe tip. SFE has a spiral scanning pattern from center to periphery and the full frame is imaged ring by ring. When the target is moving, the rings scanned at different time are from different regions, which creates movement distortions in the video frame. Some embodiments take the imaging position on the retina as the ground truth when the frame is completed, thus the outer rings in each frame are closer to the ground truth.

In data collection, some embodiments attach a retinal phantom and a laser pointer onto the tip of a robot arm (Meca500) for simulating retina movement and use a position sensitive detector (PSD) for real-time position recording of the laser beam. The PSD data can be the annotation for each frame after data pre-processing. The annotation in the current setup has a mean error of 0.35°. The images 202 in FIG. 2 shows example of captured retinal frames, and the image 204 in FIG. 2 illustrates a mosaicked image from a series of frames (e.g., 202). Some embodiments can see from the donut-shaped optic disc that the images have movement distortion. Note that the retina image has many regions with similar background, the imaging has low quality with local distortions on the still frame, which increase the difficulty of localization.

Example Process:

Given a large FOV mosaicked image as reference, some embodiments perform real-time localization of the captured SFE frames onto the search image as shown in FIG. 2. Because of the challenges of data, some embodiments use deep learning method to ex-tract representative deep features for analysis. However, the neural network has uncertainty and deep features are not always reliable, thus image registration method is used to compensate the performance of deep learning. On the other hand, the result of image registration is also noisy because of the data challenges. As described above, two process are combined with the Kalman filter, where the deep learning results are embedded in the transition model and registration results are taken as the measurement in Kalman filter. The Kalman filter requirements of linear Markov model and additive Gaussian noise are satisfied in some embodiments. In this section, some embodiments introduce the form of an example state transition model and measurement in the Kalman filter respectively.

State Transition Model with Deep Learning

The state transition model assumes the true state at time k is evolved from the state at k−1. In the proposed method, the transition model is formed as follows:

$$\begin{bmatrix} X_k \\ Y_k \end{bmatrix} = \begin{bmatrix} 1 & 0 \\ 0 & 1 \end{bmatrix} * \begin{bmatrix} X_{k-1} \\ Y_{k-1} \end{bmatrix} + \begin{bmatrix} 1 & 0 \\ 0 & 1 \end{bmatrix} * \begin{bmatrix} x'_{k-1} \\ y'_{k-1} \end{bmatrix} + w_k \quad (1)$$

$X_k, Y_k$ represents the position state at time k in x and y directions. $w_k$ is the process noise drawn from a zero mean multivariate normal distribution.

$$\begin{bmatrix} x'_{k-1} \\ y'_{k-1} \end{bmatrix}$$

forms the control vector of the first order state estimation model. It is the velocity within a time unit computed from the difference be-tween the deep neural network results at time k and k−1. The proposed formation allows us to embed the deep learning into a classic Kalman filter model. Here one time step is the duration between continuous frames.

The deep learning framework used in some embodiments is modified from the Siamese RPN. In some embodiments, Alexnet is first used to extract the deep features of the frame and search image, then the frame feature is converted into two different features with convolution layers for classification and regression respectively. Two corresponding response maps are created by the convolution of the frame and search image features. One response map is used for the target region/non-target (positive/negative) region classification, another response map predicts the position refinement at each positive position. Different from learning robust representations of a specific object in Siamese RPN, some embodiments localized different templates on the same search image. The deep feature of the search image is saved and repeatedly used after the training process. Since the imaging scale will not change much in HMD, some embodiments focus on the target position in x and y instead of the bounding box with adjustable height and width.

Figure 7:
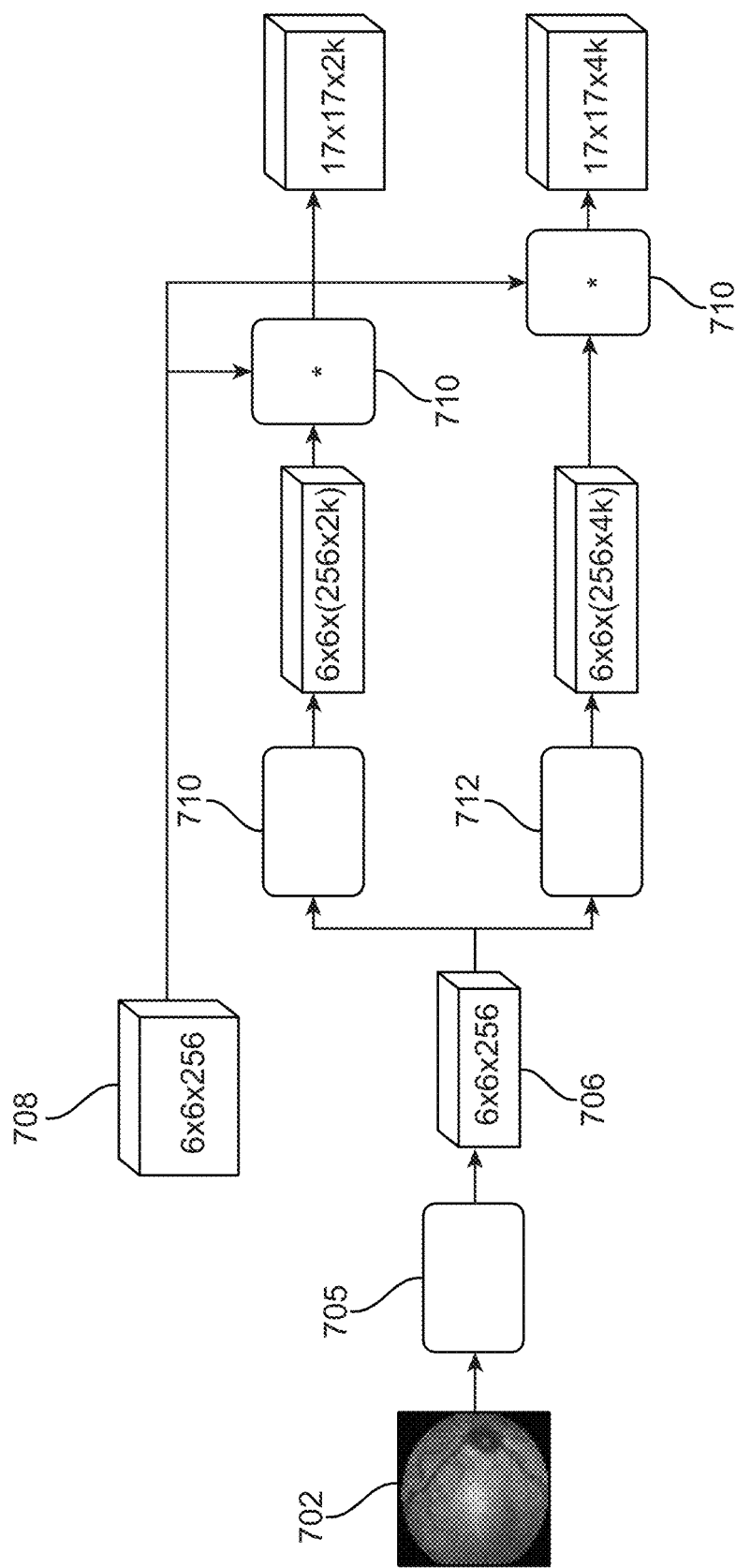
FIG. 7 illustrates an example deep learning model in some embodiments.

FIG. 7 illustrates an example deep learning model that may be utilized to implement at least some of various techniques described herein in some embodiments. In these embodiments illustrated in FIG. 7, a deep learning model may be modified from a Siamese RPN (Region Proposal Network) to receive an image frame 702 at the AlexNet 705 that generates a feature map 706 (e.g., a feature map of the frame having the dimensionality of 6×6×256) for the received image frame 702. The feature map 706 may be respectively provided to convolutions 710 and 712 which further respectively generates upsampled data (e.g., a first output having the dimensionality of 6×6×(256×2k) for 710 and a second output having the dimensionality of 6×6×(256×4K) for 712. Both the first and the second outputs may be individually processed by operators 710 that respectively produce the first downsampled output (e.g., a first output having the dimensionality of 17×17×2K) and the second downsampled output (e.g., a second output having the dimensionality of 17×17×4K). Additionally or alternatively, a deep learning module extracts feature map 708 of the search region (e.g., extract feature map having the dimensionality of 6×6×256) at the operator 710.

Measurement with Outer Ring Registration:

In Kalman filter, the measurement is obtained at the current time:

$$z_k = \begin{bmatrix} 1 & 0 \\ 0 & 1 \end{bmatrix} * \begin{bmatrix} X_k \\ Y_k \end{bmatrix} + v_k \quad (2)$$

where $z_k$ is the measurement obtained by the image registration, and $v_k$ is the measurement noise similar to wk. In some embodiments, image registration is based on SIFT method. The intensity-based registration methods (cross correlation and mutual in-formation) are not as robust as SIFT on the example data, while these methods may be used in, for example, cases when the captured retinal image cannot provide detectable features, such as the near-infrared image.

As described above, the outer ring in a frame indicates more accurate retinal location, while directly matching the outer ring globally is difficult because of the very sparse features it contains. To reduce the interference of similar background and few features of outer ring registration, the image registration includes two steps: coarse registration of the whole frame and fine registration with the outer ring only. In the coarse localization, some embodiments detect feature points from two images and register the frame f to the corresponding regions f⁻ on the search image. In the outer ring registration, the feature points within the enlarged region around f⁻ on the search image are selected, and they are rematched with the feature points falling into the outer ring region on the frame. Using an enlarged region improves the robust-ness of the algorithm when the matched featured points in coarse registration are concentrated in the inside area. This method also avoids repeated computation of feature points. Because of the challenges of retina images, such measurement of Kalman filter occasionally drops out, the tracking system then relies on the deep neural work only until the next successful registration.

For example, FIG. 4 illustrates some example benchmark results 402 of an example retinal-based tracking compared to conventional pupil-glint methods in some embodiments.

More specifically, the tracking error of a conventional pupil-glint method typically falls within 0.5°-1°, whereas a retinal-based tracking method such as those described herein provide 0.68° of tracking error. Moreover, the tracking resolution of a conventional pupil-glint method typically falls within 0.7°-1°/pixel, whereas a retinal-based tracking method such as those described herein provide 0.05°/pixel of tracking resolution.

Working Examples

Experiments are performed on two datasets: the synthetic retina movement videos and SFE videos introduced herein. Some embodiments compares the performance of the proposed tracking method with Kalman filter with using the deep learning only.

The synthetic data is generated from the public retina dataset STARE (Structured Analysis of the Retina) from the STARE Project. Some embodiments generate overall 36000 frames of retinal movement videos from 300 retina images as the training set for deep learning, and 4000 frames from 15 retina images as the test set. Some embodiments add four different levels of image degradations on test video frames to evaluate the robustness of the method: 1) Gaussian noise with mean 0 and variance selected from 0.001~0.005; 2) Rotation and shear angle from −10°~10° and −5°~5° respectively; 3) Scale change from 0.8~1.2. The degradation level increases uniformly within the parameter ranges. It is shown in Table 1 that the aforementioned method has an acceptable accuracy 0.63° even under the largest degradation.

The experiment of the SFE video is implemented on one retina image. Some embodiments collected overall 7000 frames for training and 400 frames for test. The test errors 300 are summarized as a cumulative distribution function (CDF) in FIG. 3. Some embodiments can see there are outliers over 5° in using deep learning only. The accuracy of the data annotation is around 0.35° as described before, and the mean error of the method is 0.68° excluding the influence of the annotation, whereas only using the neural network has a mean error of 1.01°. The speed can reach 72 fps with the GPU of Titan RTX.

Some embodiments present the application of retina-based eye tracking for HMD and a novel real-time localization method using Kalman filter to combine the performance of deep learning and image registration. In some embodiments, this is the first systematic discussion of embedding retina tracking in AR/VR headset and providing algorithm solutions.

With larger datasets from different users' retinas increased accuracy is achievable. The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

Figure 8:
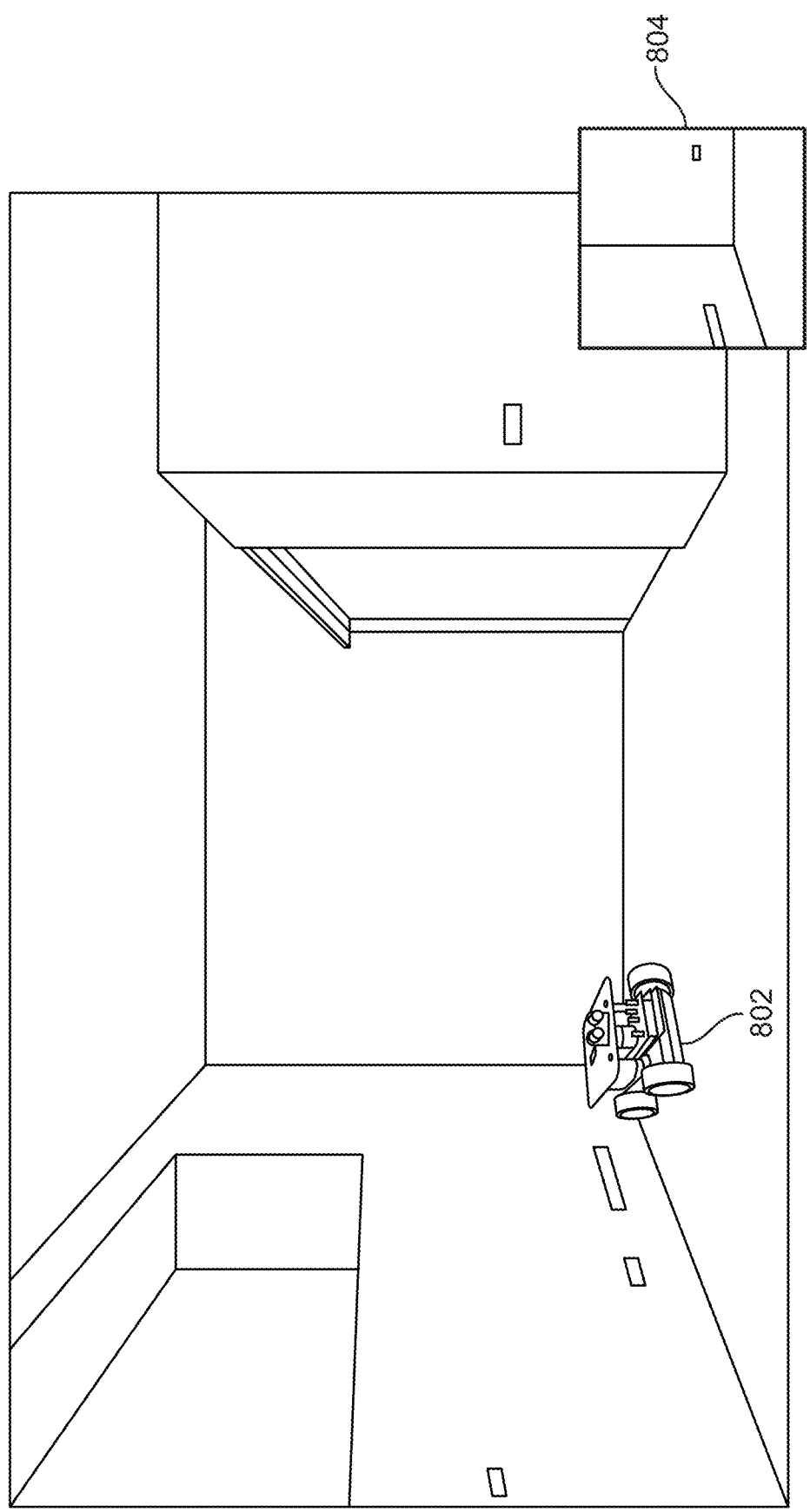
FIG. 8 illustrates a simplified working example of robot localization in some embodiments.

FIG. 8 illustrates a simplified working example of robot localization in some embodiments. More specifically, FIG. 8 illustrates an example of robot localization scenario where the box 804 illustrates the current FOV of the camera of the robot 802. For example, with a known complete map of one or more rooms or buildings using sensor mapping, such as a panoramic optical camera scene, a robot may be located by, for example, matching a captured camera frame (e.g., 804) onto the scene map as shown in FIG. 8.

Figure 9:
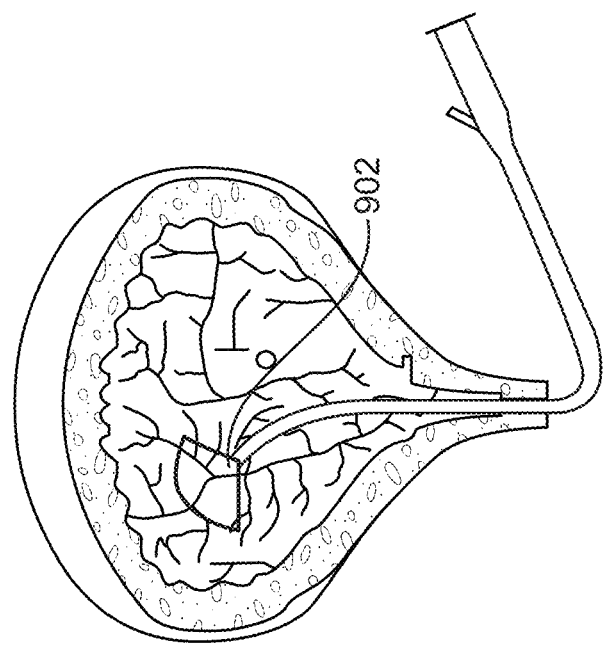
FIG. 9 illustrates another simplified working example of microscope or endoscope localization in a surgery in some embodiments.
Figure 9:
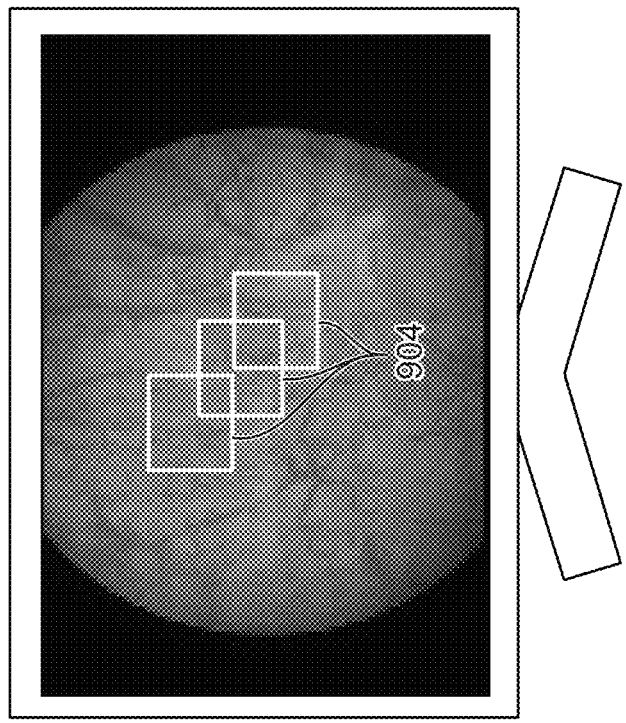

FIG. 9 illustrates another simplified working example of microscope or endoscope localization in a surgery in some embodiments. More specifically, some embodiments may be applied to localize the microscope of endoscope 902 viewing tissues in a surgery. A video frame imaged with the microscope or endoscope may be localized on a larger scene map of the human tissues (e.g., localized frames 904). These embodiments may help the path planning of the surgical tools.

Figure 10A:
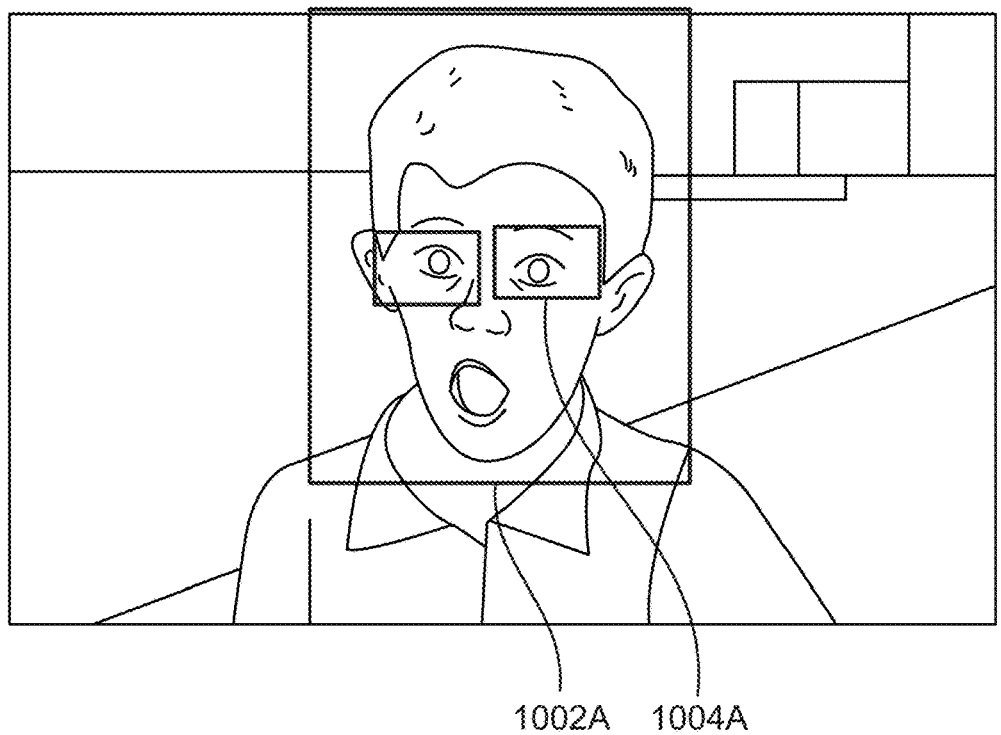
FIG. 10A illustrates another simplified working examples of localization of face or eye(s) for face or eye tracking in some embodiments.

FIG. 10A illustrates another simplified working examples of localization of face or eye(s) for face or eye tracking in some embodiments. More specifically, FIG. 10A illustrates the identification and tracking of the eye(s) 1004A for eye tracking and/or the identification and tracking of a face 1002A of a subject user.

Figure 10B:
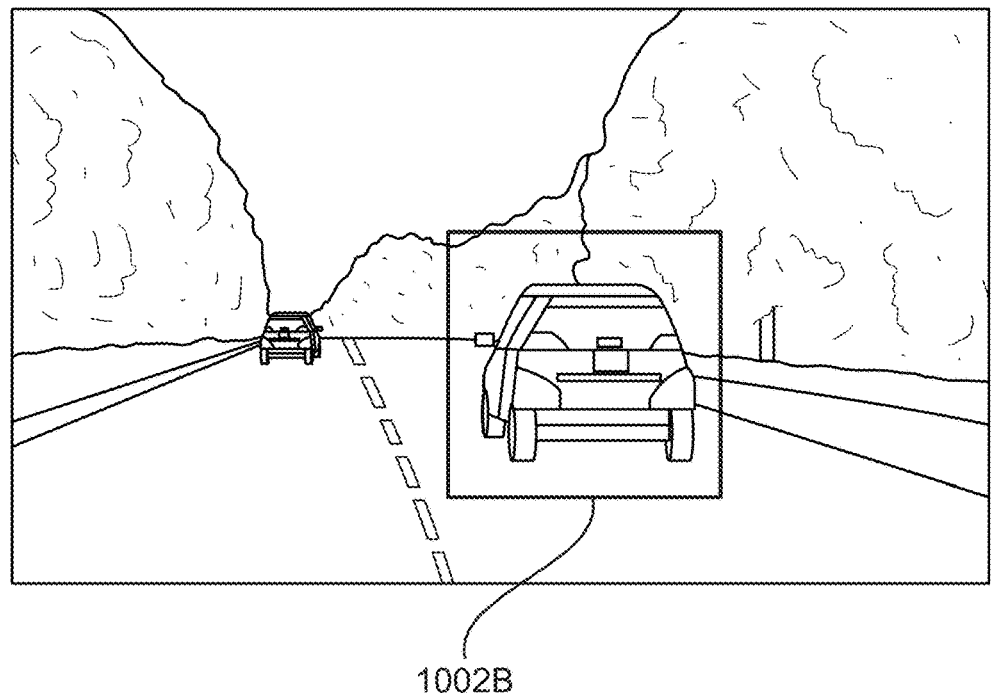
FIG. 10B illustrates another simplified working examples of localization of an object for object tracking in some embodiments.

FIG. 10B illustrates another simplified working examples of localization of an object for object tracking in some embodiments. More specifically, FIG. 10B illustrates the identification and tracking of a car 1002B for object tracking (a vehicle in FIG. 10B).

Figure 10C:
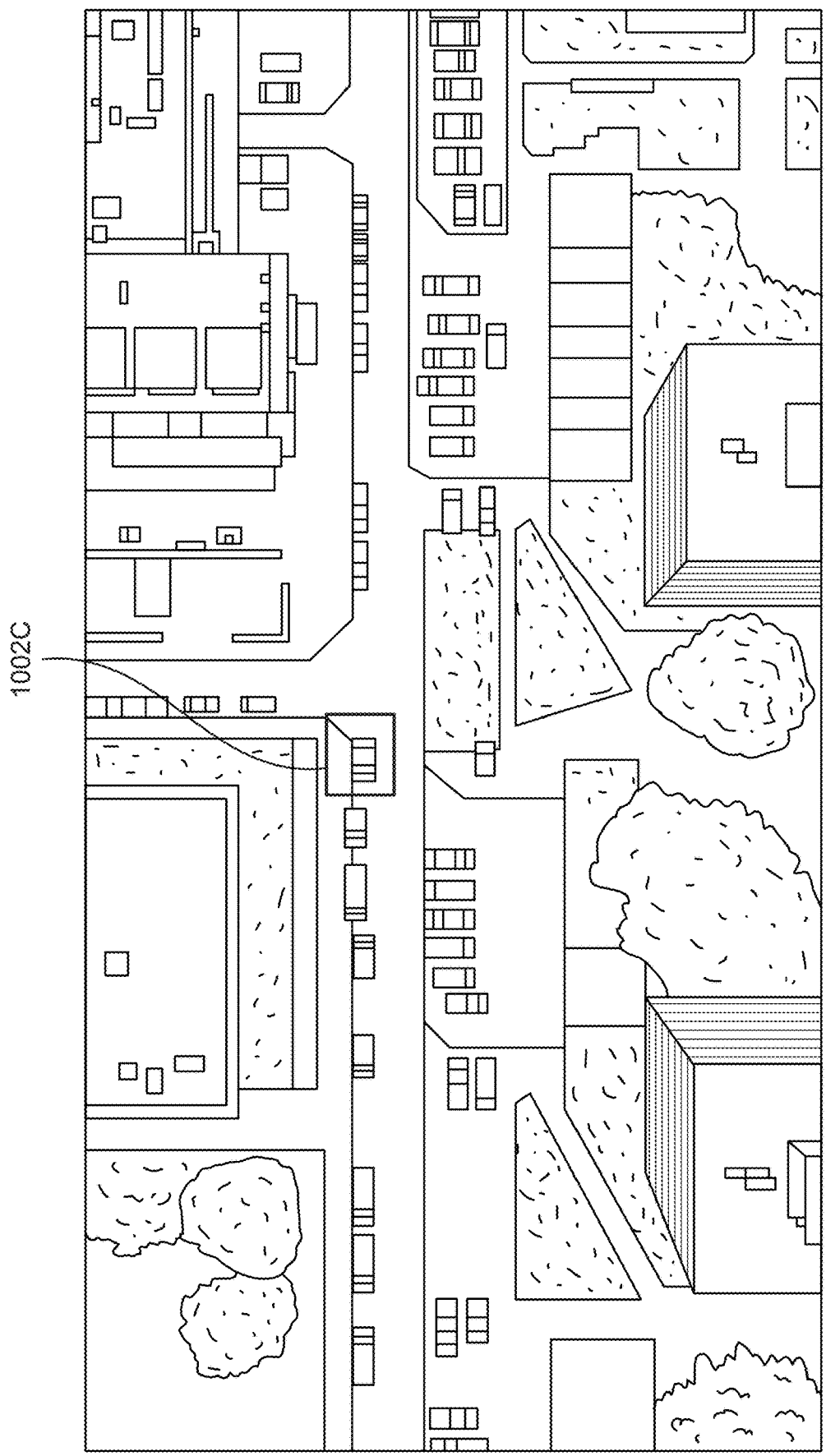
FIG. 10C illustrates another simplified working examples of localization of an object for object tracking in some embodiments.

FIG. 10C illustrates another simplified working examples of localization of an object for object tracking in some embodiments. More specifically, FIG. 10C illustrates a general tracking task when the object (e.g., a vehicle 1002C) being tracked does not change much. The object can be taken as a template to be localized in each scene, and Kalman filter is used to balance the performance of the neural network and image registration in some embodiments. In some embodiments, the tracking accuracy of the neural network may be improved to pixel-level when the image registration of the object works completely. When the object is distorted or blocked which causes the image registration to fail, the tracking will only rely on the neural network in some of these embodiments.

Figure 16A:
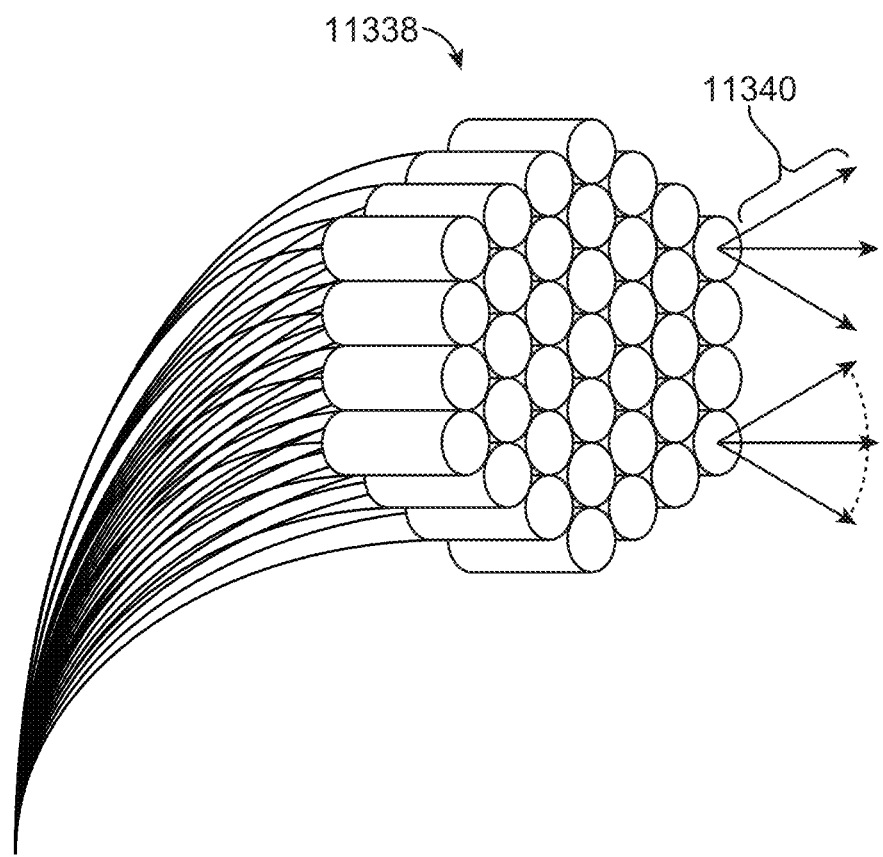
Figure 16B:
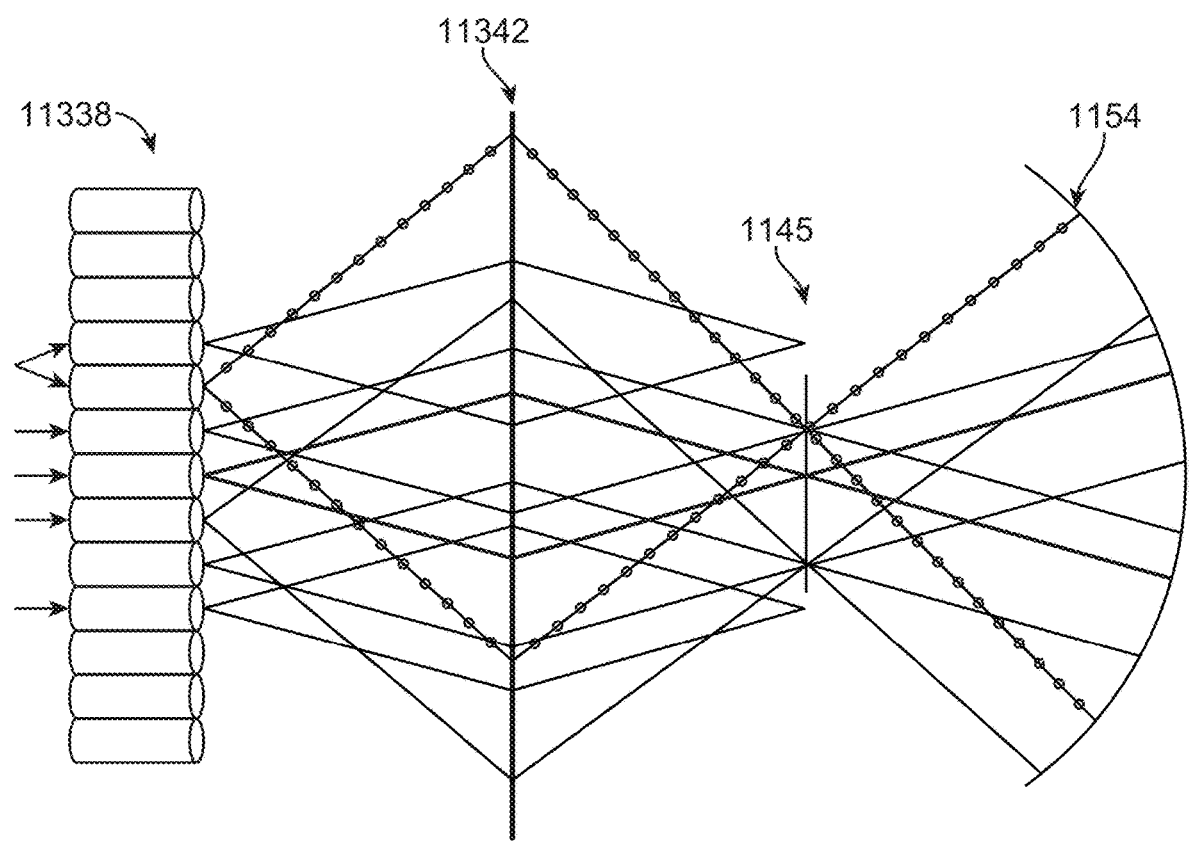
Figure 16C:
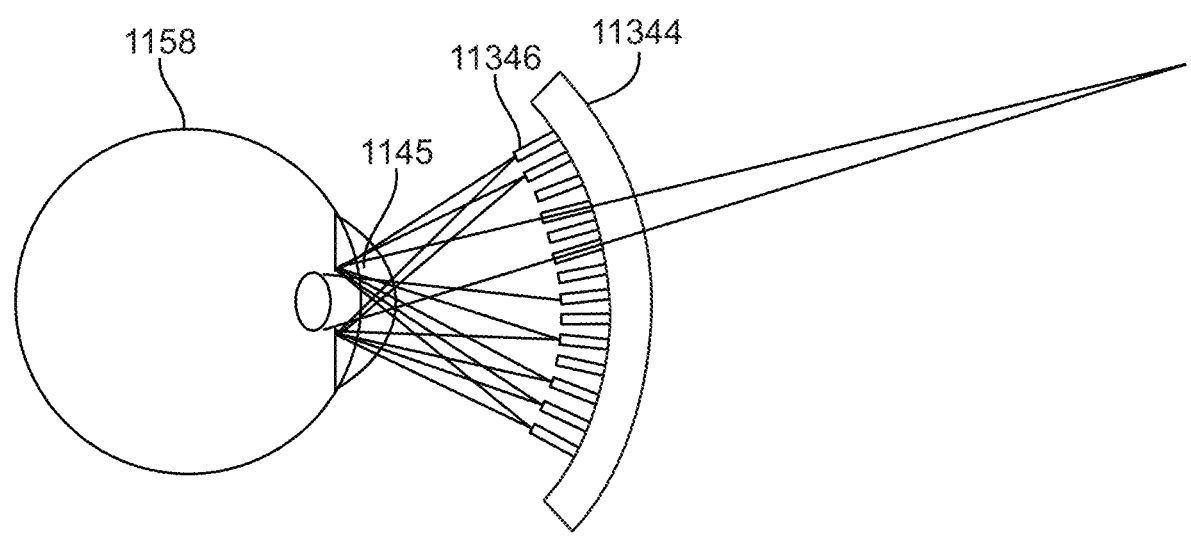
Figure 16D:
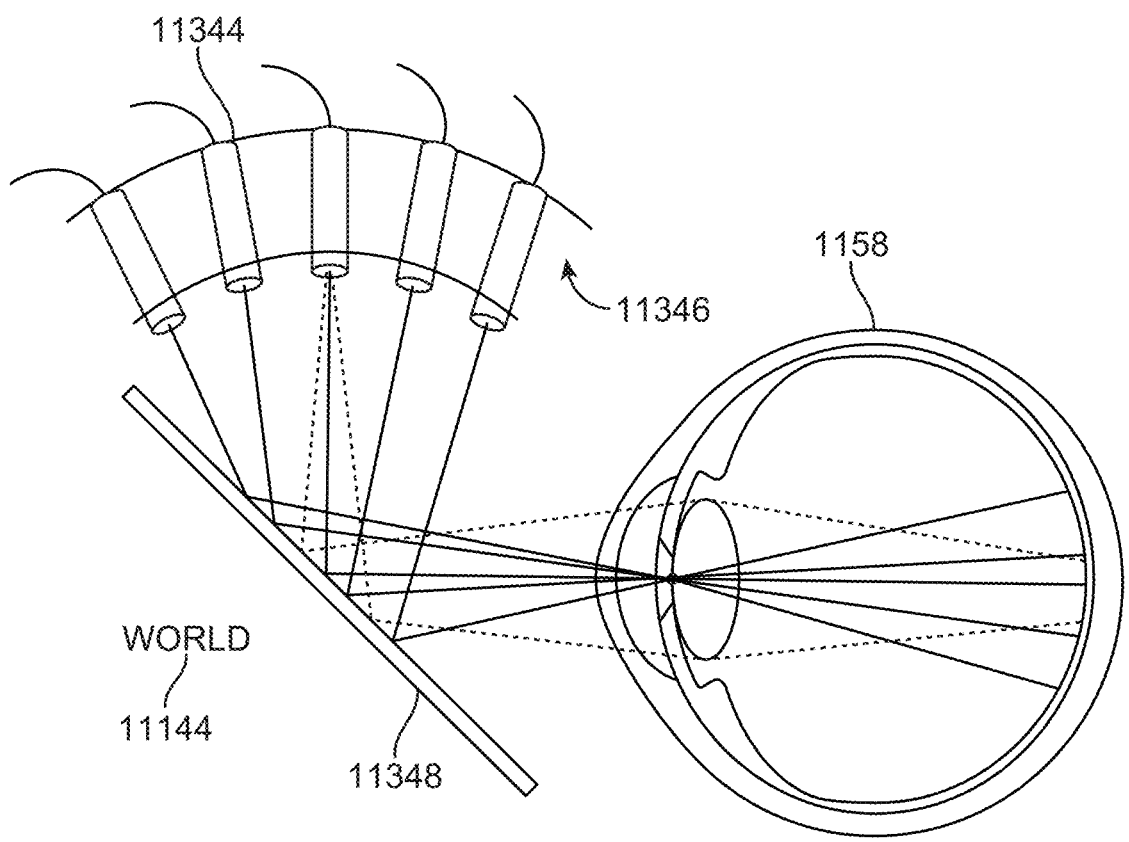
Figure 16G:
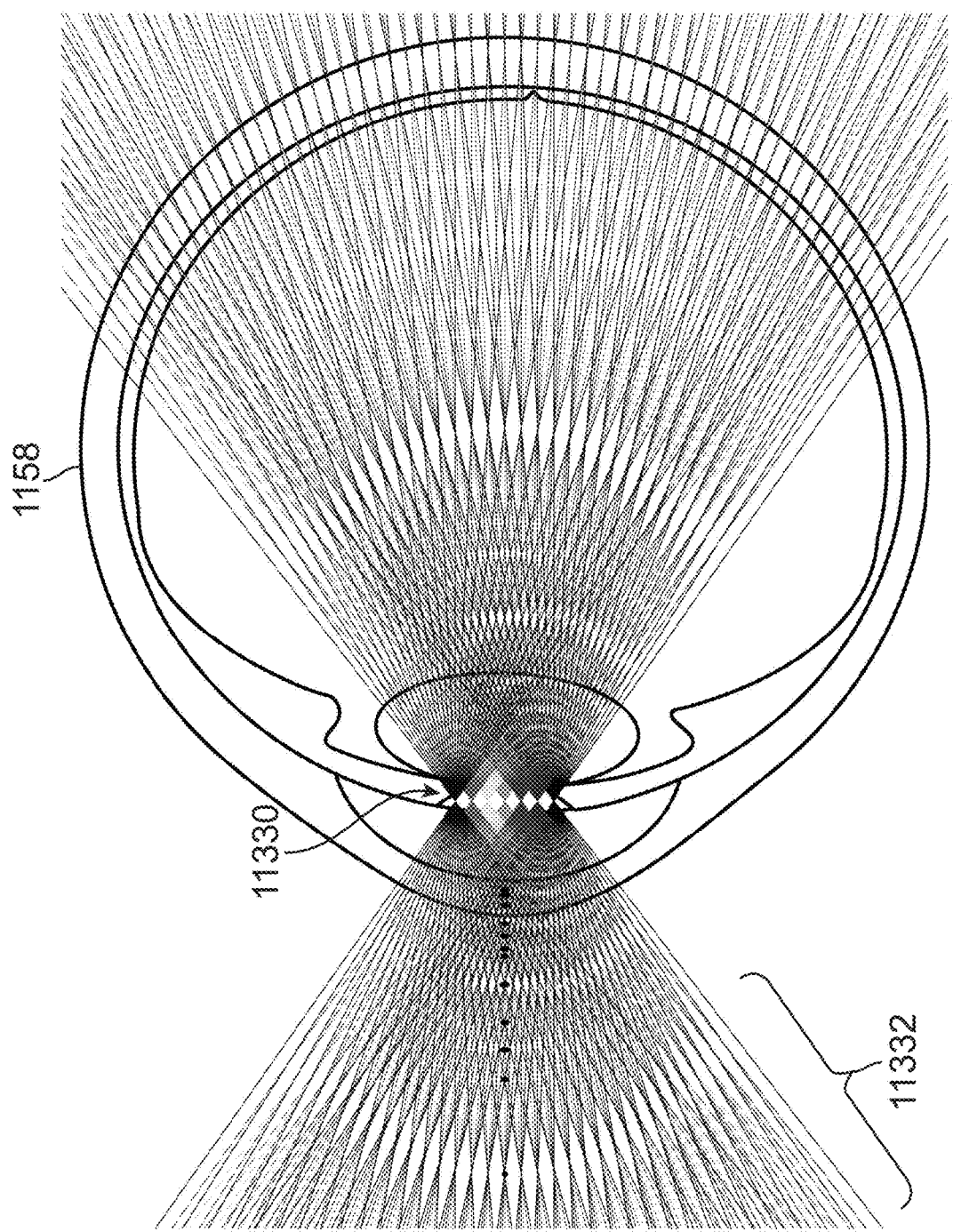
Figure 16H:
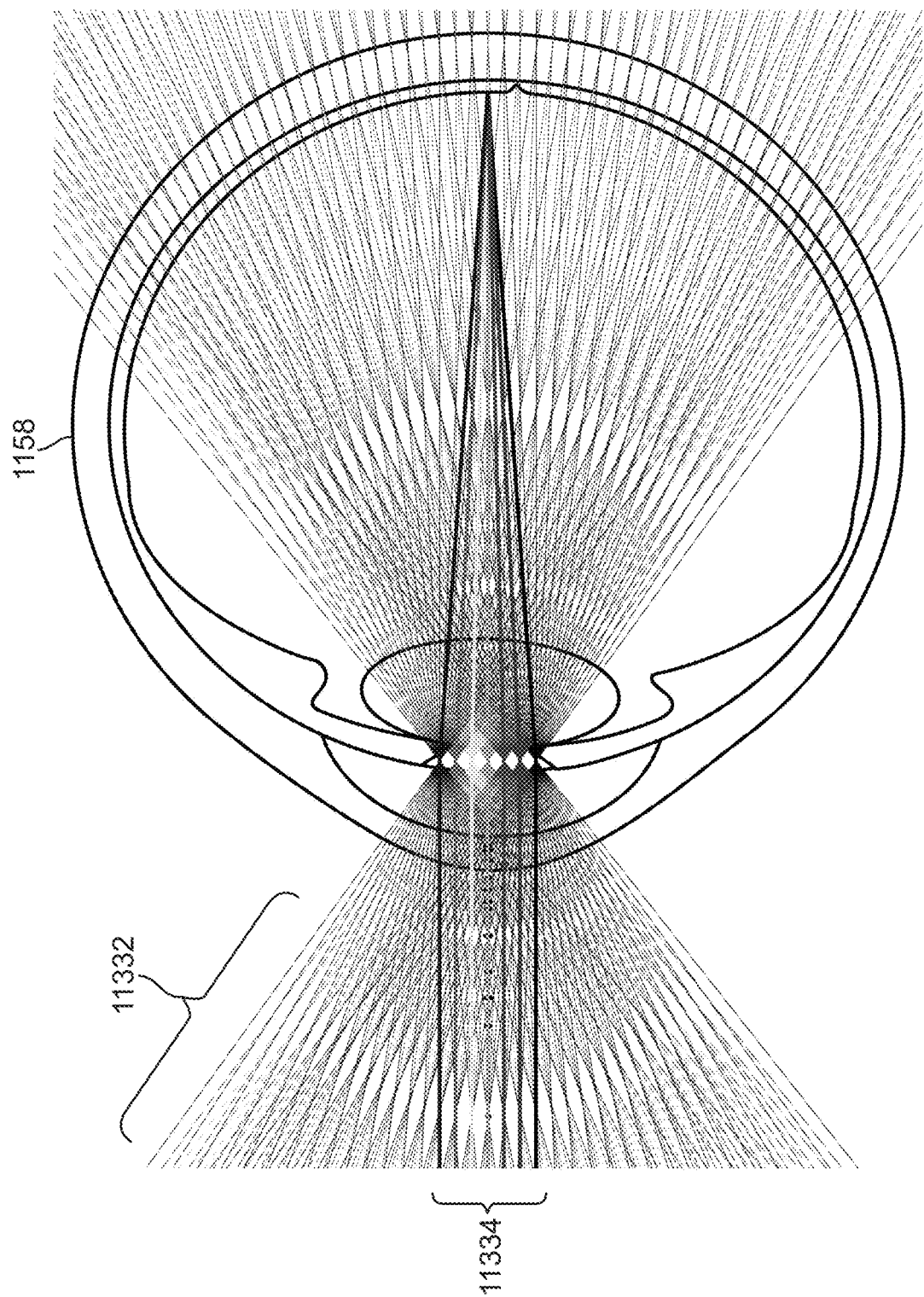

FIGS. 16A-I illustrate example configurations of an array of micro-projectors and coupling the array of micro-projectors with an optical system in one or more embodiments. Referring to FIG. 16G, each of a multiplicity of incoming beamlets 11332 is passing through a small exit pupil 11330 relative to the eye 1158 in a discretized wavefront display configuration. Referring to FIG. 16H, a subset 11334 of the group of beam lets 11332 may be driven with matching color and intensity levels to be perceived as though they are part of the same larger-sized ray (the bolded subgroup 11334 may be deemed an "aggregated beam"). In this case, the subset of beamlets is parallel to one another, representing a collimated aggregate beam from optical infinity (such as light coming from a distant mountain). The eye is accommodated to infinity so the subset of beamlets is deflected by the eye's cornea and lens to all fall substantially upon the same location of the retina and are perceived to comprise a single in focus pixel.

Figure 16I:
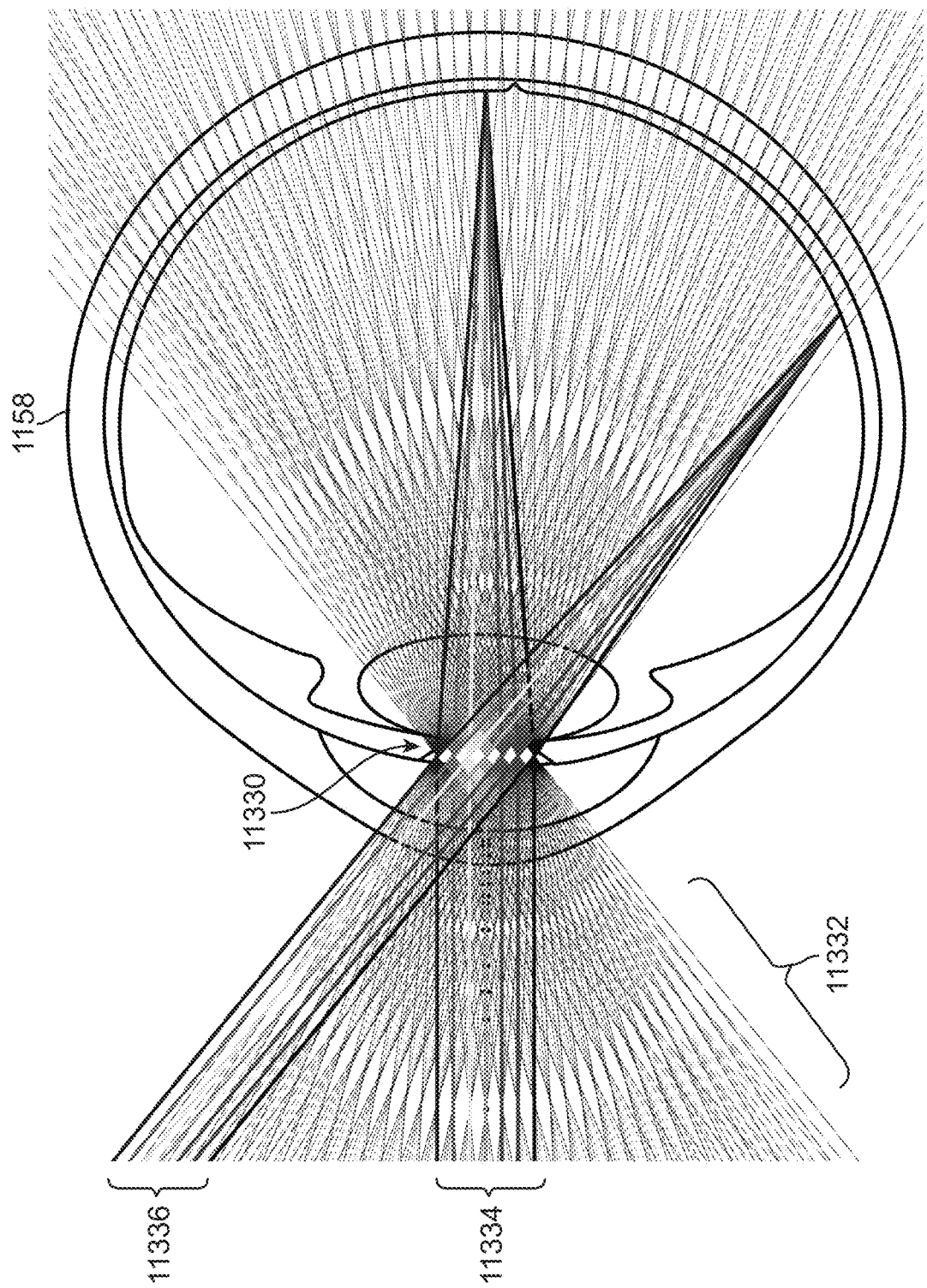

FIG. 16I shows another subset of beamlets representing an aggregated collimated beam 11336 coming in from the right side of the field of view of the user's eye 1158, if the eye 1158 is viewed in a coronal-style planar view from above. FIG. 16I depicts the same elements as FIG. 16H, and also includes the additional subset of beamlets representing an aggregated collimated beam 11336. Again, the eye is shown accommodated to infinity, so the beam lets fall on the same spot of the retina, and the pixel is perceived to be in focus. If, in contrast, a different subset of beamlets were chosen that were reaching the eye as a diverging fan of rays, those beamlets would not fall on the same location of the retina (and be perceived as in focus) until the eye were to shift accommodation to a near point that matches the geometrical point of origin of that fan of rays.

With regards to patterns of points of intersection of beamlets with the anatomical pupil of the eye (e.g., the pattern of exit pupils), the points of intersection may be organized in configurations such as a cross-sectionally efficient hex-lattice or a square lattice or other two-dimensional array. Further, a three-dimensional array of exit pupils could be created, as well as time-varying arrays of exit pupils.

Discretized aggregate wavefronts may be created using several configurations, such as an array of microdisplays or microprojectors placed optically conjugate with the exit pupil of viewing optics, microdisplay or microprojector arrays coupled to a direct field of view substrate (such as an eyeglasses lens) such that they project light to the eye directly, without additional intermediate viewing optics, successive spatial light modulation array techniques, or waveguide techniques.

Referring to FIG. 16A, in one embodiment, a stereoscopic (e.g., three-dimensional) or a four- or five-dimensional lightfield may be created by bundling a group of small projectors or display units (such as scanned fiber displays). FIG. 16A depicts a hexagonal lattice projection bundle 11338 which may, for example, create a 7 mm-diameter hex array with each fiber display outputting a sub-image 11340. If such an array has an optical system, such as a lens, placed in front of it such that the array is placed optically conjugate with the eye's entrance pupil, this will create an image of the array at the eye's pupil, as shown in FIG. 16B, which essentially provides the same optical arrangement as the embodiment of FIG. 16G.

Each of the small exit pupils of the configuration is created by a dedicated small display in the bundle 11338, such as a scanning fiber display. Optically, it is as though the entire hex array 11338 is positioned right into the anatomical pupil 1145 in some embodiments. Such embodiments may be used for driving different sub-images to different small exit pupils within the larger anatomical entrance pupil 1145 of the eye, comprising a superset of beamlets with a multiplicity of incident angles and points of intersection with the eye pupil. Each of the separate projectors or displays may be driven with a slightly different image, such that sub-images may be created that pull out different sets of rays to be driven at different light intensities and colors.

In one embodiment, a strict image conjugate may be created, as in the embodiment of FIG. 16B, wherein there is direct one-to-one mapping of the array 11338 with the pupil 1145. In another variation, the spacing may be changed between displays in the array and the optical system (lens 11342 in FIG. 16B) such that instead of receiving a conjugate mapping of the array to the eye pupil, the eye pupil may be catching the rays from the array at some other distance. With such a configuration, one would still get an angular diversity of beams through which one could create a discretized aggregate wavefront representation, but the mathematics regarding how to drive which ray and at which power and intensity may become more complex (although, on the other hand, such a configuration may be considered simpler from a viewing optics perspective). The mathematics involved with light field image capture may be leveraged for these calculations.

Referring to FIG. 16C, another lightfield creating embodiment is depicted wherein an array of micro-displays or micro-projectors 11346 may be coupled to a frame 11344, such as an eyeglasses frame. This configuration may be positioned in front of the eye 1158. The depicted configuration is a nonconjugate arrangement wherein there are no large-scale optical elements interposed between the displays (for example, scanning fiber displays) of the array 11346 and the eye 1158. One can imagine a pair of glasses, and coupled to those glasses are a plurality of displays, such as scanning fiber engines, positioned orthogonal to the eyeglasses surface, and all angled inward so they are pointing at the pupil of the user. Each display may be configured to create a set of rays representing different elements of the beamlet superset.

With such a configuration, at the anatomical pupil 1145 the user may receive a similar result as received in the embodiments discussed in reference to FIG. 16G, in which every point at the user's pupil is receiving rays with a multiplicity of angles of incidence and points of intersection that are being contributed from the different displays. FIG. 16D illustrates a nonconjugate configuration similar to that of FIG. 16C, with the exception that the embodiment of FIG. 16D features a reflecting surface 11348 to facilitate moving the display array 11346 away from the eye's 1158 field of view, while also allowing views of the real world 11144 through the reflective surface 11348.

Another configuration for creating the angular diversity for a discretized aggregate wavefront display is presented. To optimize such a configuration, the sizes of the displays may be decreased to the maximum. Scanning fiber displays which may be utilized as displays may have baseline diameters in the range of 1 mm, but reduction in enclosure and projection lens hardware may decrease the diameters of such displays to about 0.5 mm or less, which is less disturbing for a user. Another downsizing geometric refinement may be achieved by directly coupling a collimating lens (which may, for example, comprise a gradient refractive index, or "GRIN", lens, a conventional curved lens, or a diffractive lens) to the tip of the scanning fiber itself in a case of a fiber scanning display array. For example, referring to FIG. 16E, a GRIN (gradient-index) lens 11354 is shown fused to the end of a single mode optical fiber. An actuator 11350, such as a piezoelectric actuator, may be coupled to the fiber 11352 and may be used to scan the fiber tip.

In another embodiment the end of the fiber may be shaped into a hemispherical shape using a curved polishing treatment of an optical fiber to create a lensing effect. In another embodiment a standard refractive lens may be coupled to the end of each optical fiber using an adhesive. In another embodiment a lens may be built from a dab of transmissive polymeric material or glass, such as epoxy. In another embodiment the end of an optical fiber may be melted to create a curved surface for a lensing effect.

FIG. 16F shows an embodiment wherein display configurations (e.g., scanning fiber displays with GRIN lenses, shown in close-up view of FIG. 16E) may be coupled together through a single transparent substrate 11356 preferably having a refractive index that closely matches the cladding of the optical fibers 11352 such that the fibers themselves are not substantially visible for viewing of the outside world across the depicted assembly. It should be appreciated that if the index matching of the cladding is done precisely, then the larger cladding/housing becomes transparent and only the small cores, which preferably are about three (3) microns in diameter, will be obstructing the view. In one embodiment the matrix 11358 of displays may all be angled inward so they are directed toward the anatomic pupil of the user (in another embodiment, they may stay parallel to each other, but such a configuration is less efficient).

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

All of the references cited herein are incorporated by reference. Aspects of the disclosure can be modified, if necessary, to employ the systems, functions, and concepts of the above references and application to provide yet further embodiments of the disclosure. These and other changes can be made to the disclosure in light of the detailed description.

Specific elements of any foregoing embodiments can be combined or substituted for elements in other embodiments. Moreover, the inclusion of specific elements in at least some of these embodiments may be optional, wherein further embodiments may include one or more embodiments that specifically exclude one or more of these specific elements. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

It is appreciated that features and aspects of the various embodiments described above may be combined to provide further embodiments. These and other changes may be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

Various example embodiments of the disclosure are described herein. Reference is made to these examples in a non-limiting sense. They are provided to illustrate more broadly applicable aspects of the disclosure. Various changes may be made to the disclosure described and equivalents may be substituted without departing from the true spirit and scope of the disclosure. In addition, many modifications may be made to adapt a particular situation, material, composition of matter, process, process act(s) or step(s) to the objective(s), spirit or scope of the present disclosure. Further, as will be appreciated by those with skill in the art that each of the individual variations described and illustrated herein has discrete components and features which may be readily separated from or combined with the features of any of the other several embodiments without departing from the scope or spirit of the present disclosures. All such modifications are intended to be within the scope of claims associated with this disclosure.

The disclosure includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element-irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

The above description of illustrated embodiments is not intended to be exhaustive or to limit the embodiments to the precise forms disclosed. Although specific embodiments of and examples are described herein for illustrative purposes, various equivalent modifications may be made without departing from the spirit and scope of the disclosure, as will be recognized by those skilled in the relevant art. The teachings provided herein of the various embodiments may be applied to other devices that implement VR, AR, MR, XR, or hybrid systems and/or which employ user interfaces, not necessarily the example optics systems (12) generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples may be implemented, individually and/or collectively, by a wide range of hardware, software, firmware, or virtually any combination thereof.

In one embodiment, the present subject matter may be implemented via Application Specific Integrated Circuits (ASICs). However, those skilled in the art will recognize that the embodiments disclosed herein, in whole or in part, may be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information may be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information may be embodied in any computer-readable medium for use by or in connection with an instruction execution system, apparatus, or device, such as a computer-based system, processor-containing system, or other system that may fetch the instructions from the instruction execution system, apparatus, or device and execute the instructions associated with logic and/or information.

In the context of this specification, a "computer-readable medium" may be any element that may store the program associated with logic and/or information for use by or in connection with the instruction execution system, apparatus, and/or device. The computer-readable medium may be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random-access memory (RAM), a read-only memory (ROM), an erasable programmable read-only memory (EPROM, EEPROM, or Flash memory), a portable compact disc read-only memory (CDROM), digital tape, and other non-transitory media.

Many of the methods described herein may be performed with variations. For example, many of the methods may include additional acts, omit some acts, and/or perform acts in a different order than as illustrated or described.

The various embodiments described above may be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet. Aspects of the embodiments may be modified, if necessary, to employ systems, circuits and concepts of the various patents, applications and publications to provide yet further embodiments.

These and other changes may be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Moreover, the various embodiments described above may be combined to provide further embodiments. Aspects of the embodiments may be modified, if necessary, to employ concepts of the various patents, applications and publications to provide yet further embodiments.

These and other changes may be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   determining a search image that is constructed based at least in part upon a plurality of template image frames;
   capturing, using a spatial computing headset, a plurality of captured image frames of an object or a portion thereof;
   performing an image registration process that registers two or more captured image frames of the plurality of captured image frames in the search image using a deep network;
   tracking, using the spatial computing headset, the movement of the object based at least in part upon respective results of registering the plurality of captured image frames in the search image; and
   training the deep network using at least some captured image frames of the plurality of captured image frames, training the deep network comprising
      identifying a captured image frame of the at least some captured image frames captured by the spatial computing headset,
      extracting, using the deep network, a capture image frame feature from a first region in the captured image frame and a search image feature from a second region in the search image,
      converting the captured image frame feature into a plurality of features that comprises a pair of a first feature and a second feature for the deep network,
      providing the first feature converted from the captured image frame feature to a classification subnetwork of the deep network, and providing the second feature converted from the captured image frame feature to a regression subnetwork of the deep network.

2. The method of claim 1, wherein tracking the movement of the object is performed by the spatial computing headset, without capturing glint reflected from the object in response to an input light pattern.

3. The method of claim 1, wherein training the deep network is accomplished without using regularization techniques.

4. The method of claim 1, training the deep network further comprising:
producing, by the classification subnetwork, a first output data structure at least by convolving, at the classification subnetwork, the first feature converted from the captured image frame feature and search image feature from the search image; and
producing, by the regression subnetwork, a second output data structure at least by convolving, at the regression subnetwork, the second feature converted from the captured image frame feature and search image feature from the search image.

5. The method of claim 3, training the deep network further comprising:
determining, by the classification subnetwork, whether the first region belongs to a target region or a non-target region based at least in part upon the first output data structure; and
predicting, by the regression subnetwork, a position refinement for the region that is determined to belong to the target region or the non-target region based at least in part upon the second output data structure.

6. The method of claim 1, wherein the spatial computing headset uses a position of the object or a feature or a portion of the object, instead of geometric attributes of bounding boxes for the object or the feature or the portion of the object in tracking the movement of the object.

7. A system, comprising:
a spatial computing headset comprising:
a processor,
a scanning fiber assembly, and
memory storing thereupon a sequence of instructions, which, when executed by the processor, causes the processor to perform a set of acts, the set of acts comprising:
determining a search image that is constructed based at least in part upon a plurality of template image frames;
capturing, using a spatial computing headset, a plurality of captured image frames of an object or a portion thereof;
performing an image registration process that registers two or more captured image frames of the plurality of captured image frames in the search image using a deep network;
tracking, using the spatial computing headset, the movement of the object based at least in part upon respective results of registering the plurality of captured image frames in the search image; and
training the deep network using at least some captured image frames of the plurality of captured image frames, training the deep network comprising
identifying a captured image frame of the at least some captured image frames captured by the spatial computing headset,
extracting, using the deep network, a capture image frame feature from a first region in the captured image frame and a search image feature from a second region in the search image,
converting the captured image frame feature into a plurality of features that comprises a pair of a first feature and a second feature for the deep network,
providing the first feature converted from the captured image frame feature to a classification subnetwork of the deep network, and
providing the second feature converted from the captured image frame feature to a regression subnetwork of the deep network.

8. The system of claim 7, wherein tracking the movement of the object is performed by the spatial computing headset, without capturing glint reflected from the object in response to an input light pattern.

9. The system of claim 7, wherein the set of acts comprises training the deep network, training the deep network comprising:
producing, by the classification subnetwork, a first output data structure at least by convolving, at the classification subnetwork, the first feature converted from the captured image frame feature and search image feature from the search image; and
producing, by the regression subnetwork, a second output data structure at least by convolving, at the regression subnetwork, the second feature converted from the captured image frame feature and search image feature from the search image.

10. The system of claim 9, wherein the set of acts comprises training the deep network, training the deep network comprising:
determining, by the classification subnetwork, whether the first region belongs to a target region or a non-target region based at least in part upon the first output data structure; and
predicting, by the regression subnetwork, a position refinement for the region that is determined to belong to the target region or the non-target region based at least in part upon the second output data structure.

11. A non-transitory computer-readable medium storing thereupon instructions which, when executed by a microprocessor, causes the microprocessor to perform a set of acts, the set of acts comprising:
determining a search image that is constructed based at least in part upon a plurality of template image frames;
capturing, using a spatial computing headset, a plurality of captured image frames of an object or a portion thereof;
performing an image registration process that registers two or more captured image frames of the plurality of captured image frames in the search image using a deep network;
tracking, using the spatial computing headset, the movement of the object based at least in part upon respective results of registering the plurality of captured image frames in the search image; and
training the deep network using at least some captured image frames of the plurality of captured image frames, training the deep network comprising
identifying a captured image frame of the at least some captured image frames captured by the spatial computing headset,
extracting, using the deep network, a capture image frame feature from a first region in the captured image frame and a search image feature from a second region in the search image, converting the captured image frame feature into a plurality of features that comprises a pair of a first feature and a second feature for the deep network, providing the first feature converted from the captured image frame feature to a classification subnetwork of the deep network, and providing the second feature converted from the captured image frame feature to a regression subnetwork of the deep network, wherein tracking the movement of the object is performed by the spatial computing headset, without capturing glint reflected from the object in response to an input light pattern.

12. The non-transitory computer-readable medium of claim 11, wherein the set of acts comprises training the deep network, training the deep network comprising:

producing, by the classification subnetwork, a first output data structure at least by convolving, at the classification subnetwork, the first feature converted from the captured image frame feature and search image feature from the search image; and producing, by the regression subnetwork, a second output data structure at least by convolving, at the regression subnetwork, the second feature converted from the captured image frame feature and search image feature from the search image.

13. The system of claim 12, wherein the set of acts comprises training the deep network, training the deep network comprising:

determining, by the classification subnetwork, whether the first region belongs to a target region or a non-target region based at least in part upon the first output data structure; and predicting, by the regression subnetwork, a position refinement for the region that is determined to belong to the target region or the non-target region based at least in part upon the second output data structure.

* * * * *